United States Patent
Van Ostrand et al.

(10) Patent No.: US 11,221,709 B2
(45) Date of Patent: Jan. 11, 2022

(54) ELECTRONIC WRITING APPARATUS WITH RING-BACK AND OTHER FUNCTIONALITIES

(71) Applicant: SigmaSense, LLC., Wilmington, DE (US)

(72) Inventors: Daniel Keith Van Ostrand, Leander, TX (US); Patrick Troy Gray, Cedar Park, TX (US)

(73) Assignee: SigmaSense, LLC., Wilmington, DE (US)

( * ) Notice: Subject to any disclaimer, the term of this patent is extended or adjusted under 35 U.S.C. 154(b) by 0 days.

(21) Appl. No.: 17/070,799

(22) Filed: Oct. 14, 2020

(65) Prior Publication Data

US 2021/0048934 A1    Feb. 18, 2021

Related U.S. Application Data

(63) Continuation-in-part of application No. 17/062,043, filed on Oct. 2, 2020, now Pat. No. 11,126,297, which
(Continued)

(51) Int. Cl.
*G06F 3/041* (2006.01)
*G06F 3/16* (2006.01)
(Continued)

(52) U.S. Cl.
CPC ...... *G06F 3/04162* (2019.05); *G06F 3/03545* (2013.01); *G06F 3/0418* (2013.01);
(Continued)

(58) Field of Classification Search
CPC .. G06F 3/04162; G06F 3/0441; G06F 3/0442; G06F 3/03543; G06F 3/0418
See application file for complete search history.

(56) References Cited

U.S. PATENT DOCUMENTS 6,218,972 B1    4/2001   Groshong
6,665,013 B1   12/2003   Fossum et al.
(Continued)

FOREIGN PATENT DOCUMENTS

CN    103995626 A    8/2014
CN    104182105 A   12/2014

OTHER PUBLICATIONS

Baker; How delta-sigma ADCs work, Part 1; Analog Applications Journal; Oct. 1, 2011; 6 pgs.
(Continued)

*Primary Examiner* — Laurence J Lee
(74) *Attorney, Agent, or Firm* — Garlick & Markison

(57) ABSTRACT

A circuit includes a function module, a processing module, and a transceive circuit. The function module is operably coupled to detect stimulus of an electronic writing apparatus and generate functional data based on the stimulus. The processing module is operable to generate an outbound data signal from the functional data. The transceive circuit is coupled to a conductor of the electronic writing apparatus and includes a reference circuit operably coupled to, generate an identifier signal having a unique waveform characteristic that is an identifier for an aspect of the electronic writing apparatus, and combine the outbound data signal with the identifier signal to produce a transmit reference signal. The transceive circuit also includes a drive-sense circuit that is operably coupled to regulate the transmit reference signal on the conductor and generate an error correction signal based on the transmit reference signal and an inbound signal received via the conductor.

12 Claims, 46 Drawing Sheets
(23 of 46 Drawing Sheet(s) Filed in Color)

Related U.S. Application Data is a continuation-in-part of application No. 16/445,420, filed on Jun. 19, 2019, now Pat. No. 11,054,920, which is a continuation-in-part of application No. 16/436,698, filed on Jun. 10, 2019, now Pat. No. 11,029,769.

(60) Provisional application No. 62/910,182, filed on Oct. 3, 2019.

(51) Int. Cl.
*G06F 3/044* (2006.01)
*G06F 3/0354* (2013.01)

(52) U.S. Cl.
CPC .......... *G06F 3/0441* (2019.05); *G06F 3/0442* (2019.05); *G06F 3/16* (2013.01); *G06F 2203/0381* (2013.01); *G06F 2203/04105* (2013.01); *G06F 2203/04106* (2013.01)

(56) References Cited

U.S. PATENT DOCUMENTS

| | | |
|---|---|---|
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,547,114 B2 | 10/2013 | Kremin |
| 8,587,535 B2 | 11/2013 | Oda et al. |
| 8,625,726 B2 | 1/2014 | Kuan |
| 8,982,097 B1 | 3/2015 | Kuzo et al. |
| 9,201,547 B2 | 12/2015 | Elias |
| 2009/0127003 A1* | 5/2009 | Geaghan ........... G06F 3/041661 178/18.03 |
| 2011/0063154 A1 | 3/2011 | Hotelling et al. |
| 2011/0298745 A1 | 12/2011 | Souchkov |
| 2012/0278031 A1 | 11/2012 | Oda |
| 2013/0278447 A1 | 10/2013 | Kremin |
| 2014/0327644 A1 | 11/2014 | Mohindra |
| 2015/0091847 A1 | 4/2015 | Chang |
| 2015/0346889 A1 | 12/2015 | Chen |
| 2016/0188049 A1 | 6/2016 | Yang et al. |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

* cited by examiner computing device 10

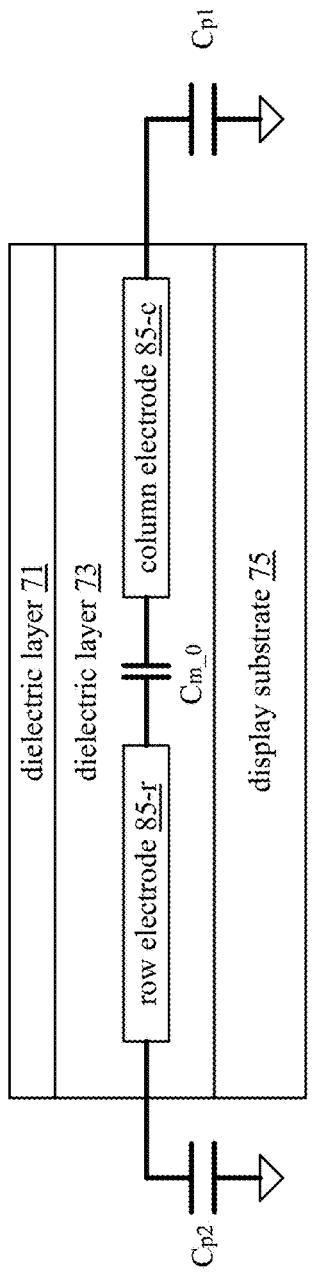
FIG. 4
no contact
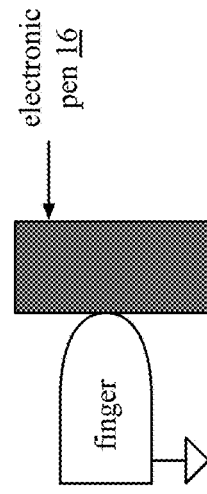
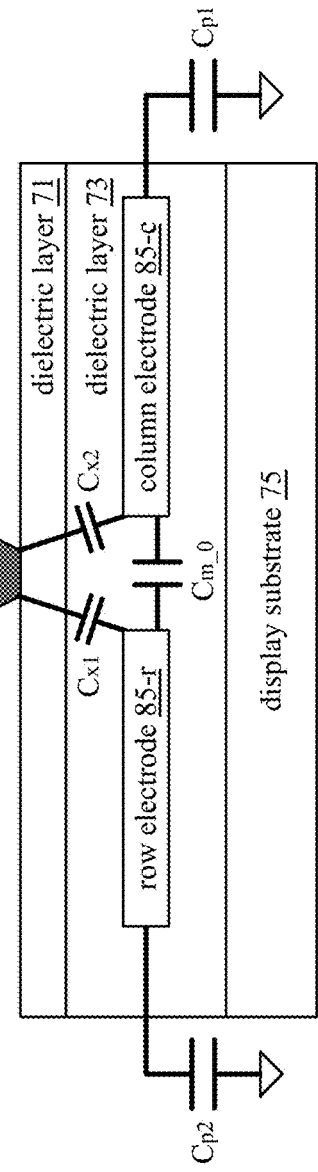
FIG. 5
contact electronic pen 16 electronic pen 16 electronic pen 16 electronic pen 16 electronic pen 16

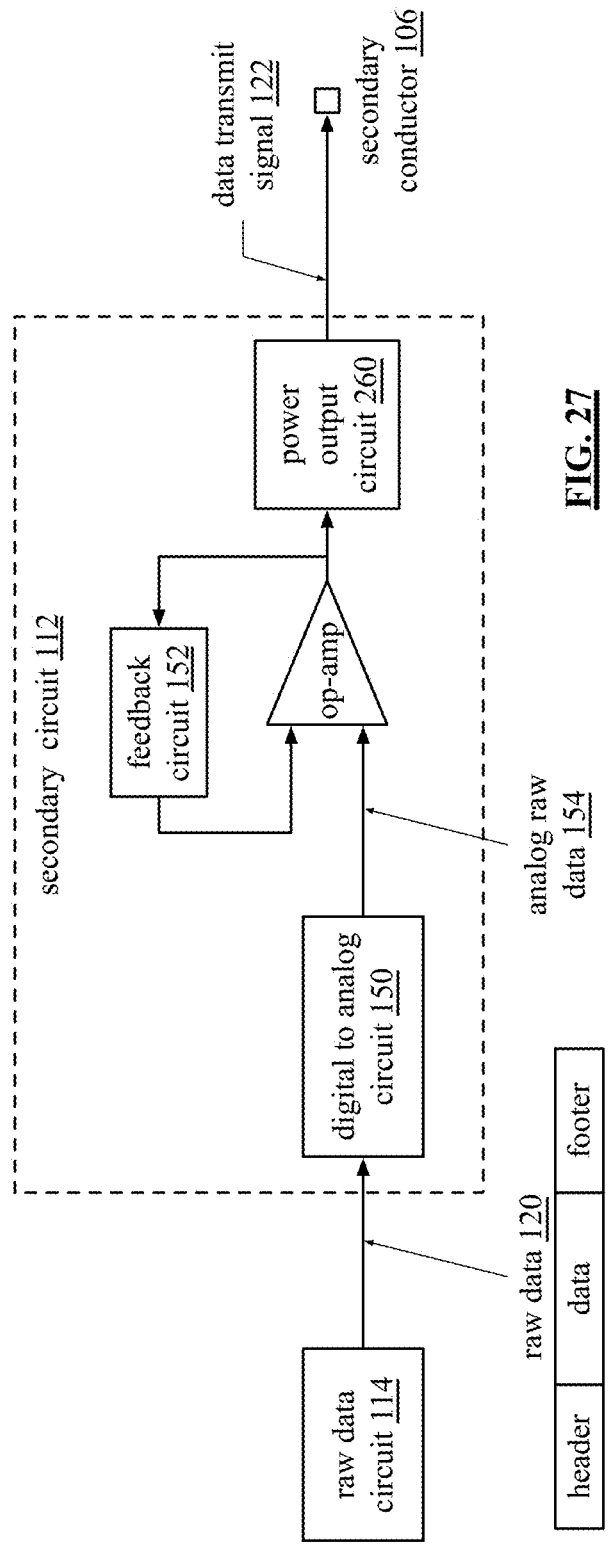
FIG. 27
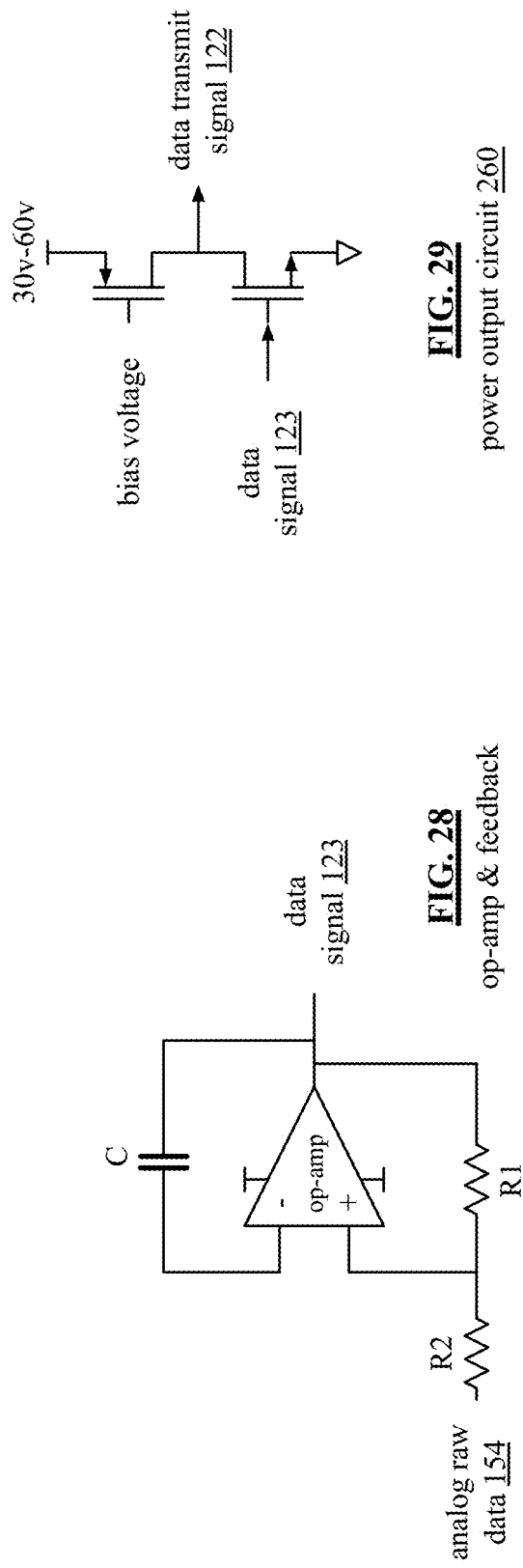
FIG. 29
power output circuit 260
FIG. 28
op-amp & feedback

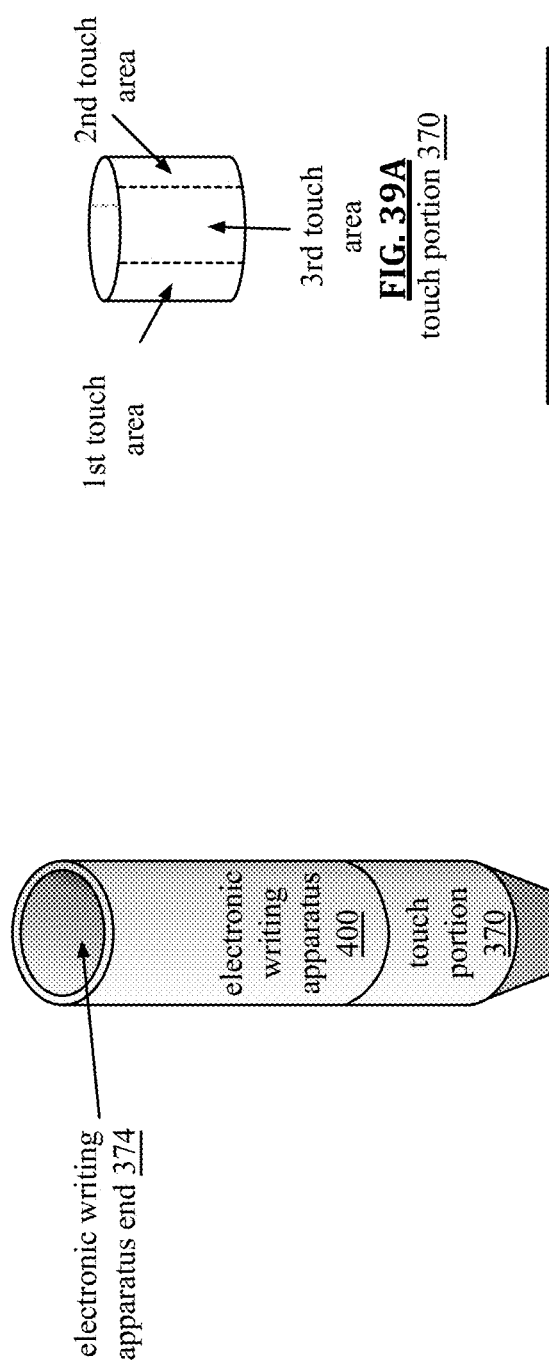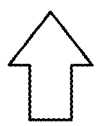

electronic writing apparatus 400 electronic writing apparatus 400

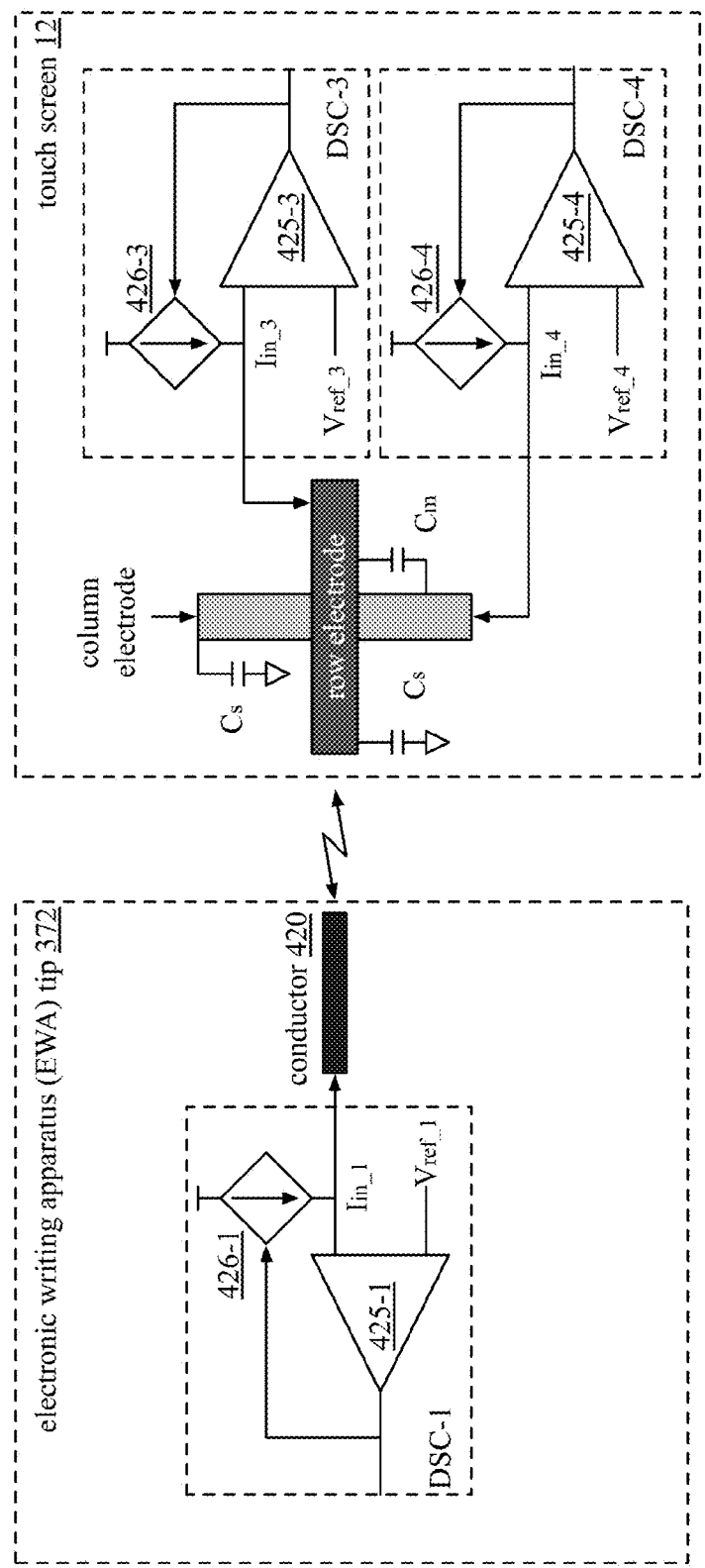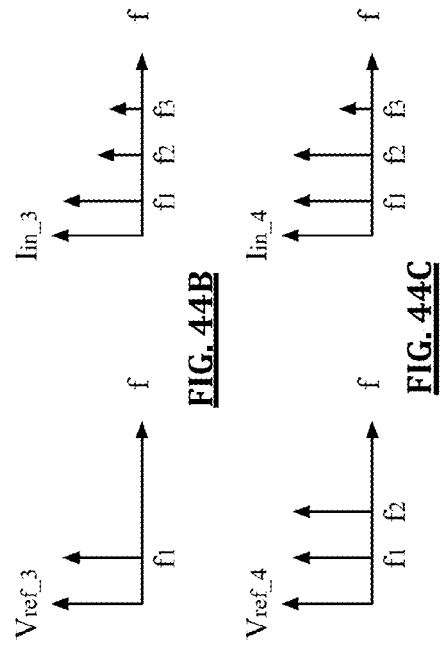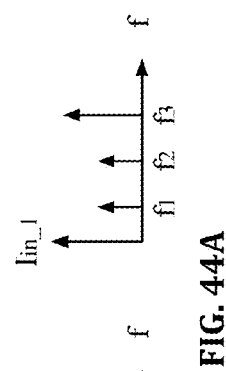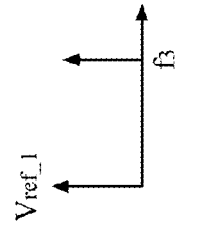

electronic writing apparatus 400 electronic writing apparatus 400

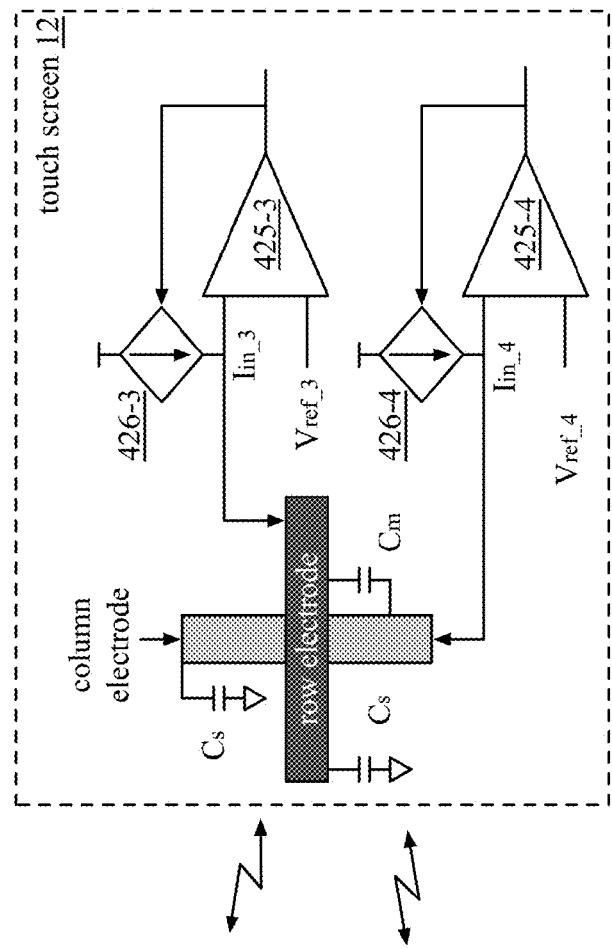
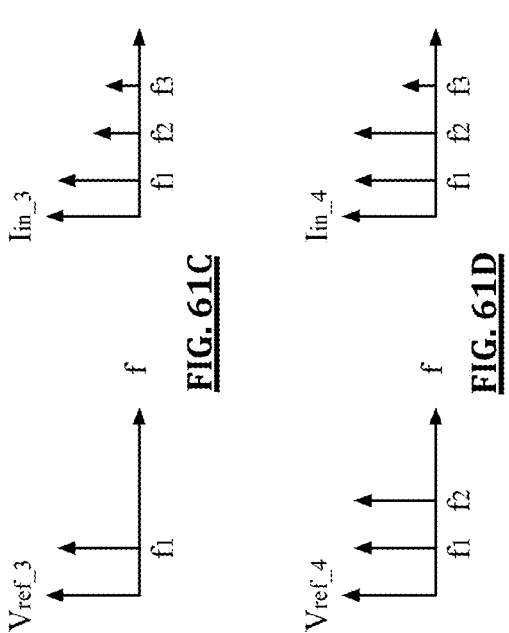
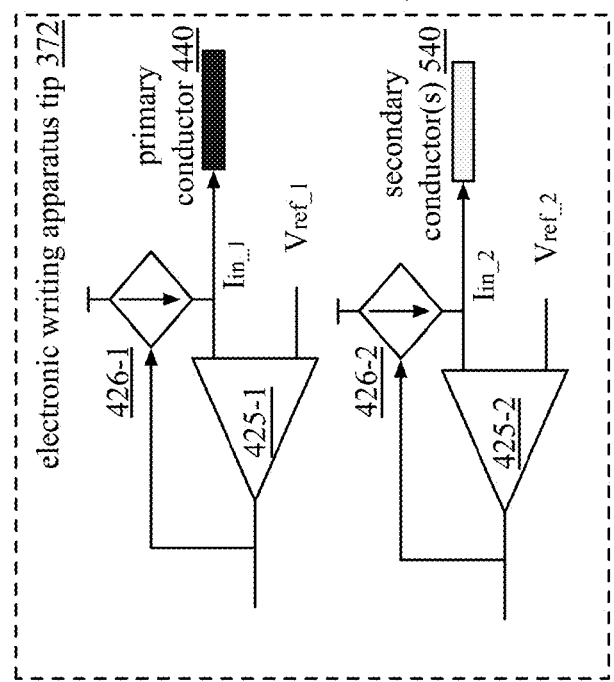
FIG. 61
FIG. 61A FIG. 61B FIG. 61C FIG. 61D
f1 for self
f2 for mutual
f3 for pen ID & pen self

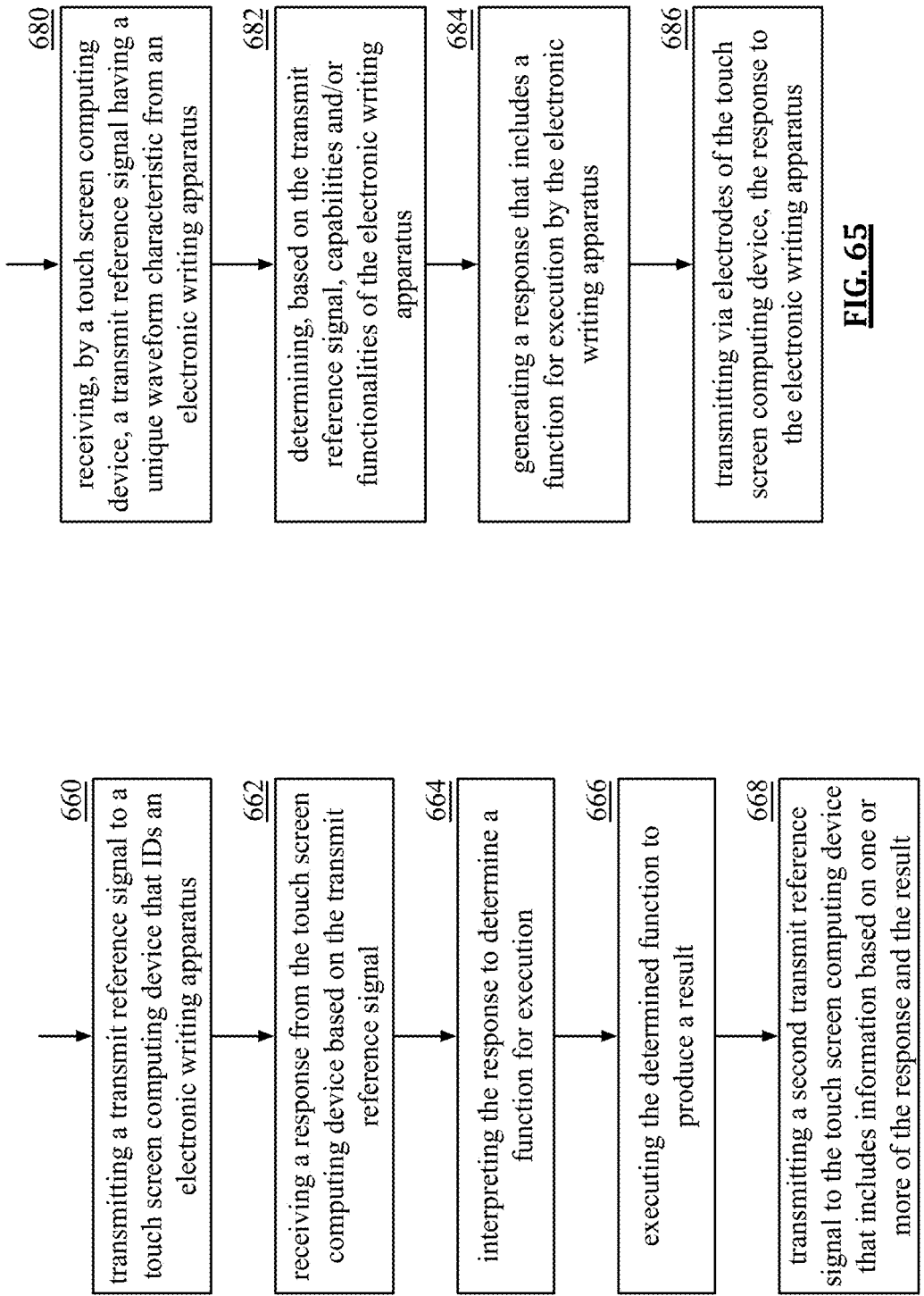

ELECTRONIC WRITING APPARATUS WITH RING-BACK AND OTHER FUNCTIONALITIES

CROSS-REFERENCE TO RELATED APPLICATIONS

The present U.S. Utility Patent application claims priority pursuant to 35 U.S.C. § 120 as a continuation-in-part of U.S. Utility patent application Ser. No. 17/062,043, entitled "ELECTRONIC PEN WITH RING-BACK AND OTHER FUNCTIONALITIES," filed Oct. 2, 2020, pending, which is a continuation-in-part of U.S. Utility patent application Ser. No. 16/445,420, entitled "PEN FOR USE WITH A TOUCH SCREEN," filed Jun. 19, 2019, pending, which claims priority pursuant to 35 U.S.C. § 120 as a continuation-in-part of U.S. Utility patent application Ser. No. 16/436,698, entitled "PEN FOR USE WITH A TOUCH SCREEN," filed Jun. 10, 2019, pending. U.S. Utility patent application Ser. No. 17/062,043 also claims priority pursuant to 35 U.S.C. § 119 to U.S. Provisional Patent Application No. 62/910,182, entitled "ELECTRONIC PEN WITH RING-BACK AND OTHER FUNCTIONALITIES," filed Oct. 3, 2019. Each of these patent applications is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates to computer systems and more particularly to interaction of a writing instrument with a touch screen of a computing device.

Description of Related Art

Computers include user interfaces to receive data from a user and to output data to a user. A common user interface is a graphical user interface (GUI) that provides images, or icons, for various types of data input (e.g., select a file, edit a word, type a character, draw a picture, look at a photo, format a document, etc.). In an example, the user selects an icon by manipulating a mouse to align a cursor with an icon and then "selects" the icon. In another example, the user selects an icon by touching the screen with the user's finger or with a special pen.

For general use of a pen with computers from different manufacturers and/or having different touch screen technologies, a pen includes a ring-back topology as described in patent application PCT/US201267897. The ring-back topology includes an inverting charge integrator and an inverting amplifier. When the tip of a ring-back pen touches the screen, the tip receives a signal from the screen. The inverting charge integrator integrates and inverts the received signal. The inverting amplifier inverts the integrated and inverted signal to produce an output signal that resembles the received signal. The pen sends the output signal back to the screen. The output signal affects the signal transmitted by the screen, which screen interprets as a touch.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

FIG. 4 is a schematic block diagram of an example of capacitance of a touch screen with no touch in accordance with the present invention;

FIG. 5 is a schematic block diagram of an example of capacitance of a touch screen with a touch from a pen or a device in accordance with the present invention;

FIG. 27 is a schematic block diagram of an embodiment of a secondary circuit of an electronic pen in accordance with the present invention;

FIG. 28 is a schematic block diagram of an embodiment of an operational amplifier circuit of the secondary circuit in accordance with the present invention;

FIG. 29 is a schematic block diagram of an embodiment of a power output circuit of the secondary circuit in accordance with the present invention;

FIG. 37 is a schematic block diagram of another embodiment of an electronic writing apparatus in accordance with the present invention;

FIG. 38 is a schematic block diagram of an embodiment of a touch portion in accordance with the present invention;

FIG. 39A is a schematic block diagram of another embodiment of a touch portion in accordance with the present invention;

FIG. 39B is a schematic block diagram of another embodiment of a touch portion in accordance with the present invention;

FIG. 44 is a schematic block diagram of an embodiment of an electronic writing apparatus tip transceiving signals with a touch screen in accordance with the present invention;

Figure 45:
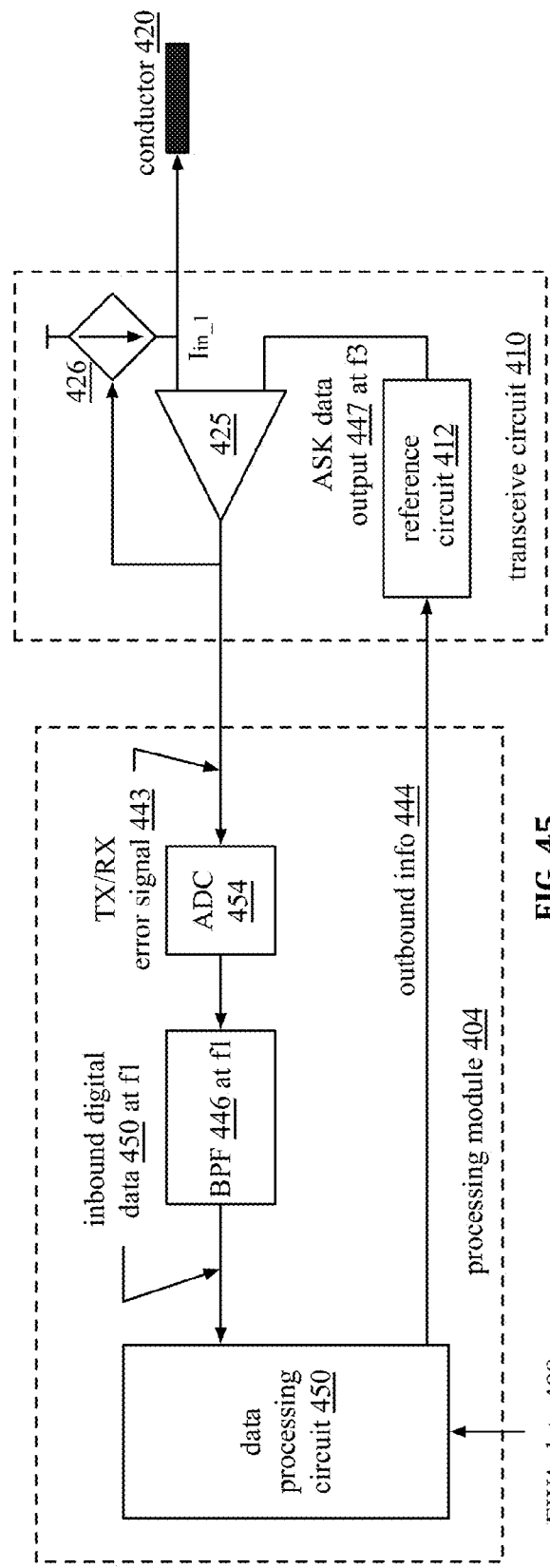
Figure 46:
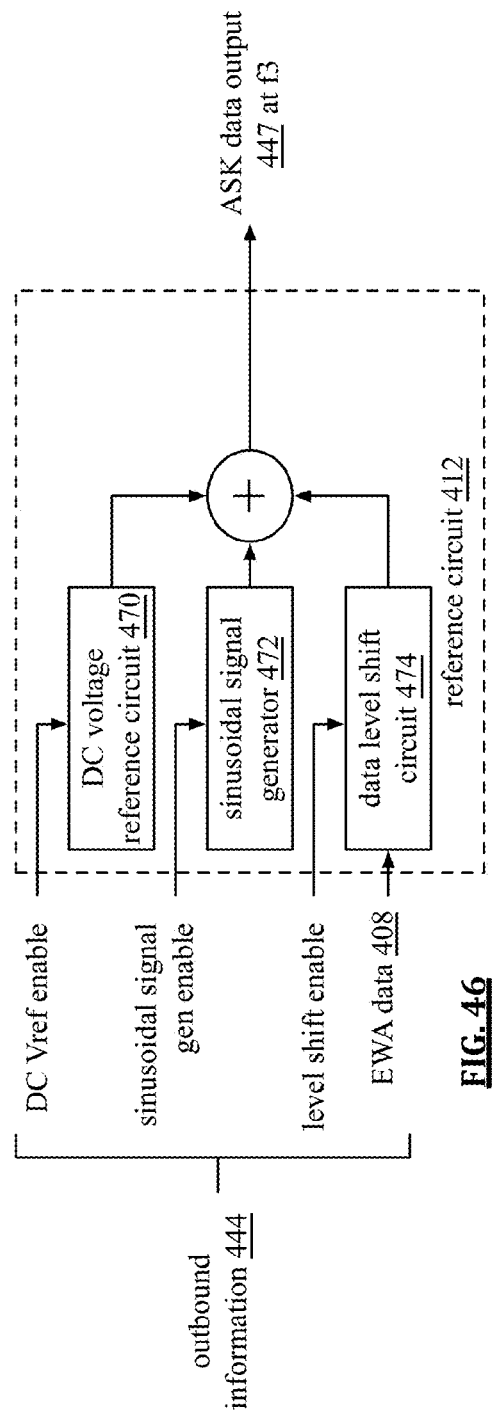
Figure 47A:
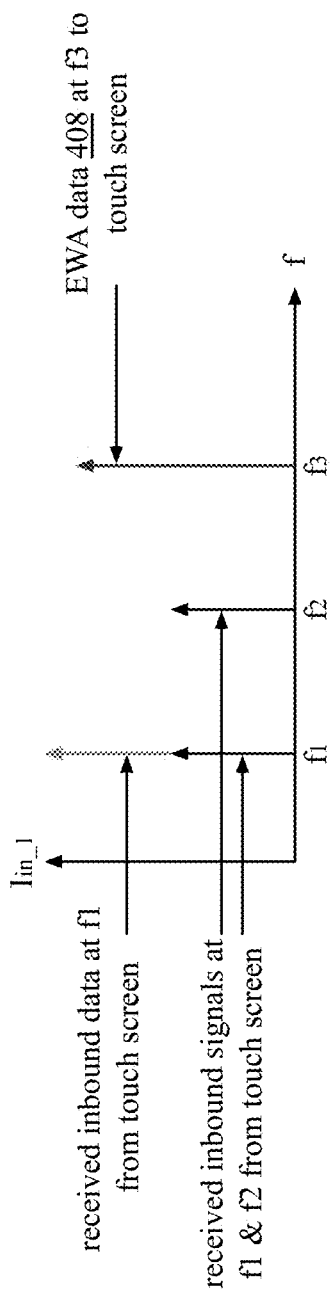
Figure 47B:
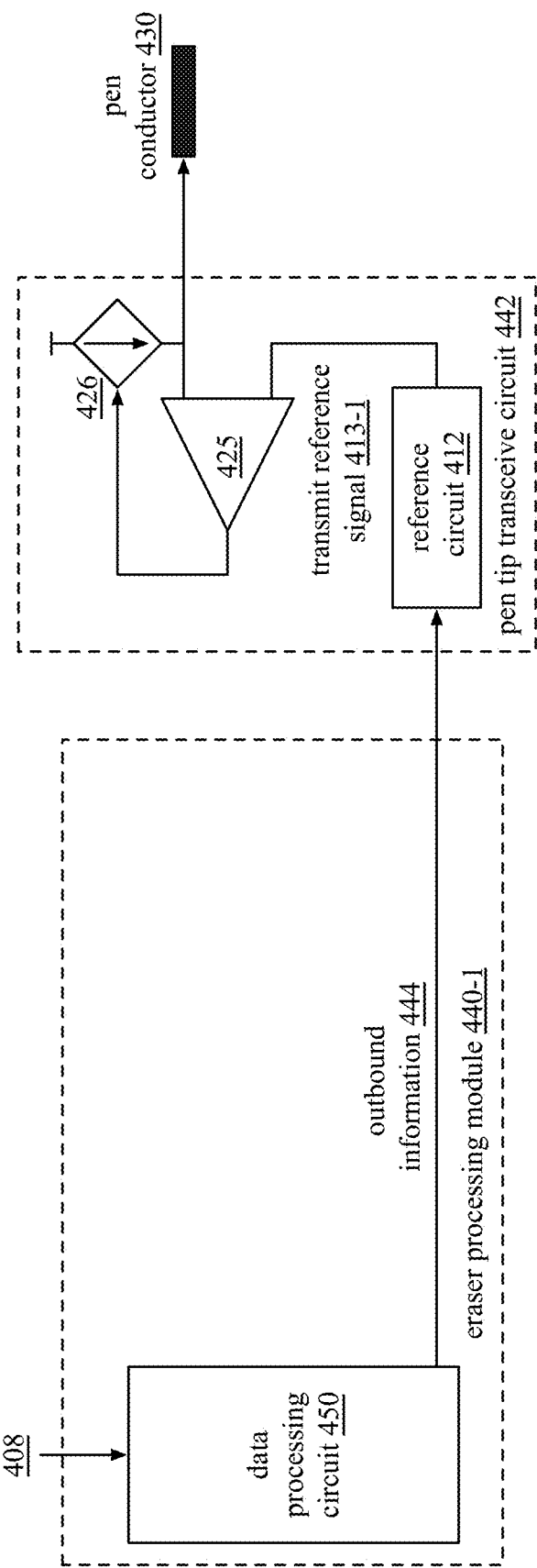
Figure 48:
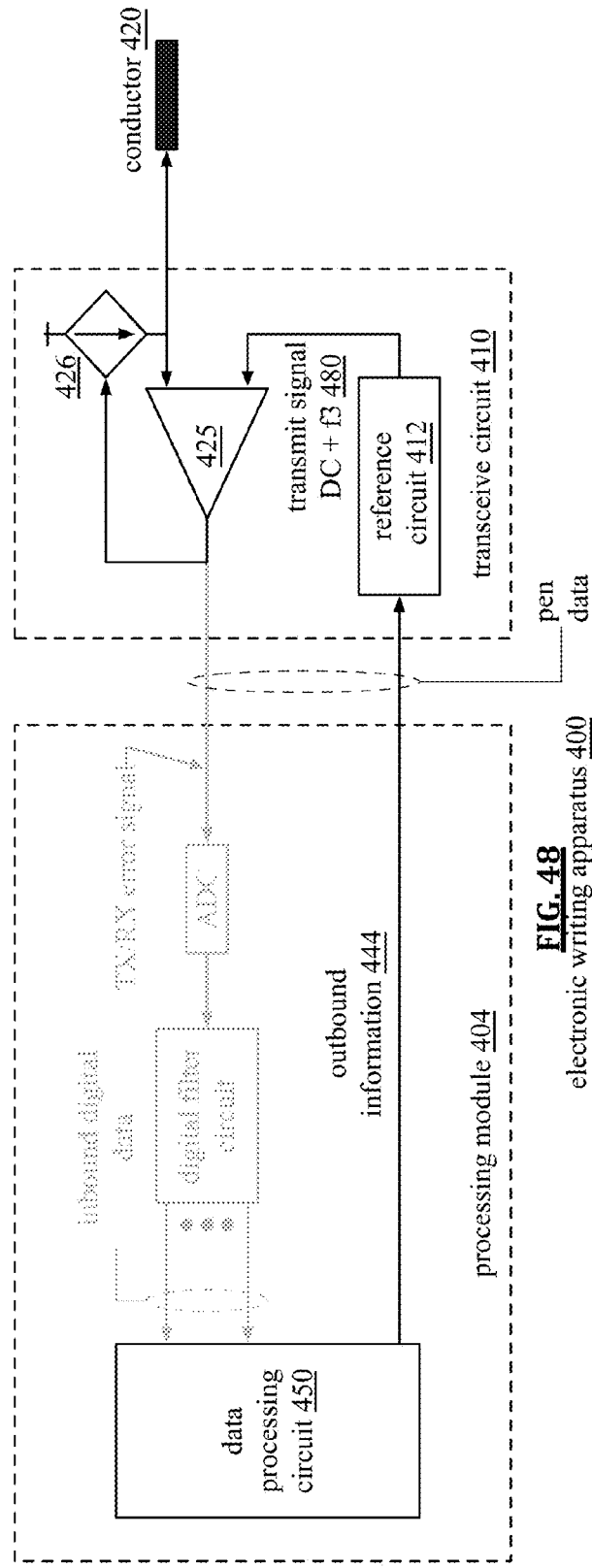
Figure 49:
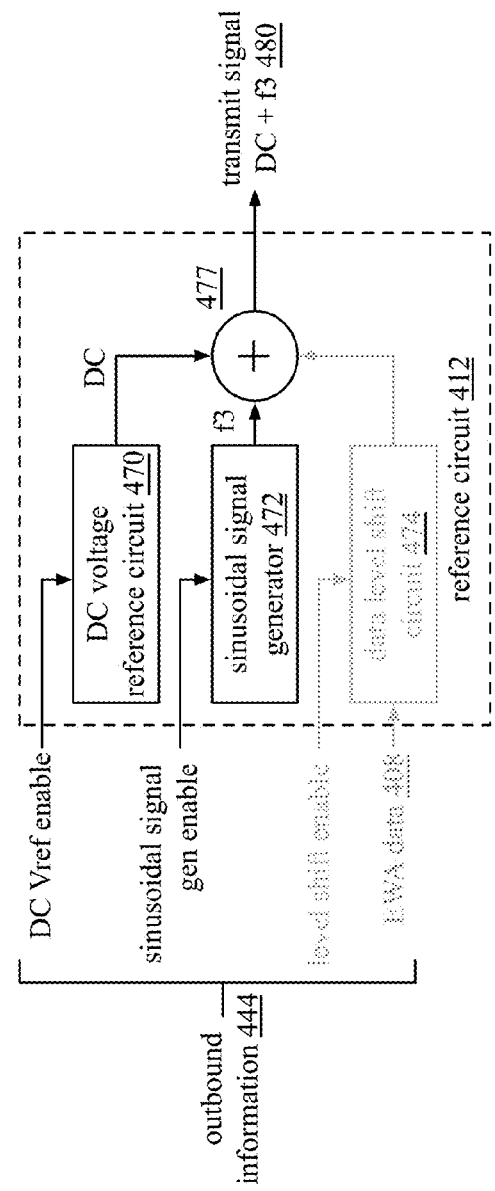
Figure 50:
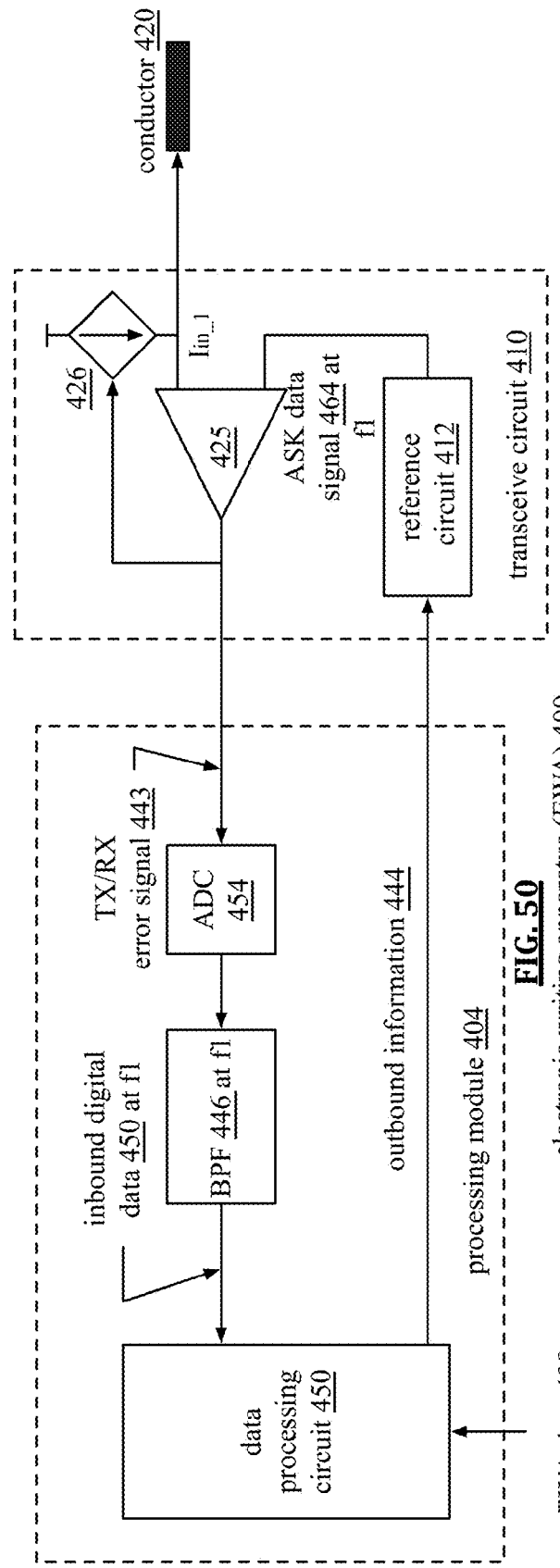
Figure 51:
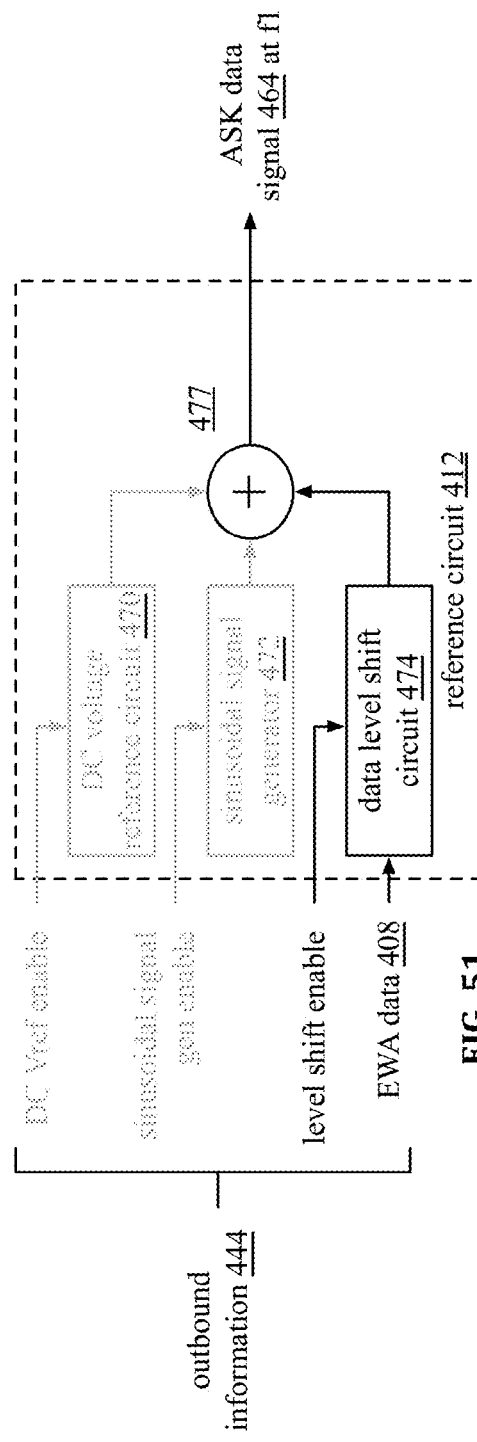
Figure 52:
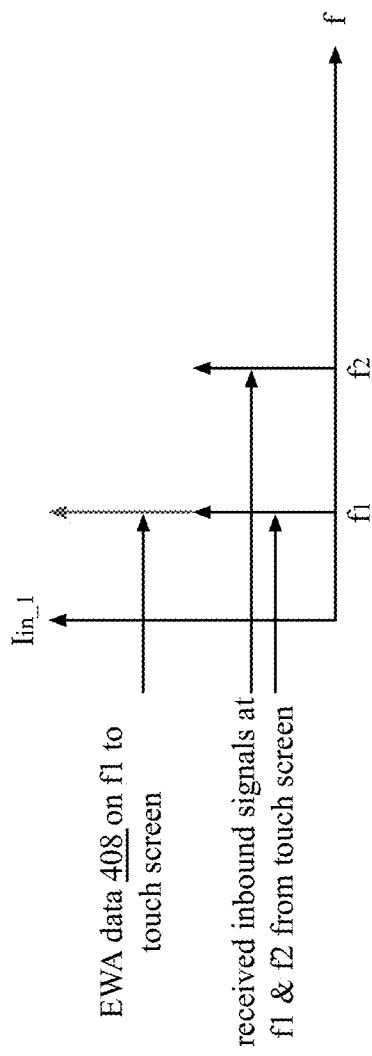
Figure 53:
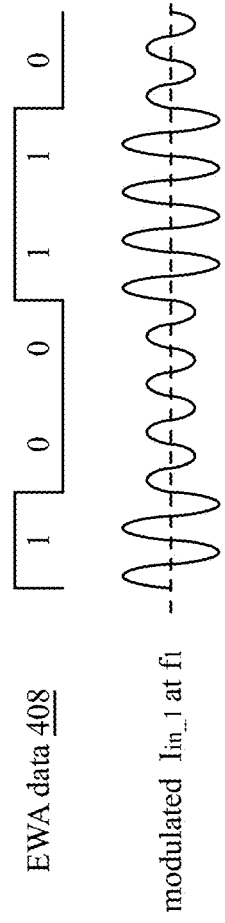
Figure 54:
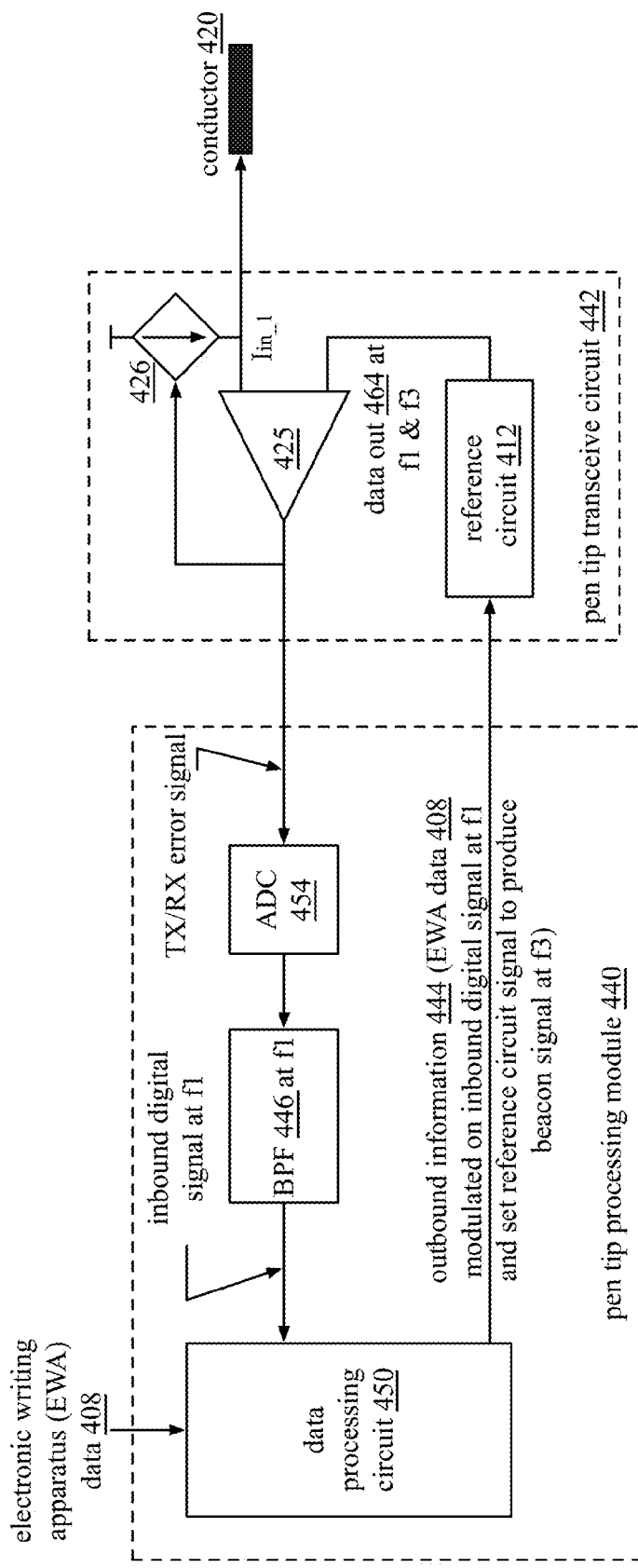
Figure 55:
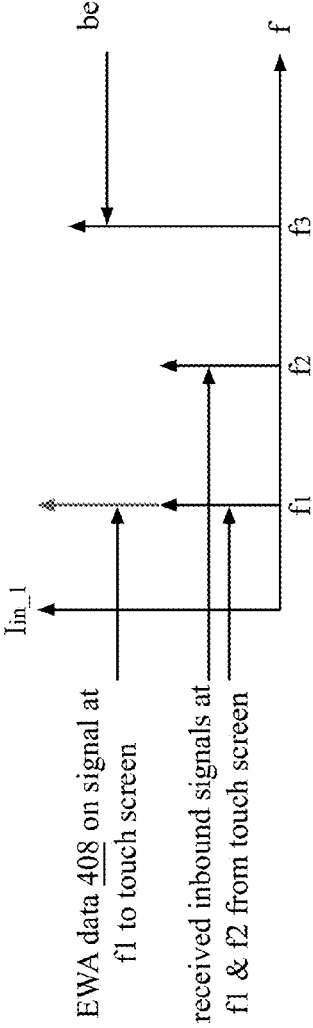
Figures 56, 57:
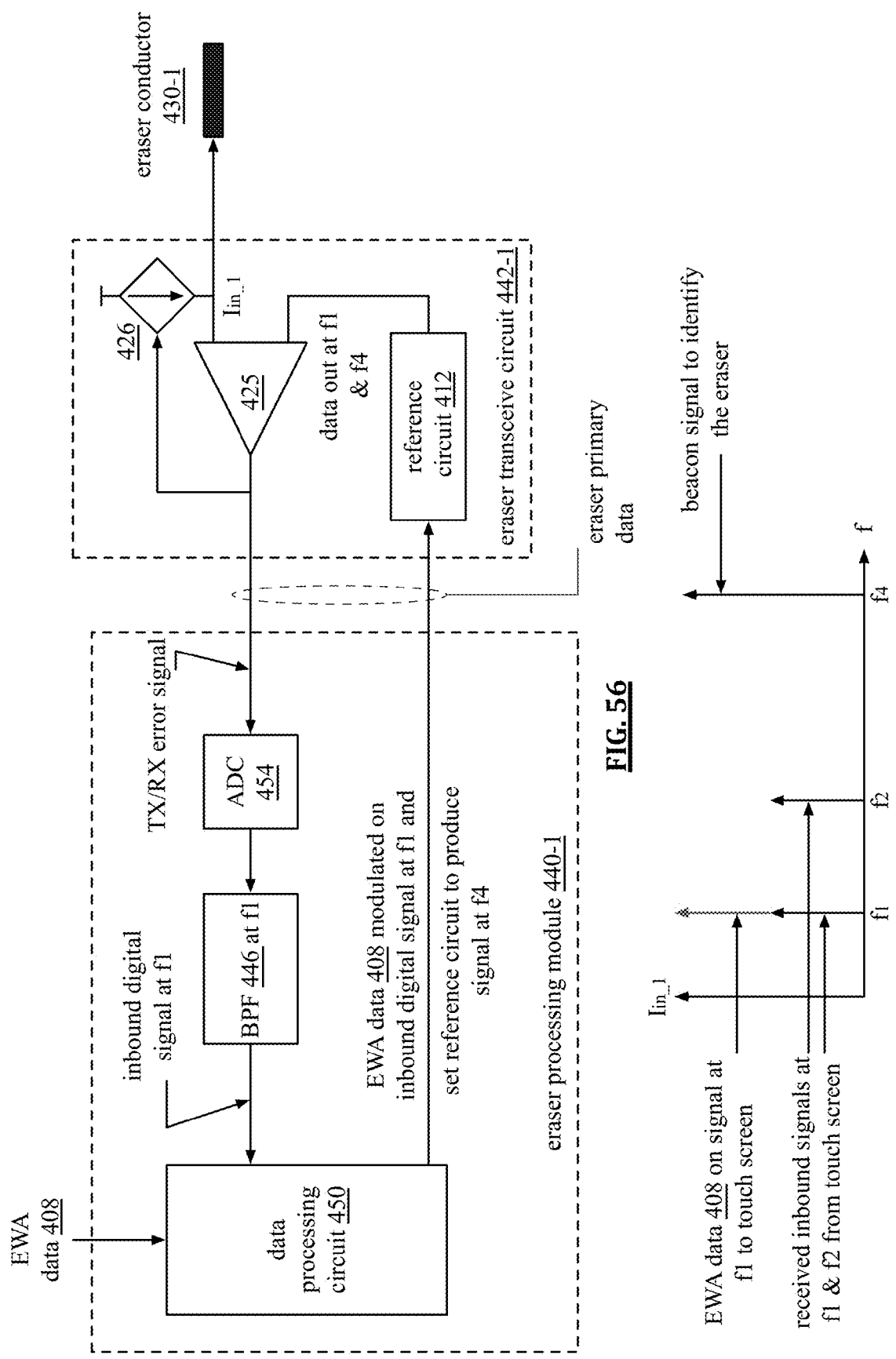
Figure 58:
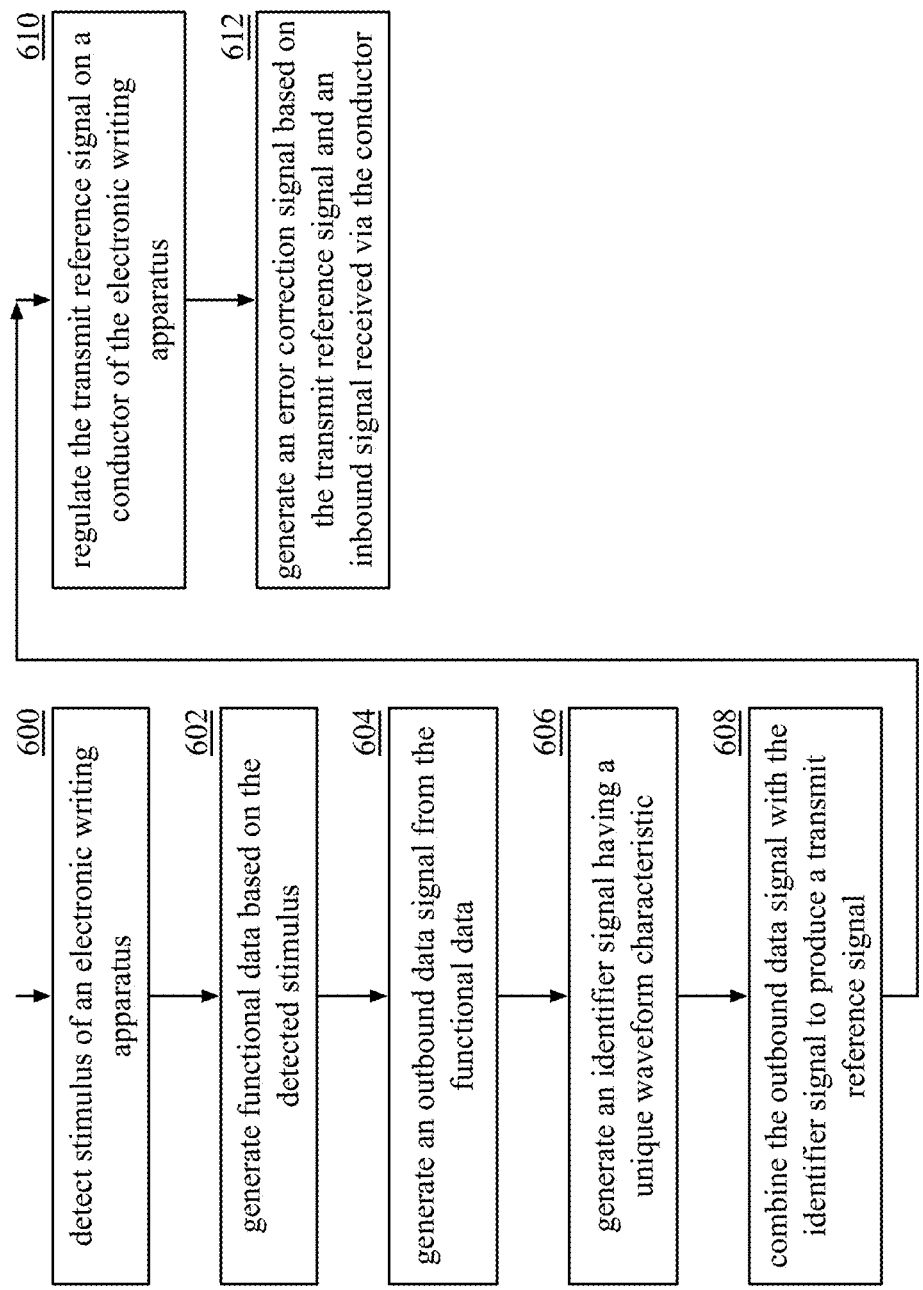
Figure 59:
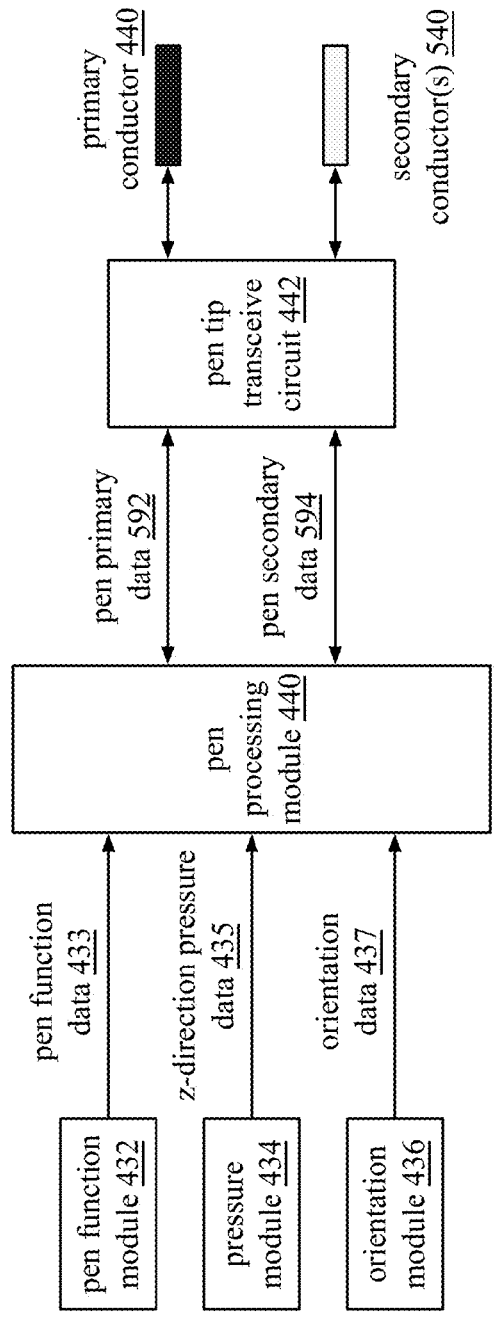
Figure 60:
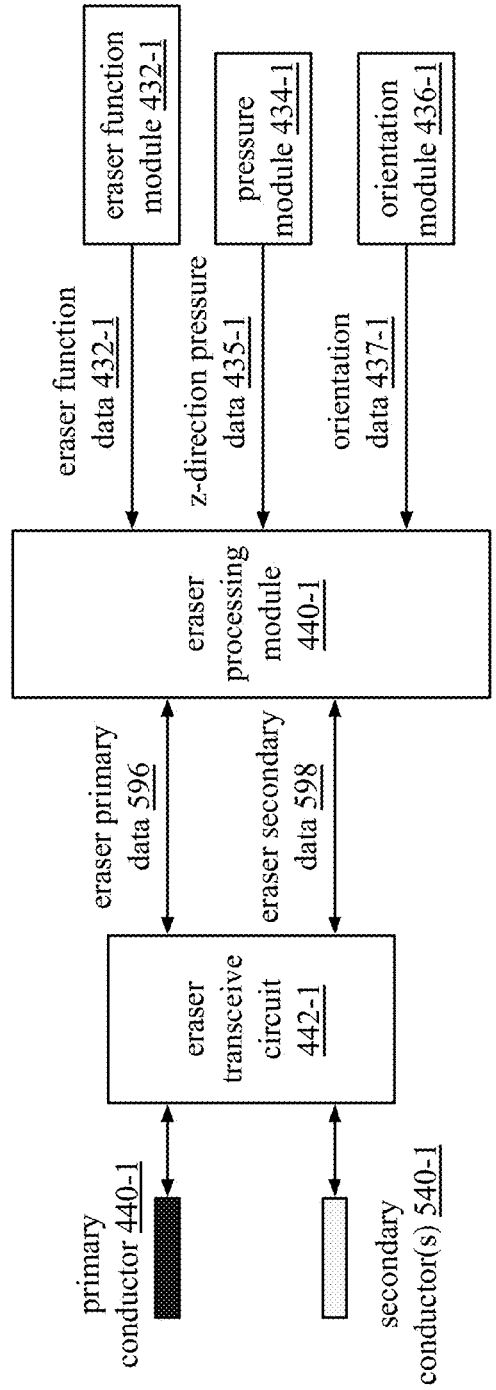
Figure 62:
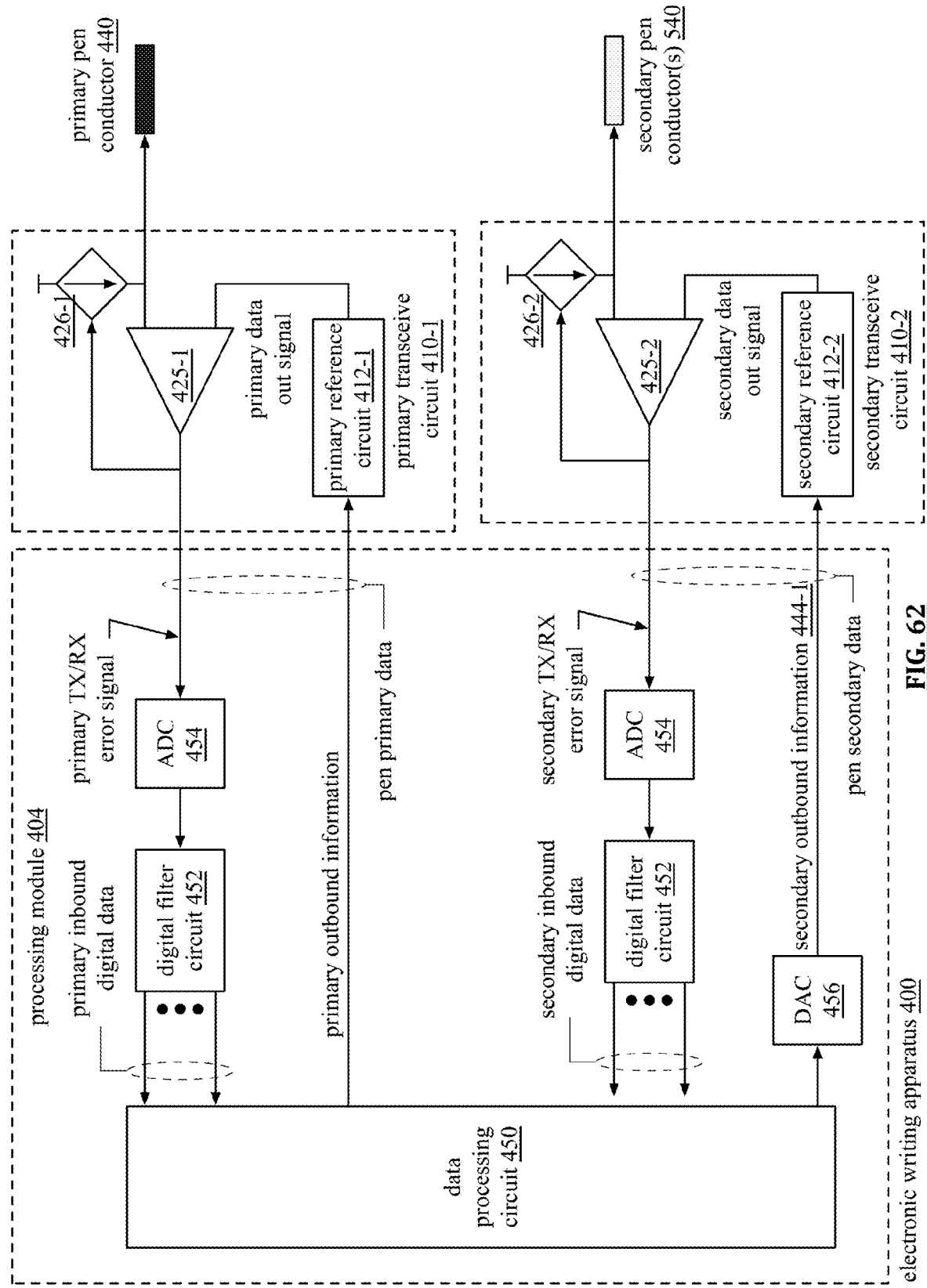
Figure 63:
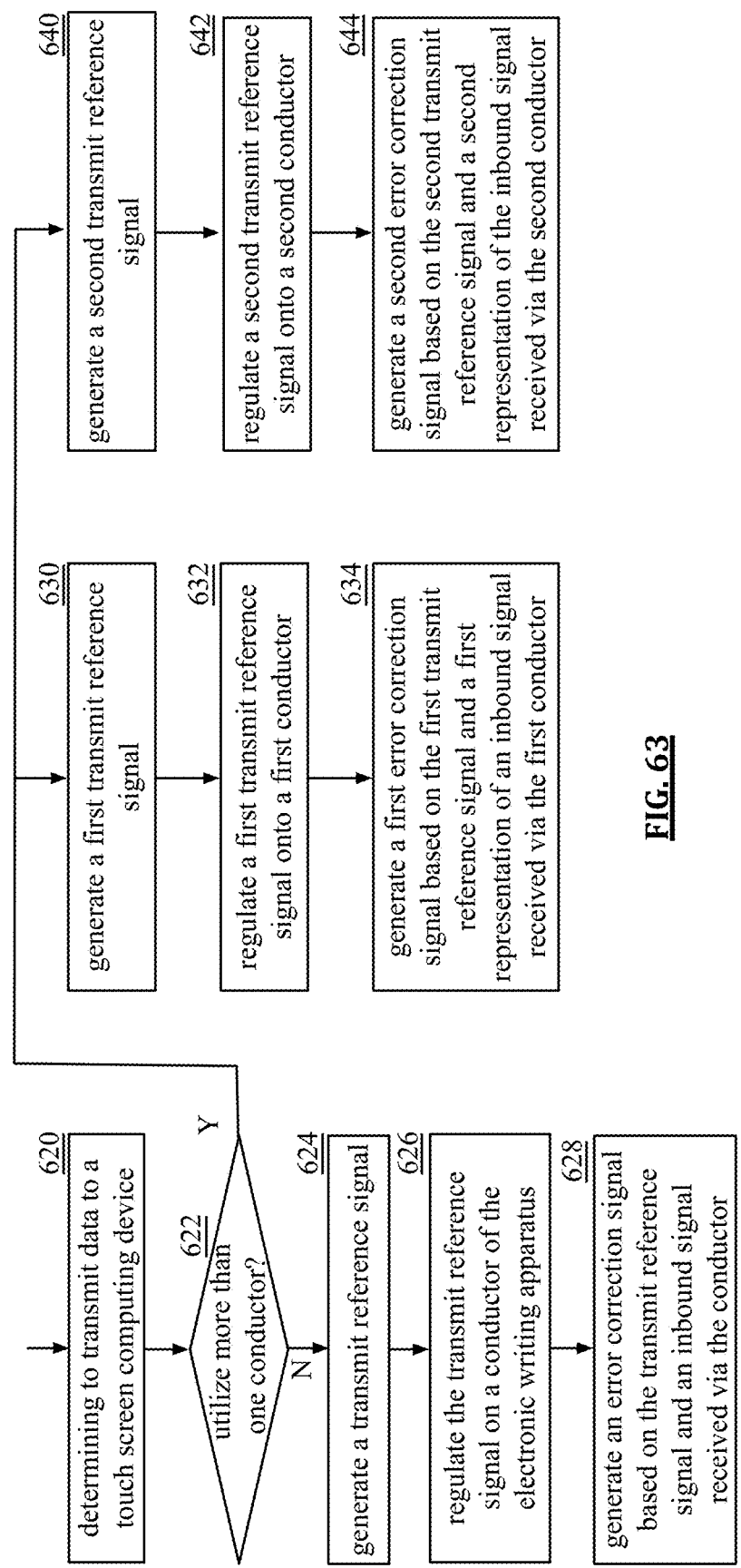

FIGS. 44A-C are graphical illustrations of examples of signaling transceived between electronic writing apparatus tip and a touch screen in accordance with the present invention;

FIG. 45 is a schematic block diagram of an embodiment of an electronic writing apparatus operating in a data communication mode in accordance with the present invention;

FIG. 46 is a schematic block diagram of another embodiment of a reference circuit in accordance with the present invention;

FIG. 47A is a graphical illustration of an embodiment of transceived signals in a data communication mode in accordance with the present invention;

FIG. 47B is a schematic block diagram of another embodiment of an electronic writing apparatus in accordance with the present invention;

FIG. 48 is a schematic block diagram of an embodiment of an electronic writing apparatus operating in a beacon mode in accordance with the present invention;

FIG. 49 is a schematic block diagram of another embodiment of a reference circuit in accordance with the present invention;

FIG. 50 is a schematic block diagram of an embodiment of an electronic writing apparatus operating in a ring back mode in accordance with the present invention;

FIG. 51 is a schematic block diagram of another embodiment of a reference circuit in accordance with the present invention;

FIG. 52 is a graphical illustration of an embodiment of transceived signals in a ring back mode in accordance with the present invention;

FIG. 53 is a graphical illustration of an embodiment of an electronic writing apparatus modulating data on a received signal in accordance with the present invention;

FIG. 54 is a schematic block diagram of an embodiment of an electronic writing apparatus functioning as a pen and operating in ring back and beacon modes in accordance with the present invention;

FIG. 55 is a graphical illustration of an embodiment of transceived signals in ring back and beacon modes of an electronic writing apparatus functioning as a pen in accordance with the present invention;

FIG. 56 is a schematic block diagram of an embodiment of an electronic writing apparatus functioning as an eraser and operating in ring back and beacon modes in accordance with the present invention;

FIG. 57 is a graphical illustration of an embodiment of transceived signals in ring back and beacon modes of an electronic writing apparatus functioning as an eraser in accordance with the present invention;

FIG. 58 is a flowchart illustrating an example of a method of an electronic writing apparatus communicating with a touch screen computing device in accordance with the present invention;

FIG. 59 is a schematic block diagram of another embodiment of an electronic writing apparatus in accordance with the present invention;

FIG. 60 is a schematic block diagram of another embodiment of an electronic writing apparatus in accordance with the present invention;

FIG. 61 is a schematic block diagram of another embodiment of an electronic writing apparatus tip transceiving signals with a touch screen in accordance with the present invention;

FIGS. 61A-D are graphical illustrations of examples of signaling transceived between electronic writing apparatus tip and a touch screen in accordance with the present invention;

FIG. 62 is a schematic block diagram of another embodiment of an electronic writing apparatus in accordance with the present invention;

FIG. 63 is a flowchart illustrating an example of a method of an electronic writing apparatus determining conductors to utilize for communication with a touch screen computing device in accordance with the present invention;

FIG. 64 is a flowchart illustrating an example of a method of an electronic writing apparatus communicating with a touch screen computing device in accordance with the present invention; and FIG. 65 is a flowchart illustrating an example of a method of a touch screen computing device setting up communication with an electronic writing apparatus in accordance with the present invention.

DETAILED DESCRIPTION OF THE INVENTION

Figure 1:
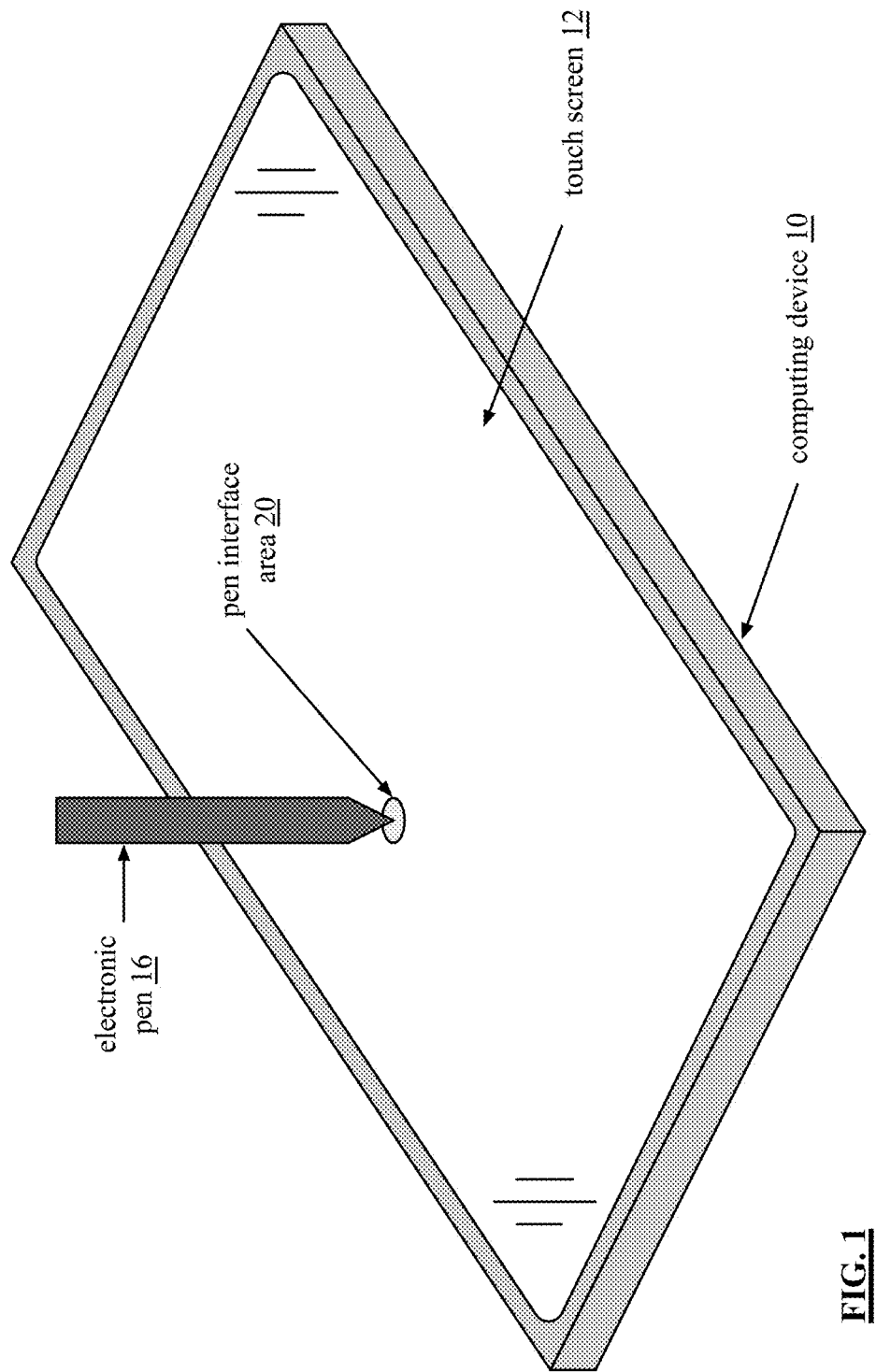
FIG. 1 is a schematic block diagram of an embodiment of a communication device with a pen and/or an input device in accordance with the present invention.

FIG. 1 is a schematic block diagram of an embodiment of a computing device 10 having a touch screen 12, which may further include a display to form a touch screen display. The computing device 10, which will be discussed in greater detail with reference to one or more of FIGS. 2-3, may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core.

A fixed computing device may be a computer (PC), an interactive white board, an interactive table top, an interactive desktop, an interactive display, a computer server, a cable set-top box, vending machine, an Automated Teller Machine (ATM), an automobile, a satellite receiver, a television set, a printer, a fax machine, home entertainment equipment, a video game console, and/or any type of home or office computing equipment. An interactive display functions to provide users with an interactive experience (e.g., touch the screen to obtain information, be entertained, etc.). For example, a store provides interactive displays for customers to find certain products, to obtain coupons, to enter contests, etc.

An electronic pen 16 interacts with the touch screen 12 to communication data with the computing device 10. For example, the pen 16 touches, or nearly touches, the touch screen at a pen interaction area 20. Within the pen interaction area 20, the touch screen 12 transmits a signal, or multiple signals, which are received by the pen 16. In a ring back mode, the pen 16 mimics the signal it receives and sends it back to the touch screen 12. In a more advanced mode, the pen 16 includes data with the ring back signal to provide additional information to the touch screen. For example, the data includes pen orientation data (e.g., angles of the pen in two or more axis), pressure data (e.g., how hard the user is pressing the pen on the screen), pen functionality (e.g., fine tip, coarse tip, clean line, fuzzy line, etc.), pen mode (e.g., draw, write, erase), pen features (e.g., color, button presses, etc.), pen data (e.g., battery life, user information, feature set, capabilities, etc.), etc.

In another advanced mode, the touch screen 12 provides additional data to the pen 16. For example, the signal, or signals, transmitted by the touch screen include embedded data. The embedded data for the pen 16 includes a variety of information. For example, the embedded data for the pen includes feedback for fine tuning the interaction between the pen and the touch screen (e.g., frequency selection, power control, etc.). In another example, the embedded data for the pen includes authentication data to ensure that user of the pen on the computing device is authorized to do so.

While the example of FIG. 1 shows one pen 16 interacting with the touch screen 12, multiple pens and/or fingers may simultaneously interact with the touch screen 12. For example, while pen 16 is interacting with the touch screen, a finger touches the touch screen 12 in a different area to convey different information to the computing device 10. As another example, a second pen interacts with the touch screen 12 while pen 16 is interacting with the touch screen.

Figure 2:
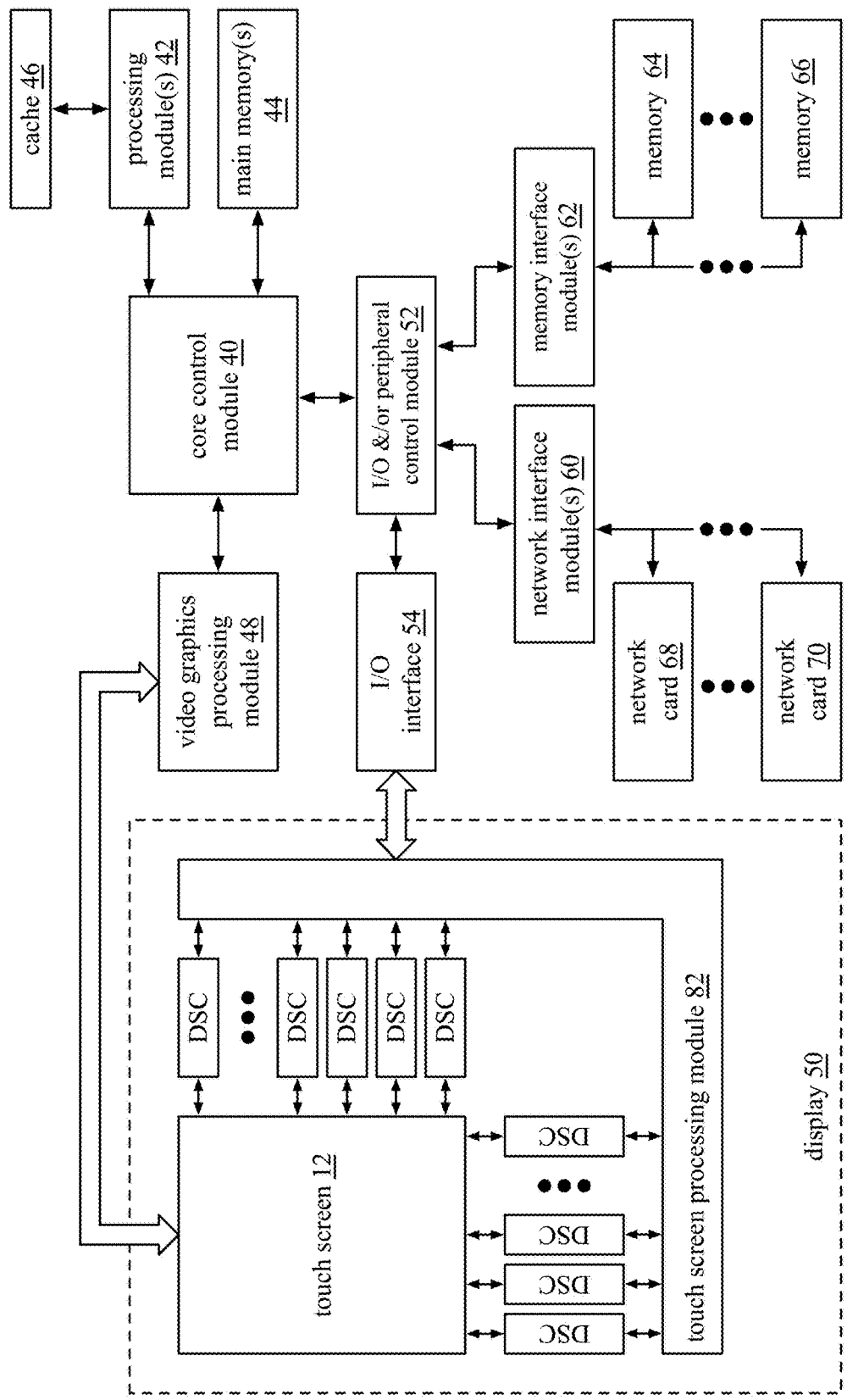
FIG. 2 is a schematic block diagram of an embodiment of a computing device in accordance with the present invention.

FIG. 2 is a schematic block diagram of an embodiment of a computing device 10 that includes a core control module 40, one or more processing modules 42, one or more main memories 44, cache memory 46, a video graphics processing module 48, a display 50, an Input-Output (I/O) peripheral control module 52, one or more input interface modules, one or more output interface modules, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 (4$^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and a network, or networks, via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) via the input interface module(s) and the I/O and/or peripheral control module 52. An input device includes a keypad, a keyboard, control switches, a touchpad, a microphone, a camera, etc. An input interface module includes a software driver and a hardware connector for coupling an input device to the I/O and/or peripheral control module 52. In an embodiment, an input interface module is in accordance with one or more Universal Serial Bus (USB) protocols.

The core control module 40 coordinates data communications between the processing module(s) 42 and output device(s) via the output interface module(s) and the I/O and/or peripheral control module 52. An output device includes a speaker, etc. An output interface module includes a software driver and a hardware connector for coupling an output device to the I/O and/or peripheral control module 52. In an embodiment, an output interface module is in accordance with one or more audio codec protocols.

The processing module 42 communicates directly with a video graphics processing module 48 to display data on the display. The video graphics processing module 48 receives data from the processing module 42, processes the data to produce rendered data in accordance with the characteristics of the display, and provides the rendered data to the display 50.

The display 50 includes the touch screen 12, a plurality of drive-sense circuits (DSC), and a touch screen processing module 82. The touch screen 12 includes a plurality of sensors (e.g., electrodes, capacitor sensing cells, capacitor sensors, inductive sensor, etc.) to detect a proximal touch of the screen. For example, when a pen touches the screen, capacitance of sensors proximal to the touch(es) are affected (e.g., impedance changes). As another example, when a pen touches the screen, a sensor's signal is changed (e.g., magnitude increase, magnitude decrease, phase shift, etc.). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 3:
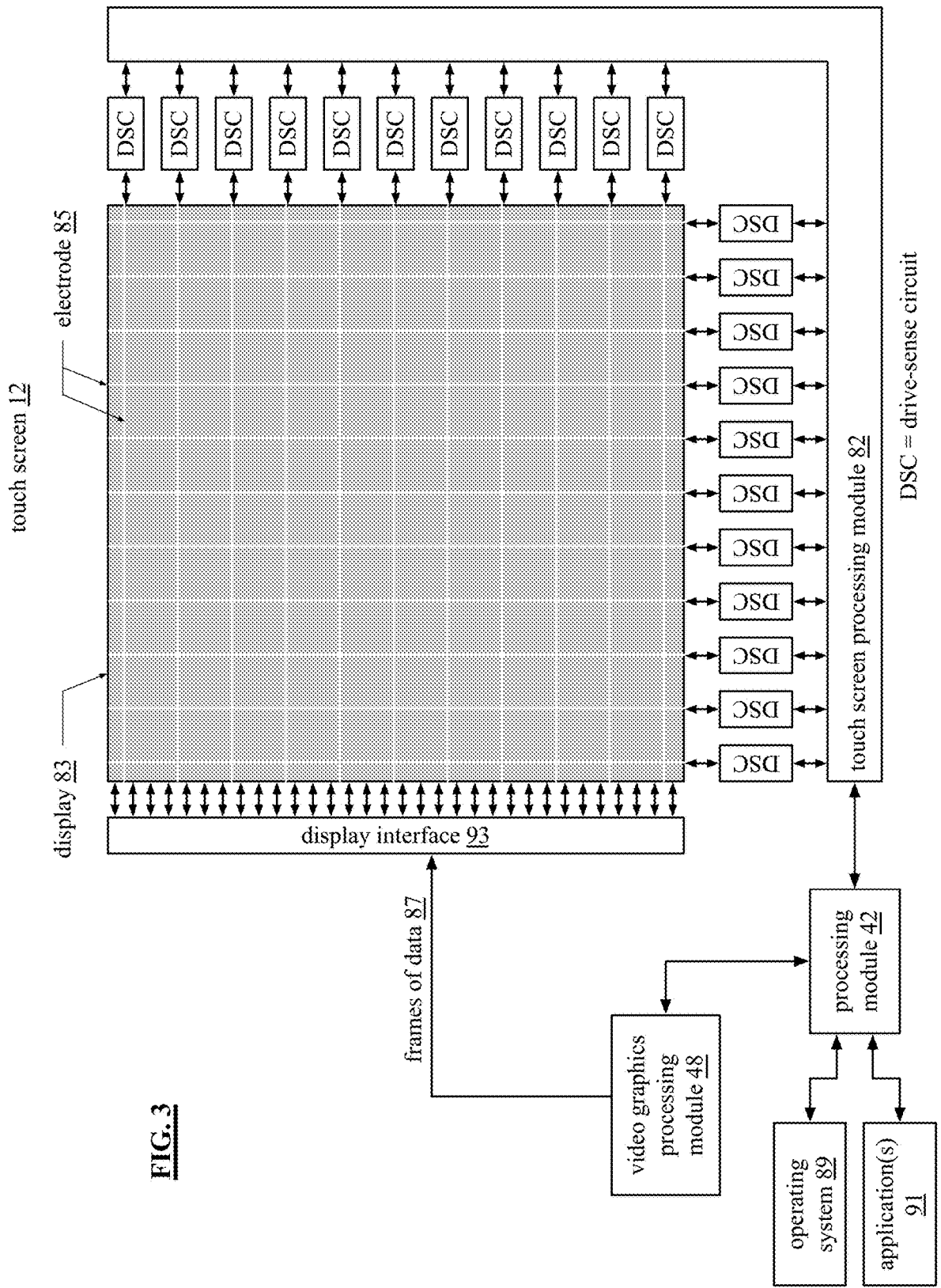
FIG. 3 is a schematic block diagram of another embodiment of a computing device in accordance with the present invention.

FIG. 3 is a schematic block diagram of another embodiment of a computing device 10 that includes the touch screen 12, the drive-sense circuits (DSC), the touch screen processing module 82, a display 83, electrodes 85, the processing module 42, the video graphics processing module 48, and a display interface. The display 83 may be a large screen display (e.g., for portable computing devices) or a large screen display (e.g., for fixed computing devices). In general, a large screen display has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it's not an exhaustive list.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 | display 50. The display 50 includes an LED (light emitting diode) display, an LCD (liquid crystal display), and/or other type of display technology. The display has a resolution, an aspect ratio, and other features that affect the quality of the The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The touch screen 12 includes integrated electrodes 85 that provide the sensors for the touch sense part of the touch screen display. The electrodes 85 are distributed throughout the display area or where touch screen functionality is desired. For example, a first group of the electrodes are arranged in rows and a second group of electrodes are arranged in columns.

The electrodes 85 are comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

While the display 83 is rendering the frames of video into visible images, the drive-sense circuits (DSC) provide sensor signals to the electrodes 85. When the screen is touched by a pen or device, signals on the electrodes 85 proximal to the touch (i.e., directly or close by) are changed. The DSCs detect the change for effected electrodes and provide the detected change to the touch screen processing module 82.

The touch screen processing module 82 processes the change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

If the signals received from the pen or device include embedded data, the touch screen processing module 82 interprets the embedded data and provides the resulting information to the processing module 42. If, computing device 10 is not equipped to process embedded data, the pen or device still communicated with the computing device using the change to the signals on the effected electrodes (e.g., increase magnitude, decrease magnitude, phase shift, etc.).

FIG. 4 is a cross section schematic block diagram of an example of capacitance of a touch screen 12 with no touch of a pen or a device. The electrode 85s are positioned proximal to dielectric layer 73, which is between cover dielectric layer 71 and the display substrate 75. Each electrode 85 has a self-capacitance, which corresponds to a parasitic capacitance created by the electrode with respect to other conductors in the display (e.g., ground, conductive layer(s), and/or one or more other electrodes). For example, row electrode 85-r has a parasitic capacitance $C_{p2}$ and column electrode 85-c has a parasitic capacitance $C_{p1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance.

As shown, the touch screen 12 includes a plurality of layers 71-75. Each illustrated layer may itself include one or more layers. For example, dielectric layer 71 includes a surface protective film, a glass protective film, and/or one or more pressure sensitive adhesive (PSA) layers. As another example, the second dielectric layer 73 includes a glass cover, a polyester (PET) film, a support plate (glass or plastic) to support, or embed, one or more of the electrodes 85-c and 85-r, a base plate (glass, plastic, or PET), an ITO layer, and one or more PSA layers. As yet another example, the display substrate 75 includes one or more LCD layers, a back-light layer, one or more reflector layers, one or more polarizing layers, and/or one or more PSA layers.

A mutual capacitance (Cm_0) exists between a row electrode and a column electrode. When no touch is present, the self-capacitances and mutual capacitances of the touch screen 12 are at a nominal state. Depending on the length, width, and thickness of the electrodes, separation from the electrodes and other conductive surfaces, and dielectric properties of the layers, the self-capacitances and mutual capacitances can range from a few pico-Farads to 10's of nano-Farads.

FIG. 5 is a schematic block diagram of an example of capacitance of a touch screen with a touch from a pen 16. The pen 16 is capacitive coupled to the row and column electrodes proximal to the touch. When the pen 16 is touch by a person and is touching the touch screen, the person provides a path to ground such that the pen affects both the mutual capacitance and the self-capacitance. When the pen is not touched by a person, there is no path to ground and thus the pen or device only effects the mutual capacitance.

In addition, the pen 16 receives signals from the touch screen via the capacitance coupling to the screen. The signals transmitted by the pen to the touch screen are also through the capacitance coupling and affect the signals on the electrodes 85.

As an example, the device 14 is capacitively coupled to the touch screen of the computing device via capacitor Cx1 and/or capacitor Cx2. For example, the pen 16 is coupled to the touch screen via capacitor Cx1 or capacitor Cx2. For a pen 16 touch, the capacitance of Cx1 or Cx2 is about 50 femto-Farads. Depending on the area of the contact surface of the device, the capacitance of Cx1 and/or Cx2 will be in the range of 50 femto-Farads to 10 or more pico-Farads.

Due to the small capacitance of Cx1 and/or Cx2, the pen 16 generates an effective negative capacitance to enable the drive sense circuits (DSC) to detect the presence of the pen. In an embodiment, the effective negative capacitance is about—50 femto-Farads.

Figure 6:
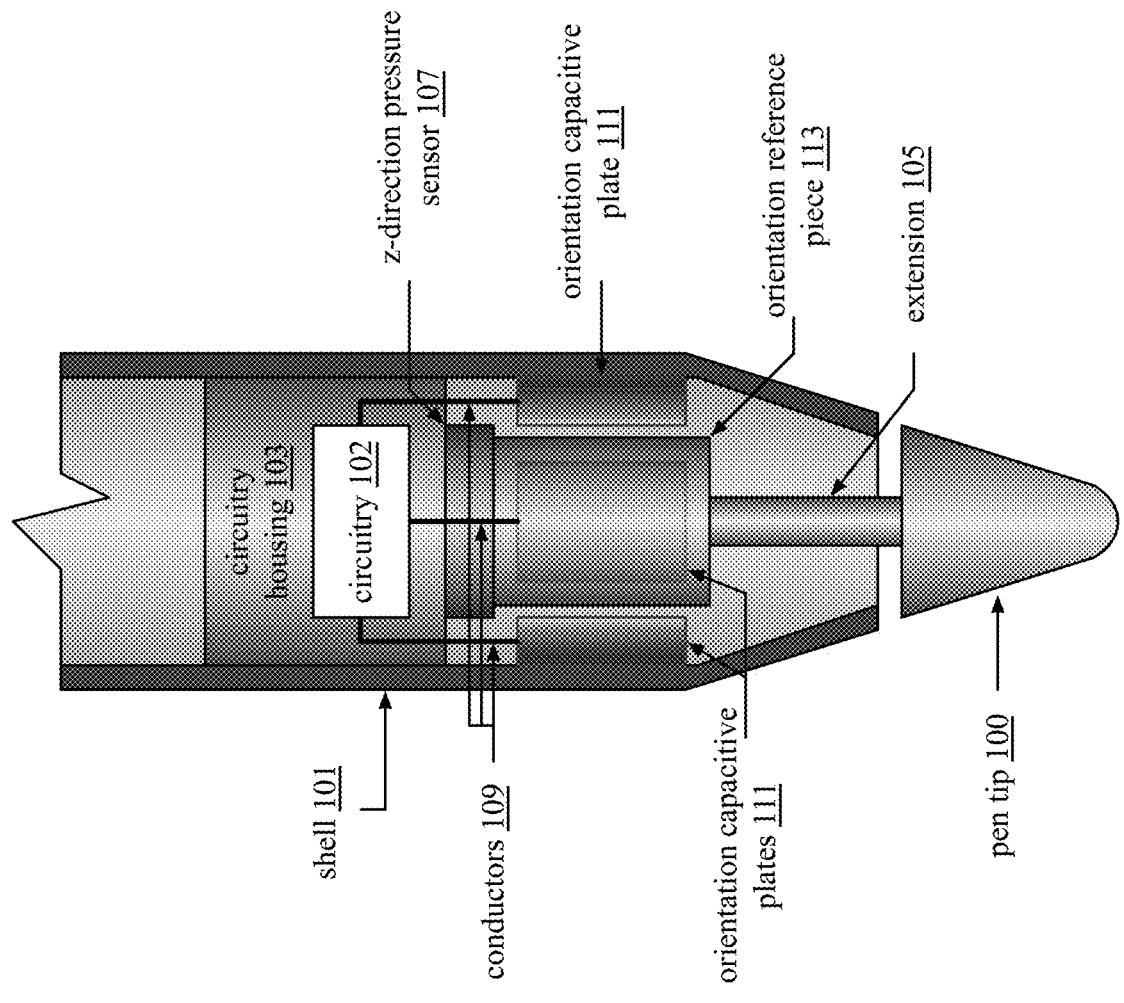
FIG. 6 is a schematic block diagram of an embodiment of an electronic pen in accordance with the present invention.

FIG. 6 is a schematic block diagram of an embodiment of an electronic pen 16 that includes a pen tip 100 and a shell 101. The shell 101 is a hollow tube (e.g., circular, square, triangle, etc. cross section) having a length and diameter of a conventional pen. The shell 101 further includes a tapered end towards the pen tip 100. The shell 101 includes a circuitry housing 103 in which circuitry 102 resides. The pen tip 100 is coupled to an extension piece 105, which mates with an orientation reference piece 113 or other mating piece within the shell 111.

The circuitry 102 includes one or more circuit boards and conductors 109, which are connected to a z-direction pressure sensor 107 and orientation capacitive plates 111. The orientation capacitive plates 111 are mechanically coupled to the shell 111 and form orientation capacitors with one or more capacitive plates within the orientation reference piece 113. The use of the orientation capacitors will be discussed with reference to one or more subsequent figures.

When the pen tip 100 is in contact with a touch screen, the z-direction pressure sensor 107 measures an amount of pressure. In an embodiment, the z-direction pressure sensor 107 is a capacitive diaphragm that, when compressed, changes capacitance. The change in capacitance corresponds to an amount of pressure. The change in capacitance is provided to the circuitry 102, which includes the change in capacitance in a signal that is transmitted to the touch screen via the pen tip 100.

Figure 7:
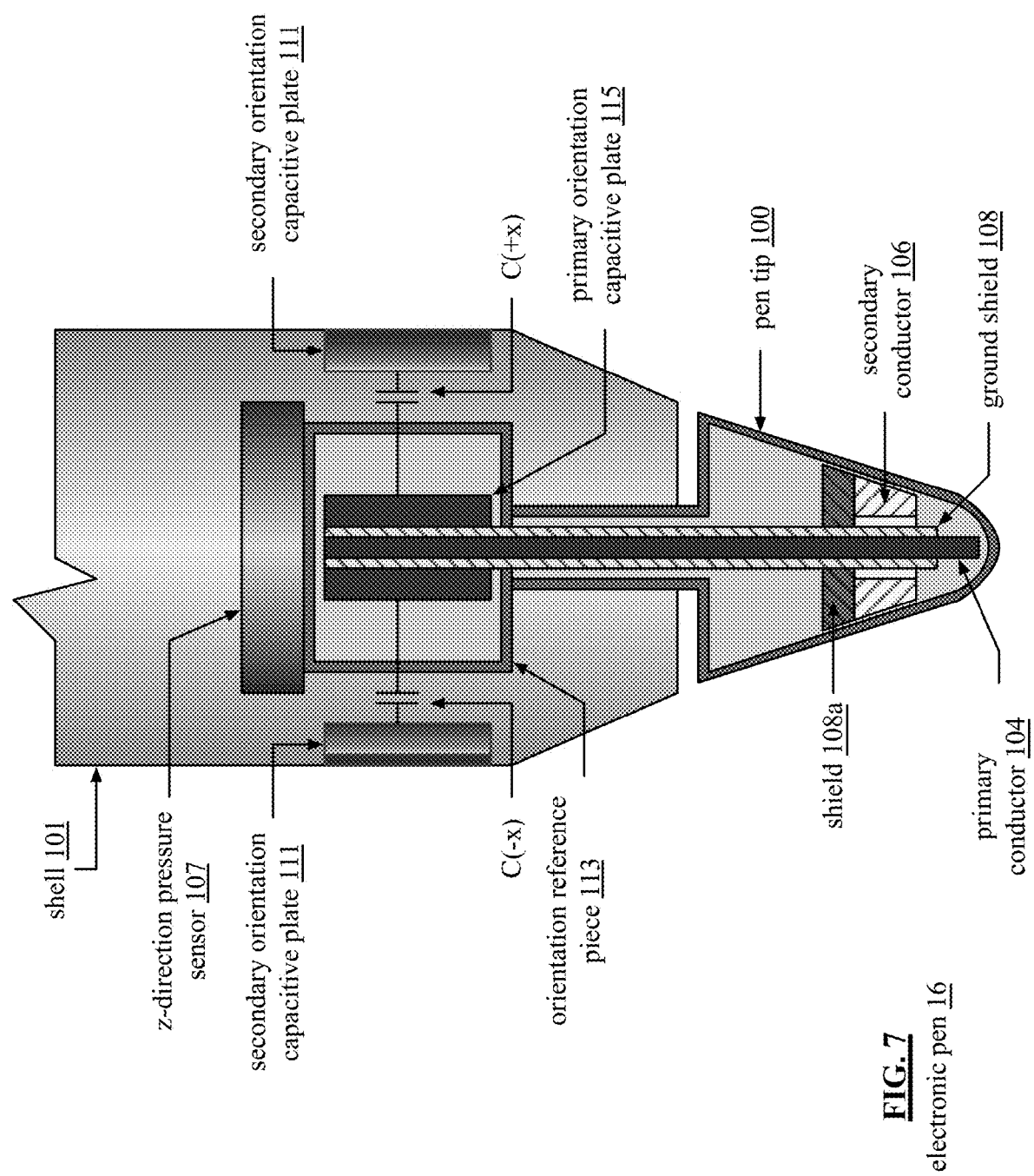
FIG. 7 is a cross section diagram of another embodiment of an electronic pen in accordance with the present invention.

FIG. 7 is a cross section diagram of another embodiment of an electronic pen 16 that includes the pen tip 100, the shell 101, secondary orientation plates 111, the z-direction pressure sensor 107, the orientation reference piece 113, and one or more primary orientation capacitive plates 115 (which is within the orientation reference piece 113). The secondary orientation plates 111 and the one or more primary orientation capacitive plates 115 form orientation capacitors. In this example, orientation capacitors (C−x and C+x) are shown. The electronic pen 16 would include at least one more orientation capacitor to create tilt orientation data (e.g., tilt of the pen).

A primary conductor 104, a secondary conductor 106, a ground shield 108, and a shield 108a are mounted within the pen tip 100. The primary conductor 104 functions to receive a signal from the touch screen 12 and to transmit a ring-back signal, which will be discussed with reference to one or more subsequent figures. The secondary conductor 106 transmits and/or receives other signals to and/or from the touch screen, which will be discussed with reference to one or more subsequent figures. The shielding 108 and 108a, which may be active or passive, provide electrical isolation between the primary conductor 104 and the secondary conductor 106, which helps to reduce and/or eliminate a ring-back blob (e.g., the image rendered on the touch screen is misaligned from the primary conductor due to capacitive coupling between the primary conductor and a conductive pen tip or conductive shell).

Figure 8:
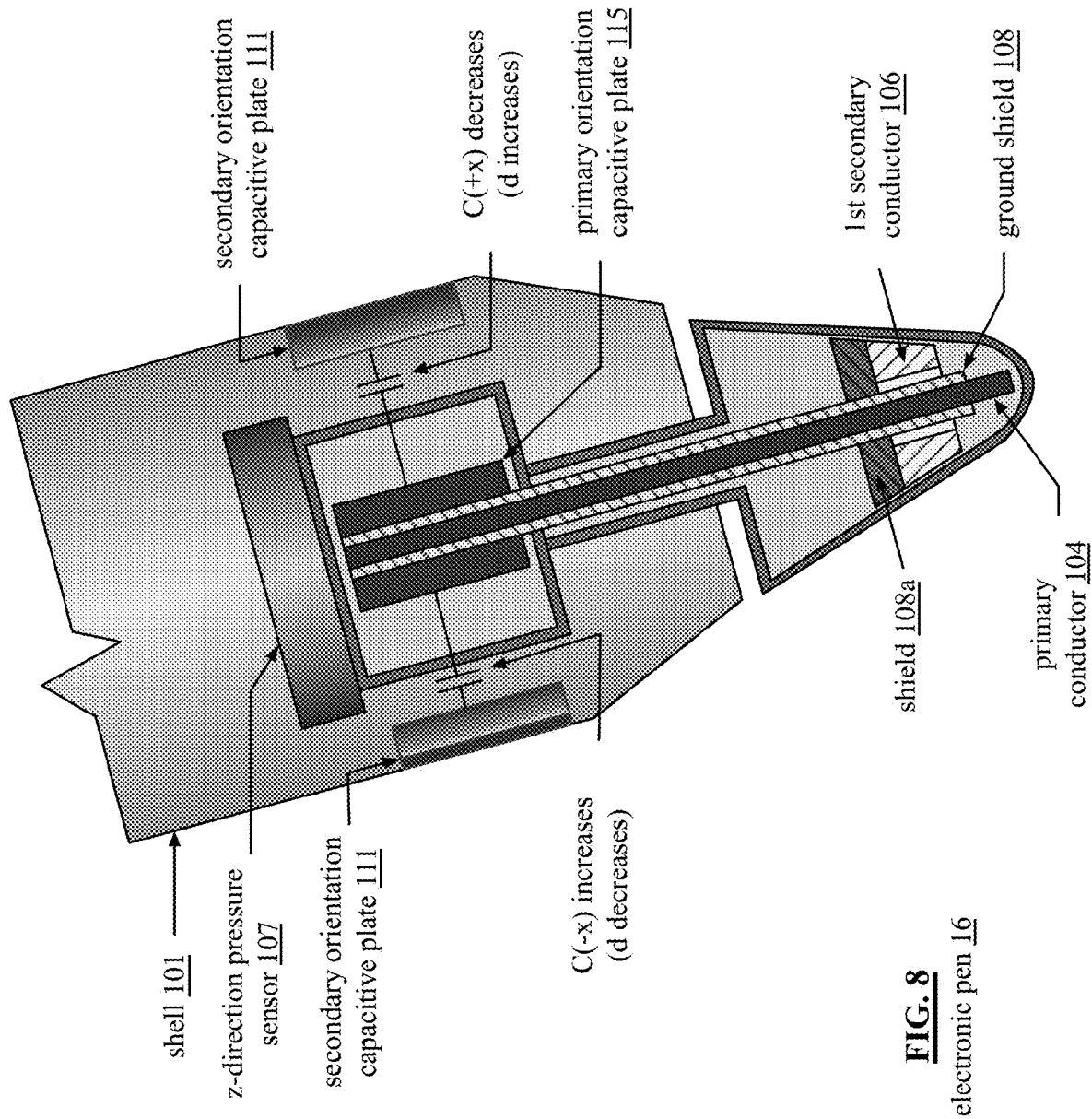
FIG. 8 is a cross section diagram of another embodiment of an electronic pen in accordance with the present invention.

FIG. 8 is a cross section diagram of another embodiment of an electronic pen 16 that is similar to FIG. 7, but tilted. With a tilt in the direction shown, the primary orientation capacitive plate 115 shifts within the shell 101. This shift decreases the gap between the primary orientation capacitive plate 115 with one of the secondary orientation capacitive plates 111, which increases the capacitance of orientation capacitor (C−x). The shift also increases the gap between the primary orientation capacitive plate 115 with one of the secondary orientation capacitive plates 111, which decreases the capacitance of orientation capacitor (C+x). Note that:

$$C = \varepsilon \frac{A}{d},$$

where C=capacitance, $\epsilon$=is permittivity of dielectric, A is the area of the plates, and d is the distance between the plates.

A similar change occurs with the other orientation capacitors. The capacitance values of the orientation capacitors and/or their change in capacitance is transmitted to the touch screen via the secondary conductor 106. This will be discussed in greater detail with reference to one or more subsequent figures.

Figure 9:
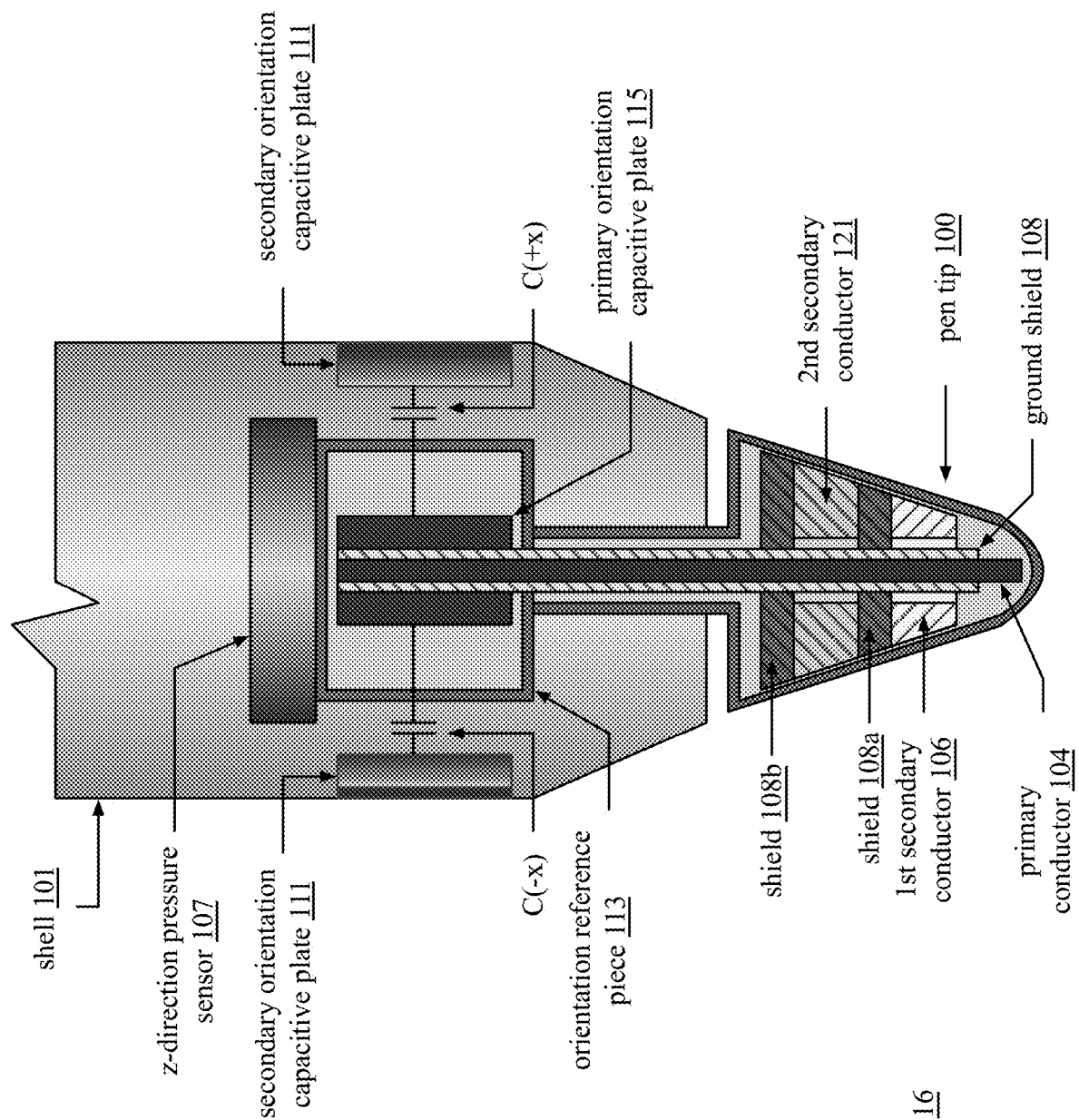
FIG. 9 is a cross section diagram of another embodiment of an electronic pen in accordance with the present invention.

FIG. 9 is a cross section diagram of another embodiment of an electronic pen 16 that is similar to FIG. 7 with an exception being that the pen tip 100 further includes a second secondary conductor 121 and another layer of shielding 108b. With a second secondary conductor 121, additional information can be transmitted to and/or received from the touch screen.

Figure 10:
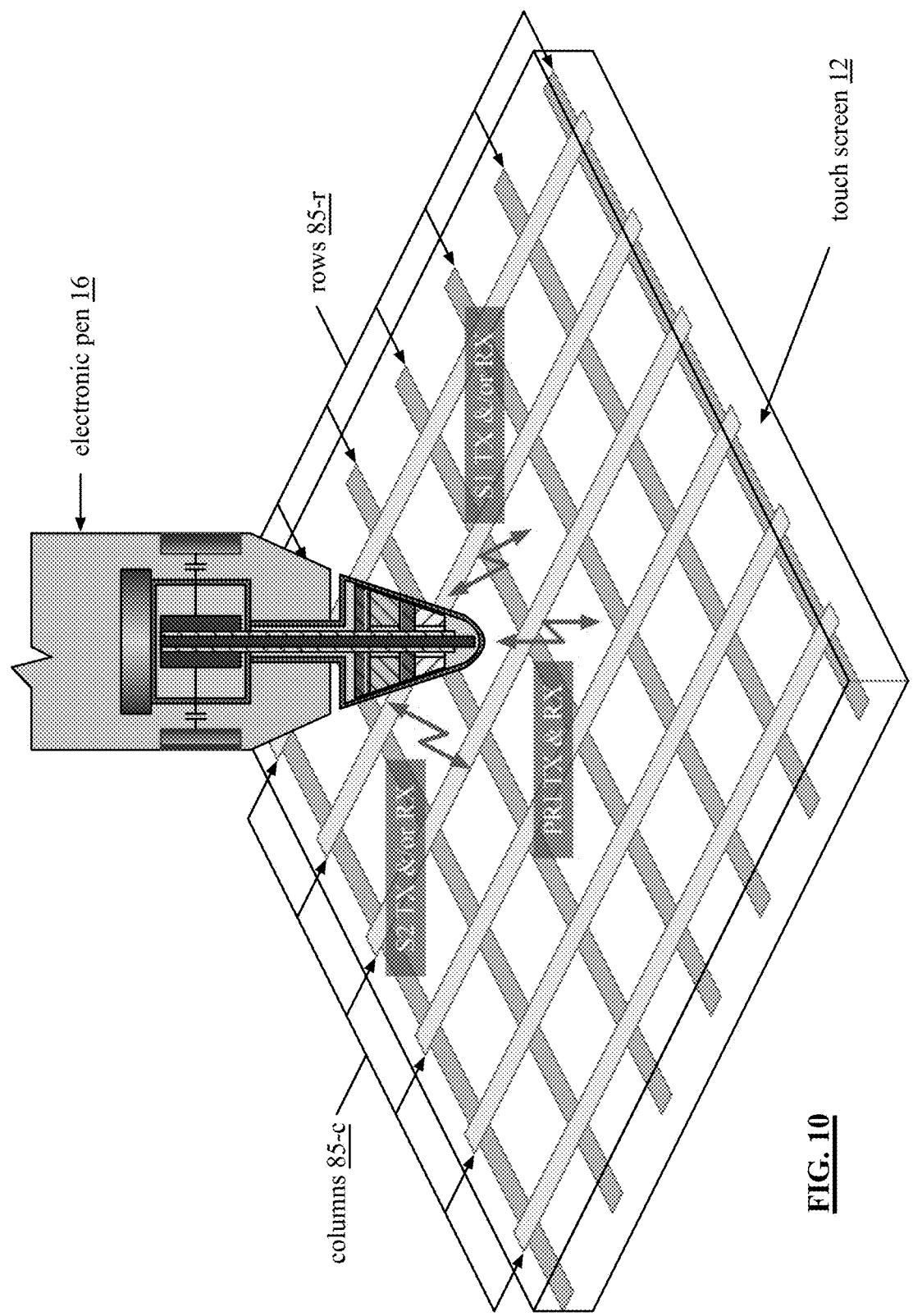
FIG. 10 is a schematic block diagram of an example of an electronic pen interfacing with a touch screen in accordance with the present invention.

FIG. 10 is a schematic block diagram of an example of an electronic pen 16 interfacing with a touch screen 12. The touch screen is shown to include a plurality of column electrodes 85-c and a plurality of row electrodes 85-r in, or on, one or more layers of the touch screen. The pen tip of the pen 16 includes the primary conductor, the $1^{st}$ secondary conductor, and the $2^{nd}$ secondary conductor.

In an example, the computing device transmits a self-signal (e.g., a sinusoidal signal at a first frequency) on at least some of the rows and columns of electrodes 85-c and 85-r. The self-signal allows the touch screen processing module 82 (FIGS. 2 and 3) to determine self-capacitance of the electrodes. An increase is self-capacitance of an electrode is indicative of a touch by the pen 16 being held by a person (e.g., the person provides a path to ground).

To increase the self-capacitance of an electrode, the pen 16 receives the self-signal of the electrode (e.g., PRI TX signal) via the primary conductor. The pen 16, via the circuitry, inverts and scales the self-signal to produce a ring-back signal. The pen 16, via the primary conductor, transmits the ring-back signal (e.g., PRI RX signal) to the touch screen. The ring-back signal effectively causes an increase in self-capacitance of the electrode, which is indicative of a touch.

In another example, the pen 16 transmits pen orientation information (e.g., S1 TX signal) via the $1^{st}$ secondary conductor. For example, x&y data from the orientation capacitors and z data from the z-direction pressure sensor. The pen orientation data is sent in a raw format (e.g., as raw data of capacitor values, change in capacitor values, a pressure value, etc.). The touch screen processing module 82 processes the raw data (e.g., pen orientation data) to determine tilt of the pen and pressure being applied to the touch screen. This information is further processed by the touch screen processing module 82 to produce a desire effect of pen usage. The touch screen processing module 82 can also transmit a signal (e.g., S1 RX) to the $1^{st}$ secondary conductor.

In yet another example, the pen 16 transmits pen functional data (e.g., S1 TX signal) via the $2^{nd}$ secondary conductor. For example, pen functional data includes one or more of color, erase, thickness, battery information, etc. The pen functional data is sent in a raw format (e.g., as analog signals, digital values, button presses, switch openings and closings, etc.). The touch screen processing module 82 processes the raw pen functional data to determine a desired function of the pen. This information is further processed by the touch screen processing module 82 to produce a desired effect of pen usage. The touch screen processing module 82 can also transmit a signal (e.g., S2 RX) to the $2^{nd}$ secondary conductor.

Figure 11:
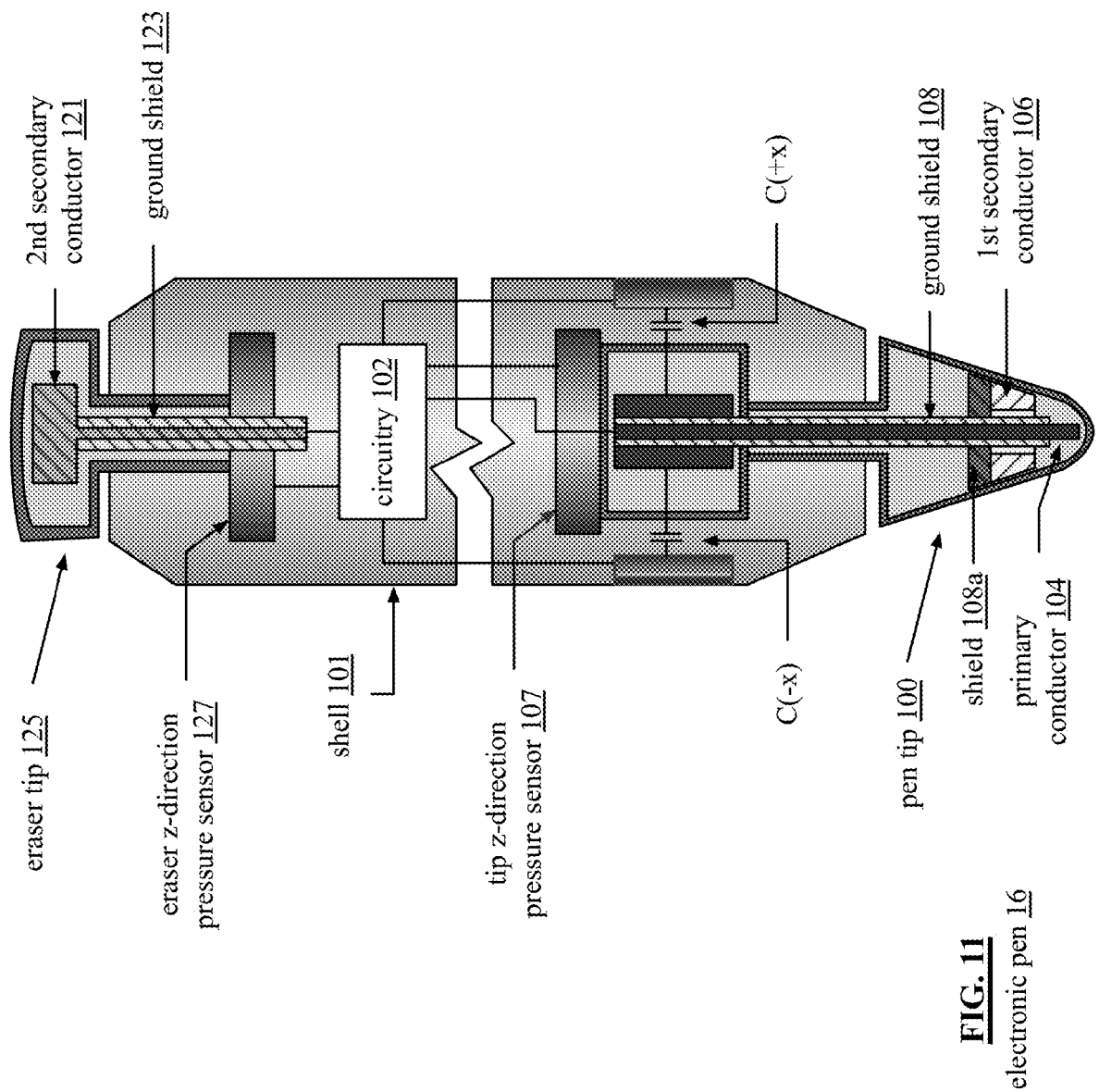
FIG. 11 is a cross section diagram of another embodiment of an electronic pen in accordance with the present invention.

FIG. 11 is a cross section diagram of another embodiment of an electronic pen 16 that includes the pen tip 100, the shell 101, and an eraser tip 125. The pen tip 100 includes the primary conductor 104, the $1^{st}$ secondary conductor 106, and the shielding 108 and 108a. The eraser tip 125 includes the $2^{nd}$ secondary conductor 121 and a ground shield 123. The shell 101 is mechanically coupled to the pen tip 100 and the eraser tip 125. The shell 101 also houses the circuitry 102, the orientation capacitors ($C_{-x}$, $C_{+x}$, $C_{-y}$, $C_{+y}$), a pen tip z-direction pressure sensor 107, and an eraser z-direction pressure sensor 127. The pen tip 100 and the orientation capacitors operate similarly to the pen of FIG. 7.

In this embodiment, the pen 16 includes an electronic eraser. The electronic eraser includes the eraser tip 125, the $2^{nd}$ secondary conductor 121, the ground shield 123, and a portion of the circuitry 102. In addition, the electronic eraser may further include the eraser z-direction pressure sensor 127 to provide an indication of pressure applied between the eraser tip 125 and the touch screen. Still further, the circuitry 102 may include an accelerometer and/or gyroscope to determine when the pen tip 100 or the eraser tip 125 is towards the touch screen. When the pen tip is towards the touch screen, the functionality of the eraser can be deactivated to save power. Similarly, when the eraser tip is towards the touch screen, pen functionality can be deactivated to save power.

When the electronic eraser is being used, the circuitry 102 generates an electronic eraser signal (e.g., a sinusoidal signal having a unique frequency). The circuitry 102 provides the electronic eraser signal to the $2^{nd}$ secondary conductor, which is the conduit to transmit the electronic eraser signal to the touch screen. The touch screen processing module 82 (FIGS. 2 and 3) processes the electronic eraser signal to erase data in an area corresponding to the touch of the $2^{nd}$ secondary conductor with the touch screen. Note that a touch includes physical contact and in close proximity for signals to be transmitting and received.

When the electronic eraser includes the eraser z-direction pressure sensor 127, the eraser z-direction pressure sensor 127 sends raw pressure data (e.g., a capacitance value, a change in capacitance value, a pressure value, etc.) to the circuitry 102. The circuitry 102 modulates the raw pressure data with the electronic eraser signal to produce a modulates eraser signal. The circuitry 102 sends the modulated eraser signal to the $2^{nd}$ secondary conductor transmits, which is the conduit to send the signal to the touch screen. The touch screen processing module 82 (FIGS. 2 and 3) processes the modulated eraser signal to erase data in an area corresponding to the touch and pressure of the $2^{nd}$ secondary conductor with the touch screen. Note that the $2^{nd}$ secondary conductor may be of any shape to emulate a conventional eraser shape.

Figure 12:
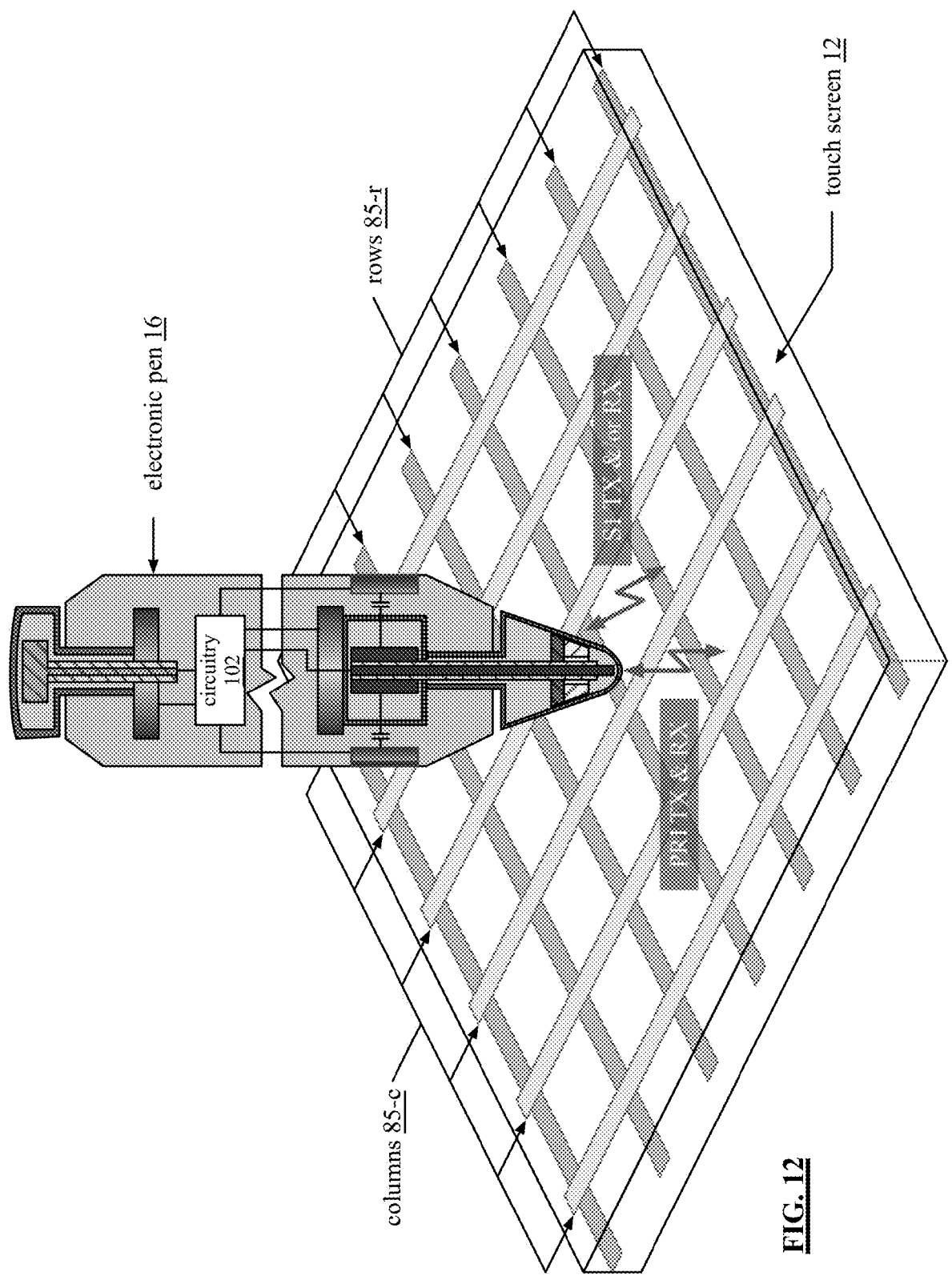
FIG. 12 is a schematic block diagram of another example of an electronic pen interfacing with a touch screen in accordance with the present invention.

FIG. 12 is a schematic block diagram of another example of the pen tip of an electronic pen 16 interfacing with a touch screen 12. The touch screen is shown to include a plurality of column electrodes 85-c and a plurality of row electrodes 85-r in, or on, one or more layers of the touch screen. The pen tip of the pen 16 includes the primary conductor and the $1^{st}$ secondary conductor; the eraser tip includes the $2^{nd}$ secondary conductor.

In an example of the pen tip interfacing with the touch screen, the computing device transmits a self-signal to the primary conductor as described with reference to FIG. 10. The circuitry 102 of the pen processes the self-signal to produce the ring-back signal. The pen 16, via the primary conductor, transmits the ring-back signal to the touch screen as described with reference to FIG. 10. With respect to the $1^{st}$ secondary conductor, the pen 16 transmits pen orientation information and/or pen functional data as described with reference to FIG. 10.

Figure 13:
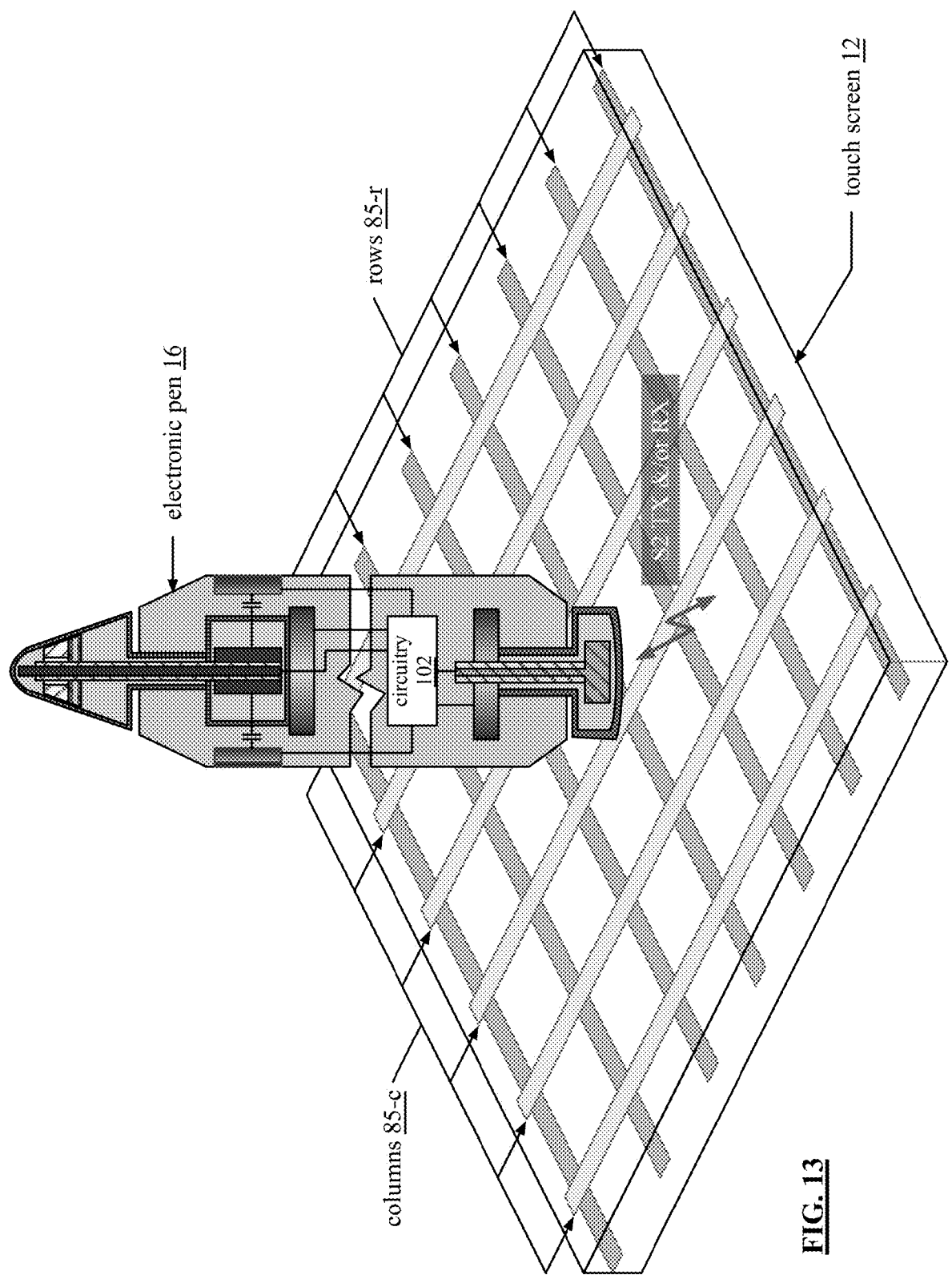
FIG. 13 is a schematic block diagram of another example of an electronic pen interfacing with a touch screen in accordance with the present invention.

FIG. 13 is a schematic block diagram of another example of the eraser tip of an electronic pen 16 interfacing with a touch screen 12. The touch screen is shown to include a plurality of column electrodes 85-c and a plurality of row electrodes 85-r in, or on, one or more layers of the touch screen. The pen tip of the pen 16 includes the primary conductor and the $1^{st}$ secondary conductor; the eraser tip includes the $2^{nd}$ secondary conductor.

In an example of the eraser tip interfacing with the touch screen, the circuitry 102 generates a signal as discussed with reference to FIG. 11. The signal is transmitted via the $2^{nd}$ secondary conductor to the touch screen, which is processed by the touch screen processing module 82 as also discussed with reference to FIG. 11.

Figure 14:
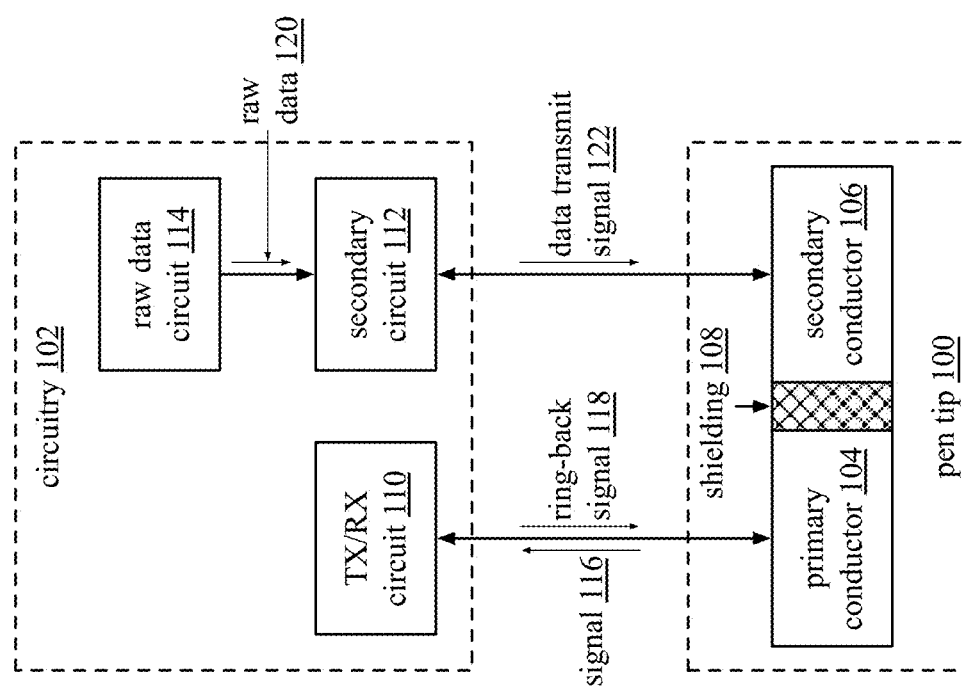
FIG. 14 is a schematic block diagram of an embodiment of an electronic pen in accordance with the present invention.

FIG. 14 is a schematic block diagram of an embodiment of an electronic pen 16 that includes the pen tip 100, the shell 101 (not shown in this figure), and circuitry 102. The circuitry 102 includes a transmit/receive (TX/RX) circuit 110, a secondary circuit 112, and a raw data circuit 114. Depending on the capabilities of the touch screen processing module 82 (FIGS. 2 and 3), the electronic pen 16 can function in a ring-back only mode (e.g., the TX/RX circuit is active, and the others are inactive) such that the pen functions as a touch device. In another mode, the TX/RX circuit, the raw data circuit, and the secondary circuit are active. In this mode, additional data regarding the pen's operation (e.g., pen's orientation with respect to the touch screen, power information, pen functions, etc.) can be conveyed between the pen 16 and the touch screen processing module.

In the ring-back mode, which may be the default start up mode, the TX/RX circuit 110 receives a signal 116 from the touch screen via the primary conductor 104. The TX/RX circuit 110 generates a ring-back signal 118 based on the signal 116. The TX/RX circuit 110 then transmits the ring-back signal 118 via the primary conductor 104 to the touch screen. Various embodiments of the TX/RX circuit 110 are discussed with reference to FIGS. 16 and 17.

The raw data circuit 114 may be implemented in a variety of ways to produce a variety of raw data. For example, the raw data circuit 114 is an orientation circuit that generates raw orientation data (e.g., capacitance values or changes in capacitance values that represent x-y tilt of the pen). As another example, the raw data circuit 114 is a pressure sensor that generates raw pressure data (e.g., a capacitance value, a change in capacitance value, an analog signal, etc.). As yet another example, the raw data circuit 114 is a pen function circuit that generates raw pen function data (e.g., pen color, pen thickness, power information (e.g., battery life, power consumption, battery charging, etc.), etc.). In general, raw data 120, whether in analog and/or digital form, requires further processing for it to have meaning for the pen and/or the computing device. To reduce power consumption of the pen, the processing of the raw data into meaningful data is done by the touch screen processing module 81 and/or the processing module 42 of the computing device 10 (FIGS. 1-3).

The secondary circuit 112 receive the raw data 120 from the raw data circuit 114 and up-converts it into a data transmit signal 122. For example, the secondary circuit 112 up-converts the raw data 120 by modulating it with a reference oscillation (e.g., a sinusoidal signal having a unique frequency). As another example, the secondary circuit 112 up-converts the raw data 120 by increasing the power of the raw data (e.g., amplifying voltage and/or current of the raw data). The secondary circuit 112 then transmits the data transmit signal 122 to the touch screen via the secondary conductor 106.

Figure 15:
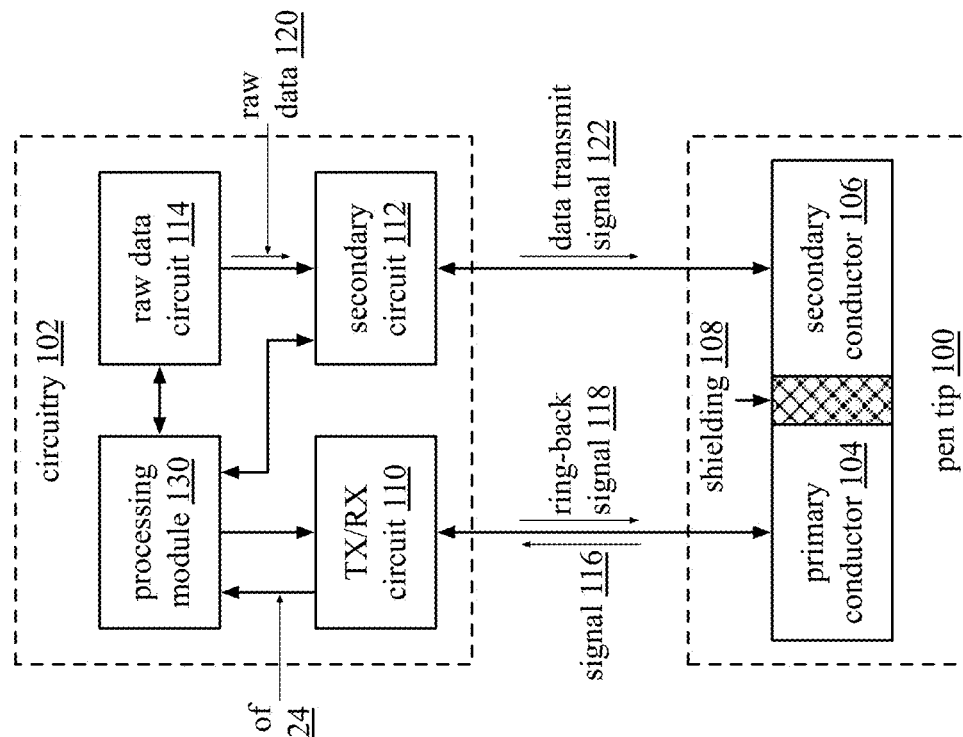
FIG. 15 is a schematic block diagram of another embodiment of an electronic pen in accordance with the present invention.

FIG. 15 is a schematic block diagram of another embodiment of an electronic pen 16 that includes the pen tip 100, the shell 101 (not shown in this figure), and circuitry 102. The circuitry 102 includes the transmit/receive (TX/RX) circuit 110, the secondary circuit 112, the raw data circuit 114, and a processing module 130. In this embodiment, the processing module 130 provides the pen 16 with more functional options.

As an example, the processing module 130 receives a digital representation 124 of the inversion of the signal 116. As will be discussed in greater detail with reference to FIG. 16 and/or 17, the TX/RX circuit 110 generates the ring-back signal 118 as a scaled and inverted version of the signal 116. The TX/RX circuit 110 converts the scaled and inverted version of the signal 118, which is an analog signal, into a digital signal (i.e., the digital representation 124 of the inversion of the signal 116).

In this example, a data message is embedded in the signal 116 by the touch screen processing module. The data message may be regarding a variety of matters. For example, the data message is a command requesting data (e.g., send orientation raw data, send z-direction raw data, send power data, etc.). As another example, the data message is regarding pen operation (e.g., turn on/off eraser, turn on/off secondary circuit, etc.).

The processing module 130 extracts the data message from the digital representation 124 of the inversion of the signal 116 and processes it. Depending on the nature of the data message, the processing module 130 generates a message response (e.g., a response to a request for data) or generates a pen command (e.g., turn on the eraser).

Figure 16:
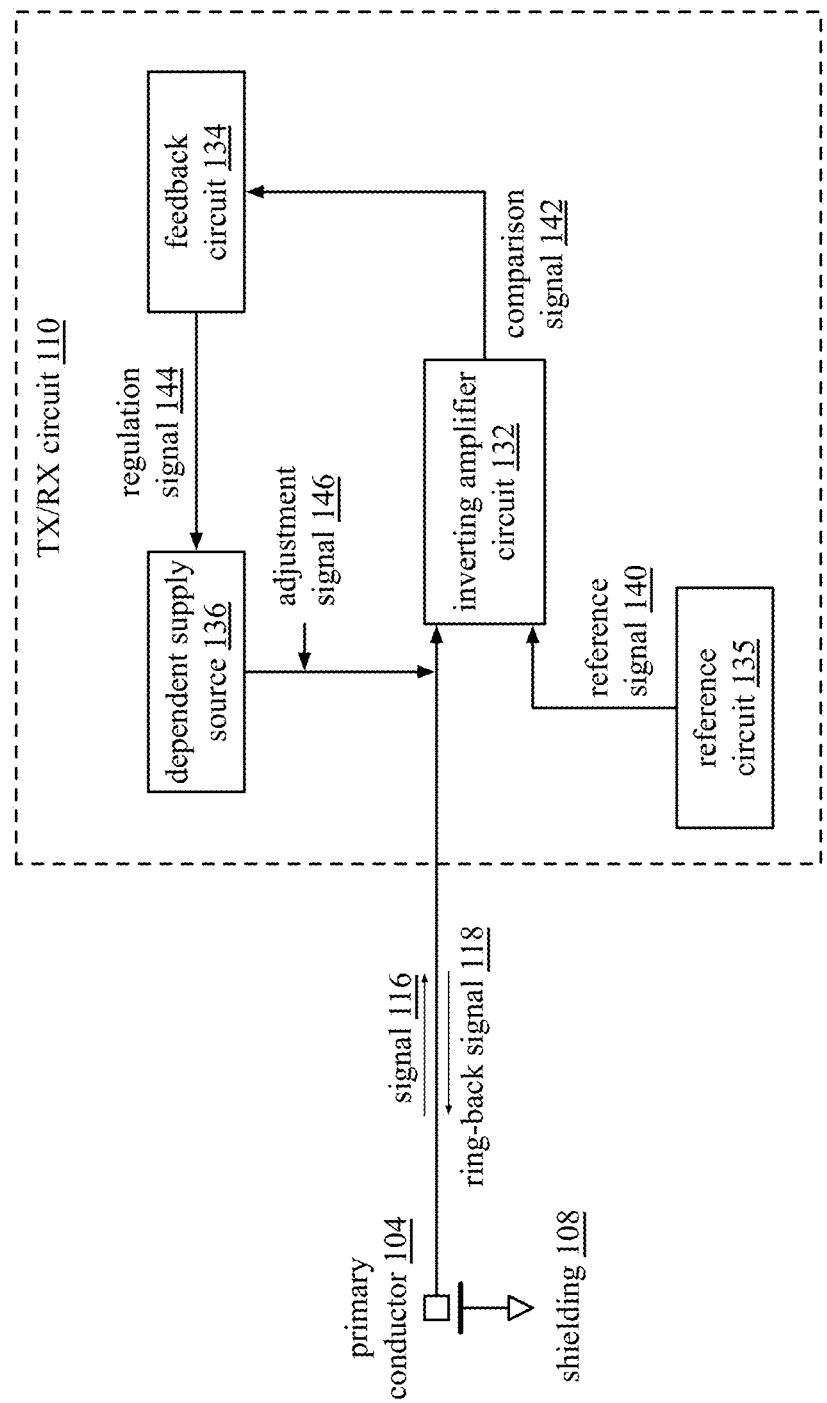
FIG. 16 is a schematic block diagram of an embodiment of a transmit-receive circuit of an electronic pen in accordance with the present invention.

FIG. 16 is a schematic block diagram of an embodiment of a transmit-receive (TX/RX) circuit 110 that includes an inverting amplifier circuit 132, a feedback circuit 134, a dependent supply source 136, and a reference circuit 135. The inverting amplifier circuit 132 may be implemented in a variety of ways. For example, the inverting amplifier circuit 132 is an inverting amplifier. As another example, the inverting amplifier circuit 132 is a non-inverting amplifier followed by an inverter.

In an example, an input of the inverting amplifier circuit 132 receives the signal 116 (e.g., a signal from the touch screen) via the primary conductor 104. Another input of the inverting amplifier circuit 132 receives a reference signal 140, which is generated by the reference circuit 135. In an embodiment, the reference signal 140 is a DC signal at a common mode voltage level. For example, if the inverting amplifier circuit 132 has rail voltages of Vdd and Vss, then the common mode voltage is about halfway between Vdd and Vss. As a specific example, when Vdd is 1 Volt and a Vss is −1 Volt, then the common mode voltage is 0 Volts. In this specific example, the signal 116 is effectively grounded to the pen 16.

From the input signals (e.g., signal 116 and the reference signal 140), the inverting amplifier circuit 132 generates a comparison signal 142. The comparison signal 142 is effectively a scaled and inverted version of the signal 116. The scaling of the inverted signal is based on the feedback circuit 134 and the dependent supply source 136 (e.g., a dependent current source and/or a dependent voltage source). In particular, the feedback circuit 134 (which may include one or more resistors and one or more capacitors to establish a gain and frequency response for the inverting amplifier circuit 132) generates a regulation signal 144 based on the comparison signal 142.

The dependent supply source 136 converts the regulation signal 144 into an adjustment signal 146. The dependent supply source 136 supplies the adjustment signal to the primary conductor 104 to produce the ring-back signal 118, which can be in the range of 100 mVp-p to 1 Vp-p or more.

Figure 17:
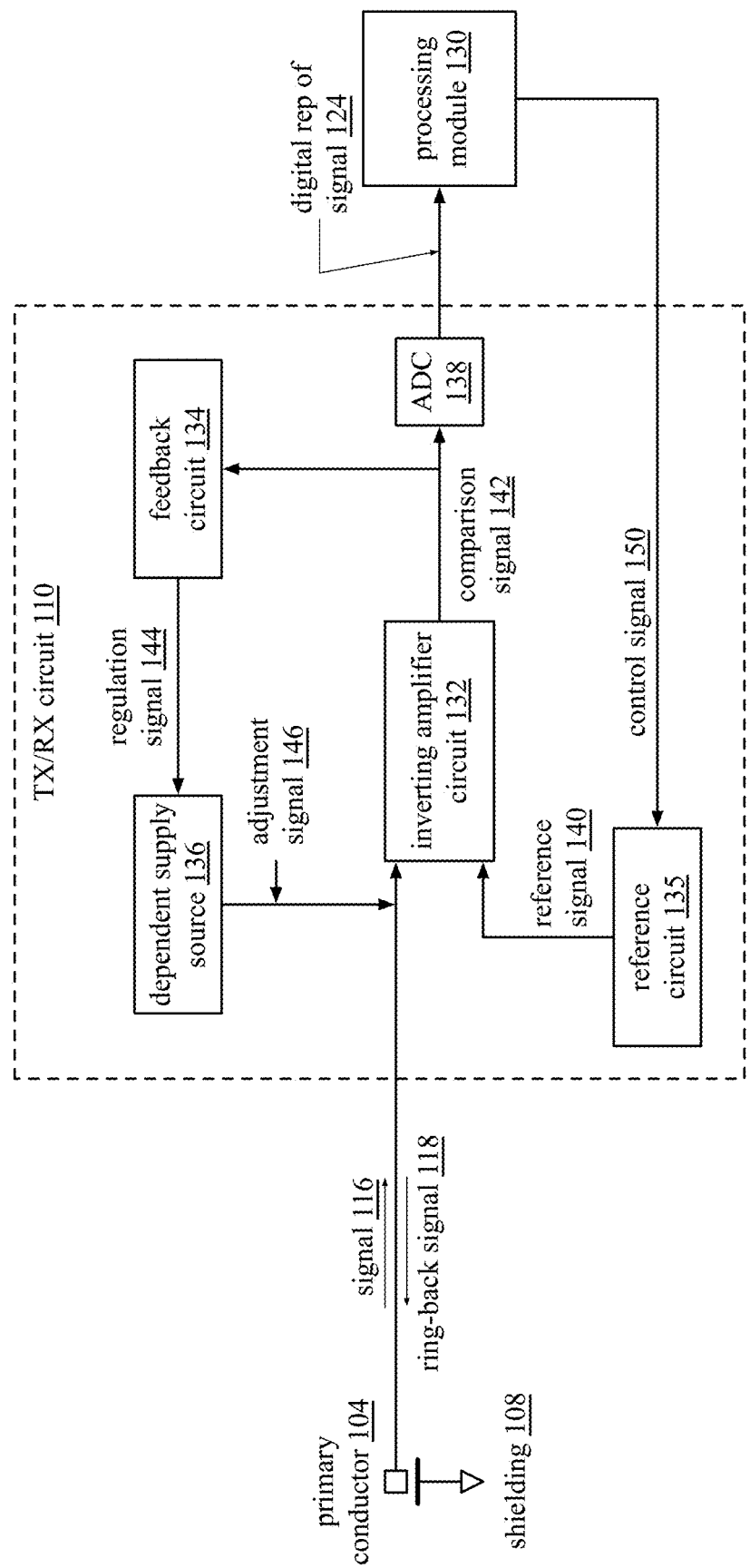
FIG. 17 is a schematic block diagram of another embodiment of a transmit-receive circuit of an electronic pen in accordance with the present invention.

FIG. 17 is a schematic block diagram of another embodiment of a transmit-receive (TX/RX) circuit 110 coupled to the processing module 130. The TX/RX circuit 110 includes the inverting amplifier circuit 132, the feedback circuit 134, the dependent supply source 136, and the reference circuit 135 as discussed with reference to FIG. 16. The TX/RX circuit 110 further includes an analog to digital converter (ADC) 138, which converts the comparison signal 142 into the digital representation 124 of the signal 116.

As discussed with reference to FIG. 15, the signal 116 may include an embedded data message. The processing module 130 extracts the data message from the signal in a variety of ways. For example, the processing module 130 demodulates the signal 116 to extract the data message. As another example, the processing module 130 filters (e.g., low pass, band pass, or high pass) the signal 116 to extract the data message.

Figure 19:
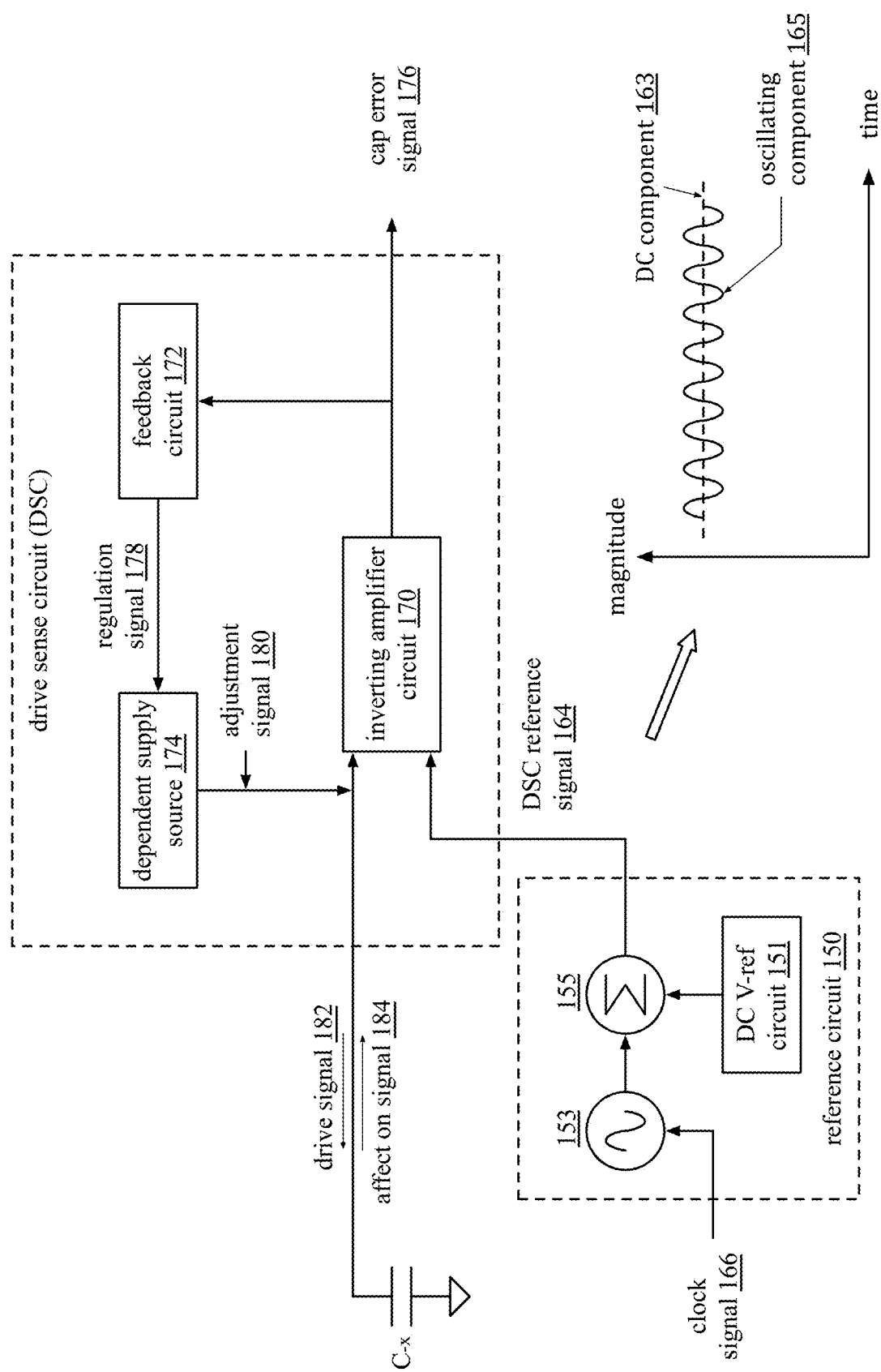
FIG. 19 is a schematic block diagram of an embodiment of a reference circuit and a drive sense circuit (DSC) of a raw data circuit in accordance with the present invention.

The processing module 130 is further operable to generate a control signal 150, which it provides to the reference circuit 135. In an example, the control signal 150 is a setting for the reference circuit 135 to set the reference signal 140 to a specific DC level (e.g., common mode voltage, a voltage above common mode, a voltage below common mode). In another example, the control signal 150 is a setting for the reference circuit 135 to generate the reference signal 140 to include an DC component and an AC component (an example is shown in FIG. 19).

As yet another example, the control signal 150 includes a message response created by the processing module 130. The reference circuit 135 includes the message response in the reference signal 140 such that the message response is included in the ring-back signal 118. For a more detailed discussion of communicating data via a structure similar to the TX/RX circuit see co-pending patent application entitled, "LOW VOLTAGE DRIVE CIRCUIT WITH BUS ISOLATION AND METHODS FOR USE THEREWITH", having a serial number of Ser. No. 16/246,772, and a filing date of Jan. 14, 2019.

Figure 18:
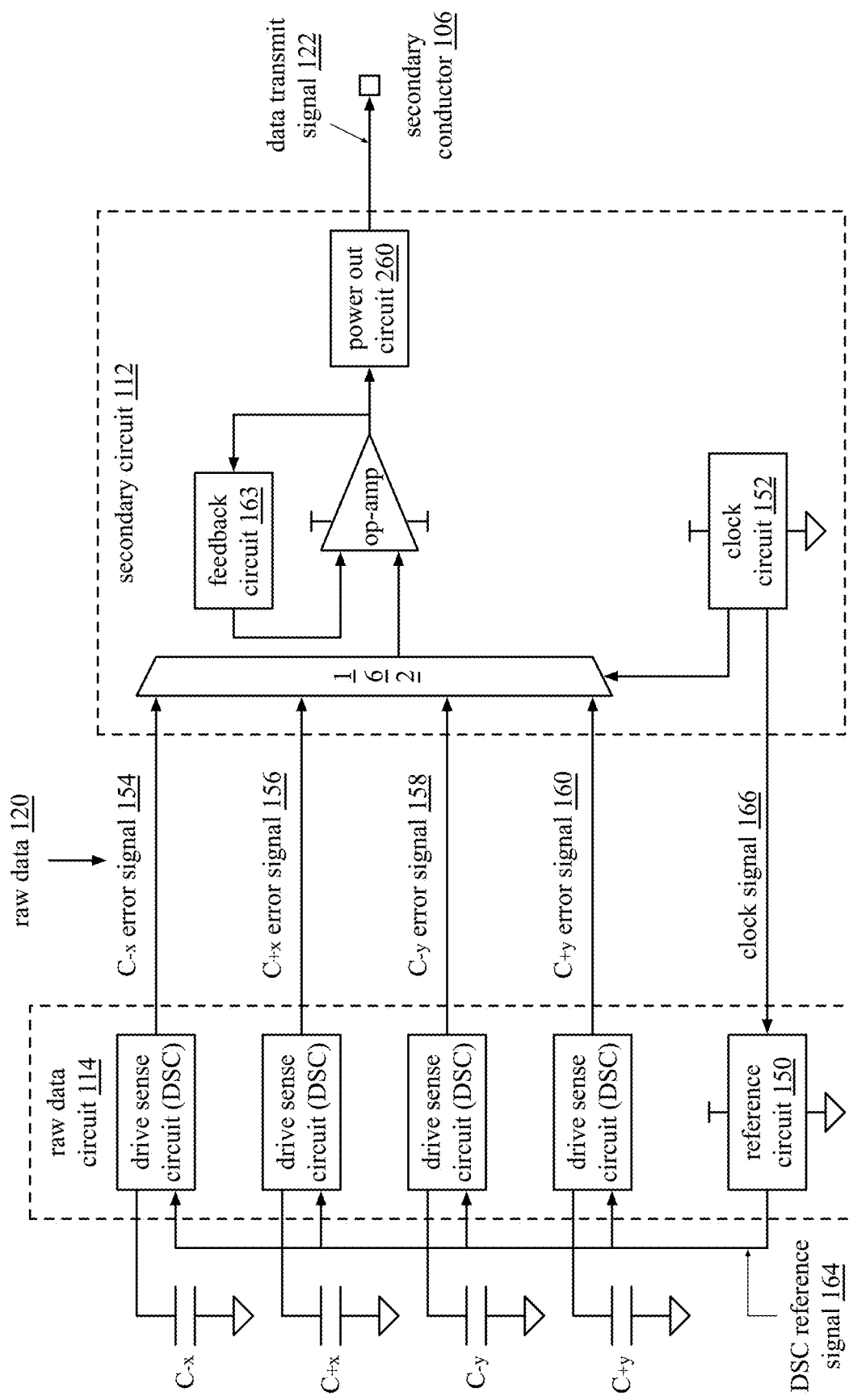
FIG. 18 are schematic block diagrams of an embodiment of a raw data circuit and a secondary circuit of an electronic pen in accordance with the present invention.

FIG. 18 is a schematic block diagram of an embodiment of a raw data circuit 114 and a secondary circuit 112 of an electronic pen 16. The raw data circuit 114 includes a plurality of drive sense circuits (DSC) and a reference circuit 150; examples of each are discussed with reference to FIG. 19. The drive sense circuits are coupled to a plurality of orientation capacitors ($C_{-x}$, $C_{+x}$, $C_{-y}$, and $C_{+y}$). While four DSCs and four orientation capacitors are shown, there could be more or less than four of each.

The secondary circuit 112 includes a multiplexer 162, a clock circuit 152, an operational amplifier (op-amp), a feedback circuit 163, and a power output circuit 260. An example of a power output circuit 260 is discussed with reference to FIG. 29. Note that the clock circuit 152 may be a stand-alone clock circuit or it may be implemented via the processing module 130.

In an example, the drive sense circuits (DSCs) provides a signal corresponding to the DSC reference signal 164 to their respective capacitors. The capacitors will affect the signal, which is indicative of the capacitor's impedance based on the equation:

$$v = \frac{1}{C}\int i*dt.$$

The DSCs generate an error signal 154-160 that are based on the detected effect on the signal. The multiplexor 162 receives the error signals 154-160 and outputs them in a serial fashion based on a select signal from the clock circuit 152. To ensure alignment of the error signals 154-160 with the selection of one of them by the multiplexer 162, the clock circuit provides a clock signal 166 to the reference circuit 150. The reference circuit 150 uses the clock signal 166 to generate the DSC reference signal 164.

Depending the feedback circuit 163, the op-amp is a unity gain op-amp (e.g., doesn't amplify the signal) or a non-unity gain op-amp (e.g., amplifies the signal). The op-amp receives the output of the multiplexer 162 and amplifies it in accordance with the feedback circuit 163 to produce an output signal. The power out circuit 260 up-converts the output signal to produce the data transmit signal 122. Note that the op-amp may be an inverting op-amp or a non-inverting op-amp.

FIG. 19 is a schematic block diagram of an embodiment of a reference circuit 150 and a drive sense circuit (DSC) of a raw data circuit 114. The drive sense circuit (DSC) includes an inverting amplifier circuit 170, a feedback circuit 172, and a dependent supply source 174. The reference circuit 150 includes a DC voltage reference circuit 151, an oscillation generating circuit 153, and a summing circuit 155. The oscillation generating circuit 153 may be one or more of a crystal oscillator, a phase locked loop, a voltage controlled oscillator, a number controlled oscillator, a digital frequency synthesizer, etc.

In an example, the oscillation generating circuit 153 generates an oscillating component 165 based on the clock signal 166. The DC voltage reference circuit 151 generates a DC component 163 (e.g., a common mode voltage from Vdd and Vss, or other voltage level). The summing circuit 155 sums the DC component 163 with the oscillating component 165 to produce the DSC reference signal 164. Note that the frequency of the oscillating component may be in the range of 10's of Kilo-Hertz to Giga-Hertz depending on the size of the orientation capacitors.

The inverting amplifier circuit 170 receives, as inputs, the DSC reference signal 164 and adjustment signal 180 (which is also the drive signal 182 and includes the effect of the signal 184). The inverting amplifier circuit 170, the feedback circuit 172, and the dependent supply source 174 operate to keep the inputs of the inverting amplifier circuit 170 substantially equal. To do this, the inverting amplifier circuit 170 generates a capacitor error signal 176; the feedback circuit 172 generates a regulation signal 178 from the capacitor error signal 176; and the dependent supply source 174 generates the adjust signal 180. For a variety of implementations of the drive sense circuit and a more detailed discussion of its functionality, see co-pending patent application entitled, "DRIVE SENSE CIRCUIT WITH DRIVE-SENSE LINE", having a serial number of Ser. No. 16/113,379, and a filing date of Aug. 27, 2018.

Figure 20:
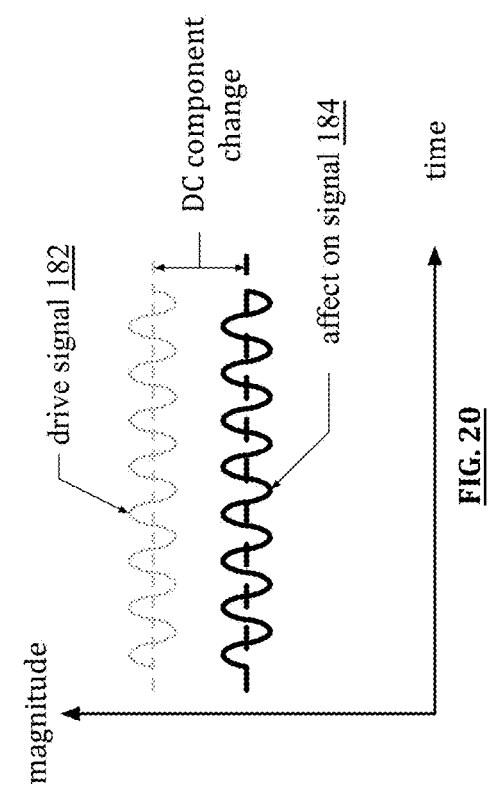

FIGS. 20-23 are diagram of examples of drive signals and effects on the drive signal 182 of FIG. 19. FIG. 20 is a diagram of example of the drive signal in which the electrical characteristic or change in electrical characteristic of the capacitor is affecting the signal. In this example, the effect of the electrical characteristic or change in electrical characteristic of the capacitor reduced the DC component but had little to no effect on the oscillating component. For example, the electrical characteristic is resistance. In this example, the resistance or change in resistance of the capacitor decreased the signal, inferring an increase in resistance for a relatively constant current.

Figure 21:
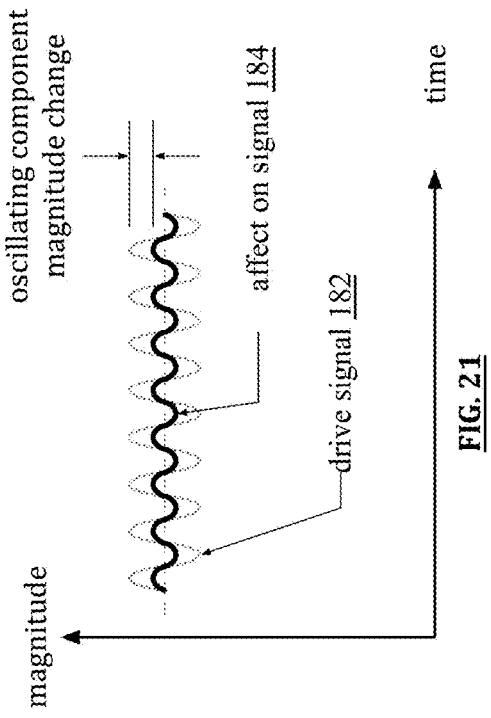
FIGS. 20-23 are diagram of examples of drive signals and effects on the drive signals in accordance with the present invention.

FIG. 21 is a diagram of another example of the signal in which the electrical characteristic or change in electrical characteristic of the capacitor is affecting the signal. In this example, the effect of the electrical characteristic or change in electrical characteristic of the capacitor reduces magnitude of the oscillating component but had little to no effect on the DC component. In this example, the impedance or change in impedance of the capacitor decreased the magnitude of the oscillating signal component, inferring an increase in impedance for a relatively constant current.

Figure 22:
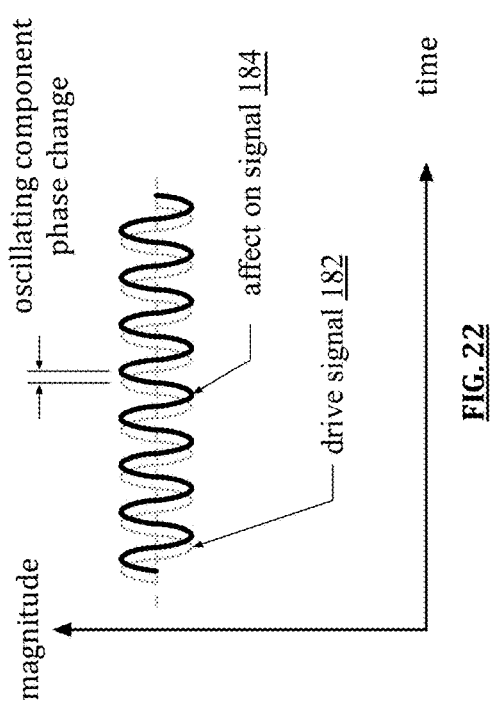

FIG. 22 is a diagram of another example of the signal in which the electrical characteristic or change in electrical characteristic of the capacitor is affecting the signal. In this example, the effect of the electrical characteristic or change in electrical characteristic of the capacitor shifted frequency of the oscillating component but had little to no effect on the DC component. In this example, the reactance or change in reactance of the capacitor shifted frequency of the oscillating signal component, inferring an increase in reactance (e.g., capacitor is functioning as an integrator or phase shift circuit).

Figure 23:
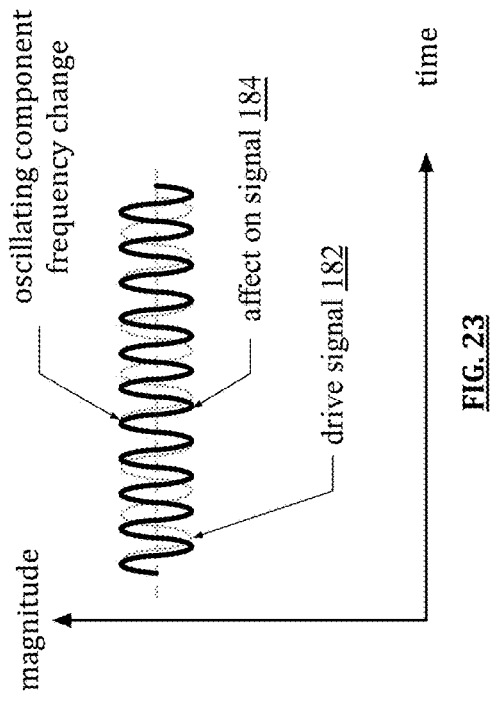

FIG. 23 is a diagram of another example of the signal in which the electrical characteristic or change in electrical characteristic of the capacitor is affecting the signal. In this example, the effect of the electrical characteristic or change in electrical characteristic of the capacitor changes the frequency of the oscillating component but had little to no effect on the DC component.

Figure 24:
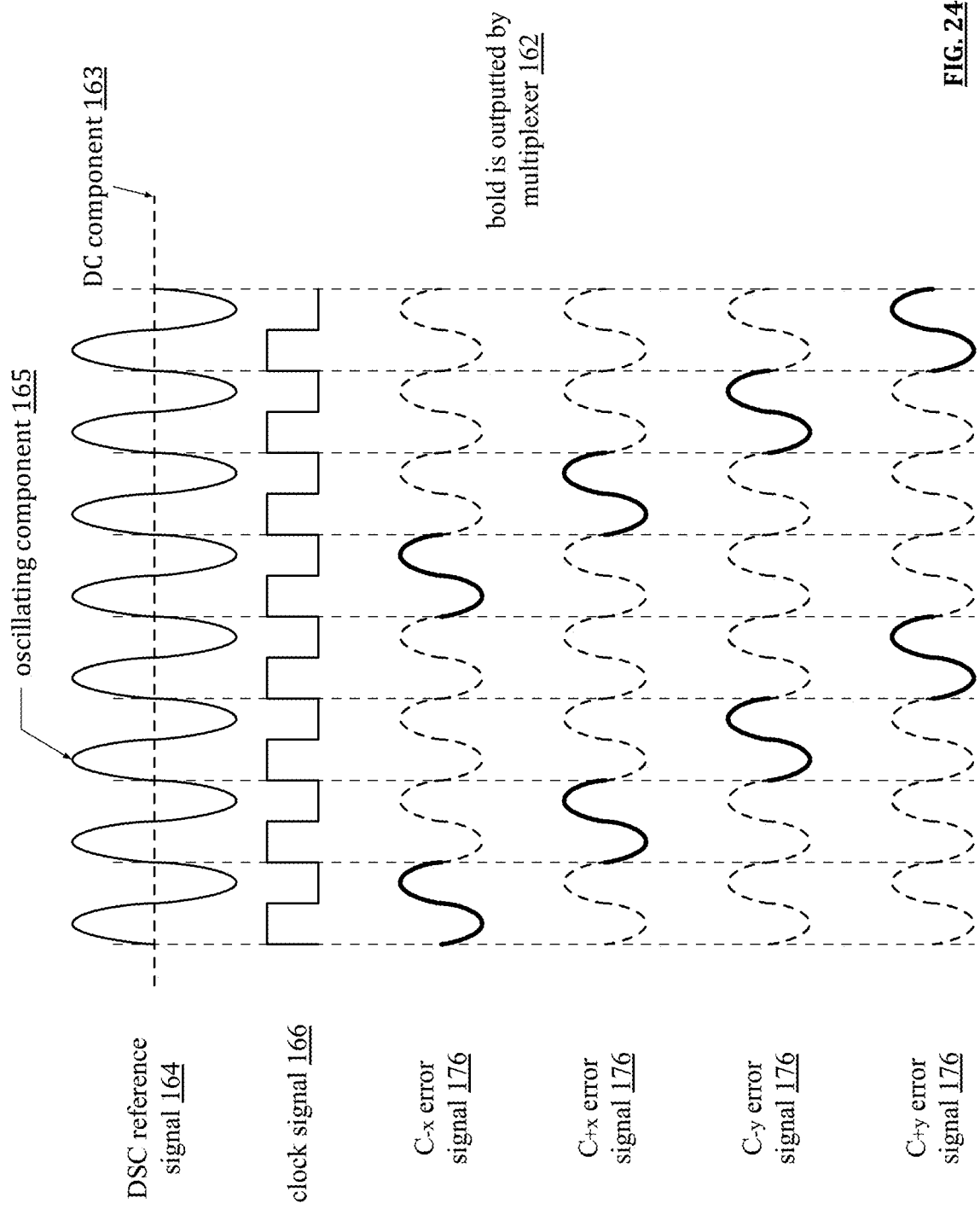
FIG. 24 is a diagram of an example of orientation signals in accordance with the present invention.

FIG. 24 is a diagram of an example of orientation signals that are produced by the raw data circuit 114 and outputted by the secondary circuit 112 of FIG. 18. In this example, the DSC reference signal 164 includes an oscillating component 163 that is in-sync and having the same frequency as the clock signal 166. Note that the frequency of the clock signal 166 may be greater or less than the frequency of the oscillating component 163.

In this example, the clock signal 162 is the selection signal for the multiplexer 162 of the secondary circuit 112. Thus, as each DSC generates their respective error signal 176, one cycle from the one of the signals is outputted by the multiplexer 162 (which is shown as the bolded cycle of each error signal). Note that more than one cycle of each error signal 176 may be outputted via the multiplexer 162.

Figure 25:
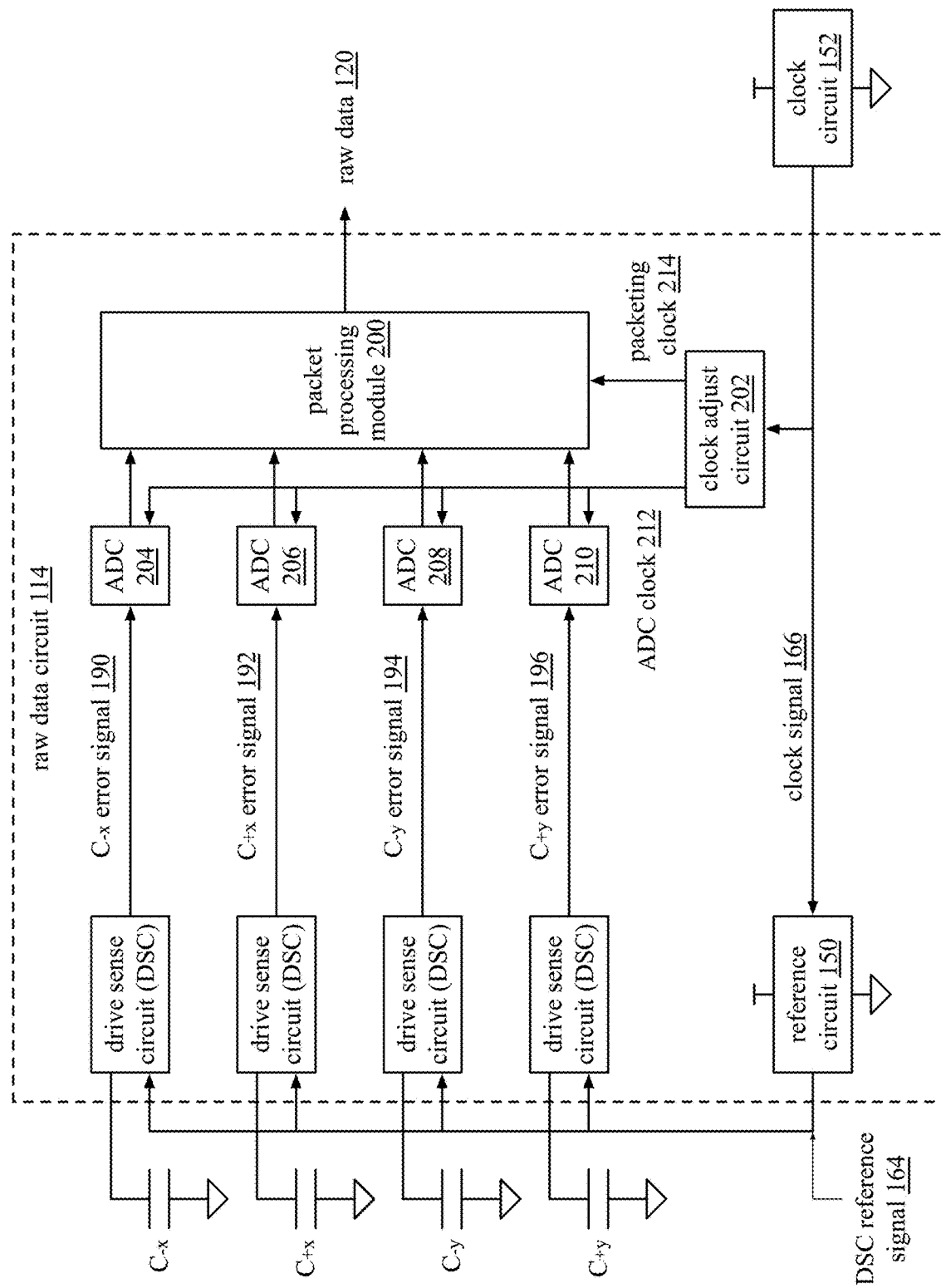
FIG. 25 is a schematic block diagram of an embodiment of a raw data circuit in accordance with the present invention.

FIG. 25 is a schematic block diagram of an embodiment of a raw data circuit 114 that includes a plurality of drive sense circuits (DSCs), the reference circuit 150, a plurality of analog to digital converters (ADC) 204-210, a clock adjust circuit 202, and a packet processing module 200. The reference circuit 150 receives a clock signal 166 from the clock circuit 1520 to produce the DSC reference signal 164 as previously discussed. The drive sense circuits operate as previously discussed to produce capacitor error signals 190-196.

The ADCs 204-210 convert the capacitor error signals 190-196 into digital error signals in accordance with an ADC clock signal 212, which is generated by the clock adjust circuit 202 based on the clock signal 166. The packet processing module 200 combines the digital error signals into the raw data 120 in accordance with a packeting clock 214, which is generated by the clock adjust circuit 202 based on the clock signal 166. The rates of the ADC clock 212 and the packeting clock 214 are dependent on the desired data rate and the bit resolution of the digital error signals. For example, if the desired data rate is 6.4 Kilo-bits-per-second (Kbps) and the bit resolution of the digital error signals is 16 bits, then 64 bits of information is produced each cycle through the four digital error signals. At a 6.4 Kbps rate, 100 samples of the digital error signals are taken per second. The ADC clock 212 and the packeting clock 214 are set accordingly.

Figure 26:
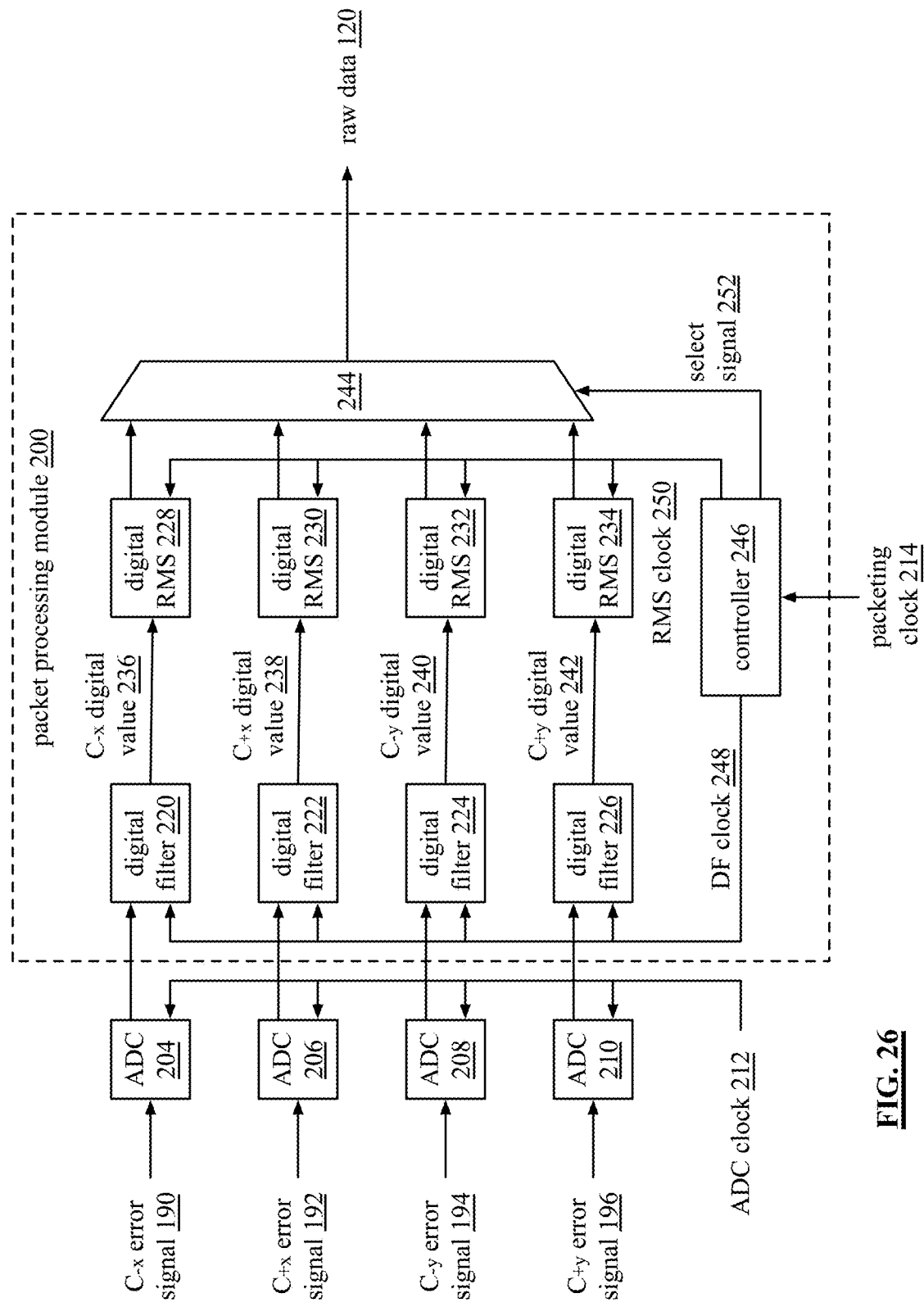
FIG. 26 is a schematic block diagram of an embodiment of a packet processing module of a raw data circuit in accordance with the present invention.

FIG. 26 is a schematic block diagram of an embodiment of a packet processing module 200 of a raw data circuit 114 of FIG. 25. The packet processing module 200 includes a plurality of digital filters 220-226, a plurality of optional digital RMS circuits 228-234, a multiplexer 244, and a controller 246. The digital filters 220-226 filter the output of their respective ADCs 204-210 in accordance with a digital filter (DF) clock signal 248, which is produced by the controller 246. For example, of an ADC is a 1-bit sigma-delta modulator, then the corresponding digital filter is a decimation or comb filter to produce a digital capacitance value (e.g., a digital value corresponding to the capacitor error signal 190-196).

The digital RMS (root-mean-square) circuits 228-234, if included, convert their respective digital value 228-234 into a digital RMS value in accordance with an RMS clock signal 250, which is produced by the controller 246. The multiplexer 244 outputs the digital RMS values in accordance with a select signal 252, which is produced by the controller 246. In this manner, digital raw data 120 is sent to the touch screen processing module for further processing.

FIG. 27 is a schematic block diagram of an embodiment of a secondary circuit 112 of an electronic pen 16 receiving raw data 120 from a raw data circuit 114. The secondary circuit 112 includes a digital to analog circuit 150, an operational amplifier (op-amp) a power output circuit 260, and a feedback circuit 152. The digital to analog circuit 150 includes an analog to digital converter and may further include additional digital filtering and/or a buffer. An embodiment of the op-amp and feedback circuit 150 is shown in FIG. 28 and an embodiment of the power output circuit 260 is shown in FIG. 29, both will subsequently be discussed.

In this embodiment, the raw data 120 is digitized, as previously discussed, and is received in data frames. A frame of raw data includes a header section, a data section, and may further include a footer section. The header section includes a unique binary pattern such that it is recognizable as the header. For example, the header includes 16 bits, the first 8 bits are logic ones and the second 8 bit are logic zeros. The data section may be partitioned in bit or byte size to correspond to the data being received. For example, if the data being received is the digital values of the four orientation capacitors of FIG. 26 and each digital value is 8 bits, then the data section is divided into four sections of 8 bits per section.

The footer section of a data frame is optional. If included, the footer section includes a unique bit pattern such that it is recognized as the footer section. For example, the footer section is 16 bits; the first 8 bits are logic zero and the second 8 bits are logic one. The footer section can be omitted if the size of the data section is known, which can be done in a variety of ways. For example, the header section includes a frame size field that indicates the size of the frame and/or of the data section. As another example, the number of data sections and their respective bit sizes is known, thus the size of the data section is readily determined.

In an example of operation, the digital to analog circuit 150 converts the raw data 120 into analog raw data 154. The op-amp, which may be an inverting op amp or a non-inverting op amp, amplifies the analog raw data 154 in accordance with the gain provided by the feedback circuit 152. The power out circuit 260 up-converts the amplified raw data to produce the data transmit signal 120. As an example, the power out circuit 260 up-convers the amplified raw data by increasing the voltage and/or current of the amplified raw data. As another example, the power out circuit 260 modules the amplified raw data with a carrier signal to produce the data transmit signal 120.

FIG. 28 is a schematic block diagram of an embodiment of an operational amplifier circuit (op amp) and feedback circuit 152 of FIG. 27 (collectively an operational amplifier circuit). The feedback circuit 152 includes the capacitor (C) and resistors R1 and R2. The values of R1, R2, and C establish the frequency response for the operational amplifier circuit. For example, a ratio between R1 and R2 establishes the gain of the circuit and R-C time constant of R1/R2 and C establishes the corner frequency.

In an example, the operational amplifier circuit amplifies the analog raw data 154 based on the frequency response to produce a data signal 123. Since the operational amplifier circuit is inverting, where the data signal is an inverting and amplified version of the analog raw data 154.

FIG. 29 is a schematic block diagram of an embodiment of a power output circuit 260 that includes a biasing transistor and an inverting & amplifying transistor, which are high voltage transistors. The biasing transistor's gate is coupled to a bias voltage, its drain is coupled to a high-voltage power supply (e.g., 30-60 Volts), and its source is coupled to the drain of the inverting & amplifying transistor. The source of the inverting & amplifying transistor is coupled to ground and its gate is coupled to receive the data signal 123, which is an amplified and inverted version of the analog raw data 154. The drain of the inverting & amplifying transistor provides the output of the power out circuit 260, which is the data transmit signal 122.

Figure 30:
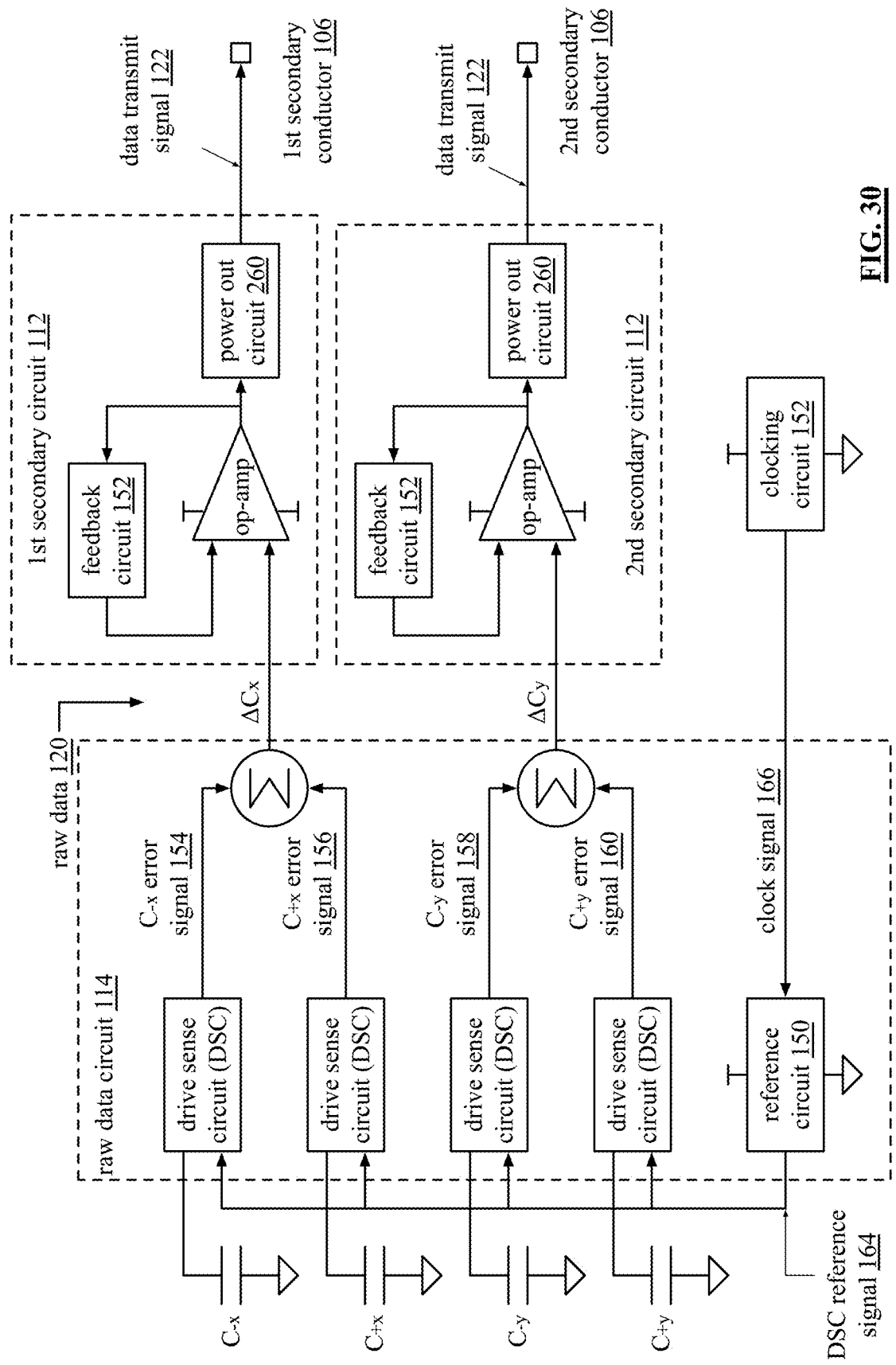
FIG. 30 is a schematic block diagram of another embodiment of a raw data circuit and two secondary circuits of an electronic pen in accordance with the present invention.

FIG. 30 is a schematic block diagram of another embodiment of a raw data circuit 114 and two secondary circuits 112 of an electronic pen 16. The raw data circuit 114 includes a plurality of drive sense circuits (DSCs) and a reference circuit 150 as previously discussed with reference to FIG. 18. In this embodiment, the raw data circuit further includes two subtraction modules. The first subtracts the C−x error signal 154 from the C+x error signal 156 to produce a difference Cx error signal ($\Delta Cx$) and the second subtracts the C−y error signal 158 from the C+y error signal 160 to produce a difference Cy error signal ($\Delta Cy$).

Assume that, when the pen 16 is not being tilted, C−x equals C+x and C−y equals C+y. Thus, C−x error signal 154 equal C+x error signal 156 and C−y error signal 158 equal C+y error signal 160. With these error signals being equal, each of the difference Cx error signal ($\Delta Cx$) and the difference Cy error signal ($\Delta Cy$) equal zero. When a tilt occurs, the error signals will not be equal, thus the difference Cx error signal (ΔCx) and/or the difference Cy error signal (ΔCy) will not be zero. The non-zero values of the difference Cx error signal (ΔCx) and/or the difference Cy error signal (ΔCy) are processed by the touch screen processing module 82 (of FIGS. 2 and 3) to determine the tilt of the pen.

The first and second secondary circuits 112 convey the difference Cx error signal (ΔCx) and the difference Cy error signal (ΔCy) to the touch screen processing module 82. Each of the first and second secondary circuits 112 includes an op-amp, a feedback circuit 152, and a power out circuit 260, which function as previously discussed with reference to FIG. 27. As an alternative to using two secondary circuits 112, the difference Cx error signal (ΔCx) and the difference Cy error signal (ΔCy) are multiplexed and outputted by a single secondary circuit 112.

Figure 31:
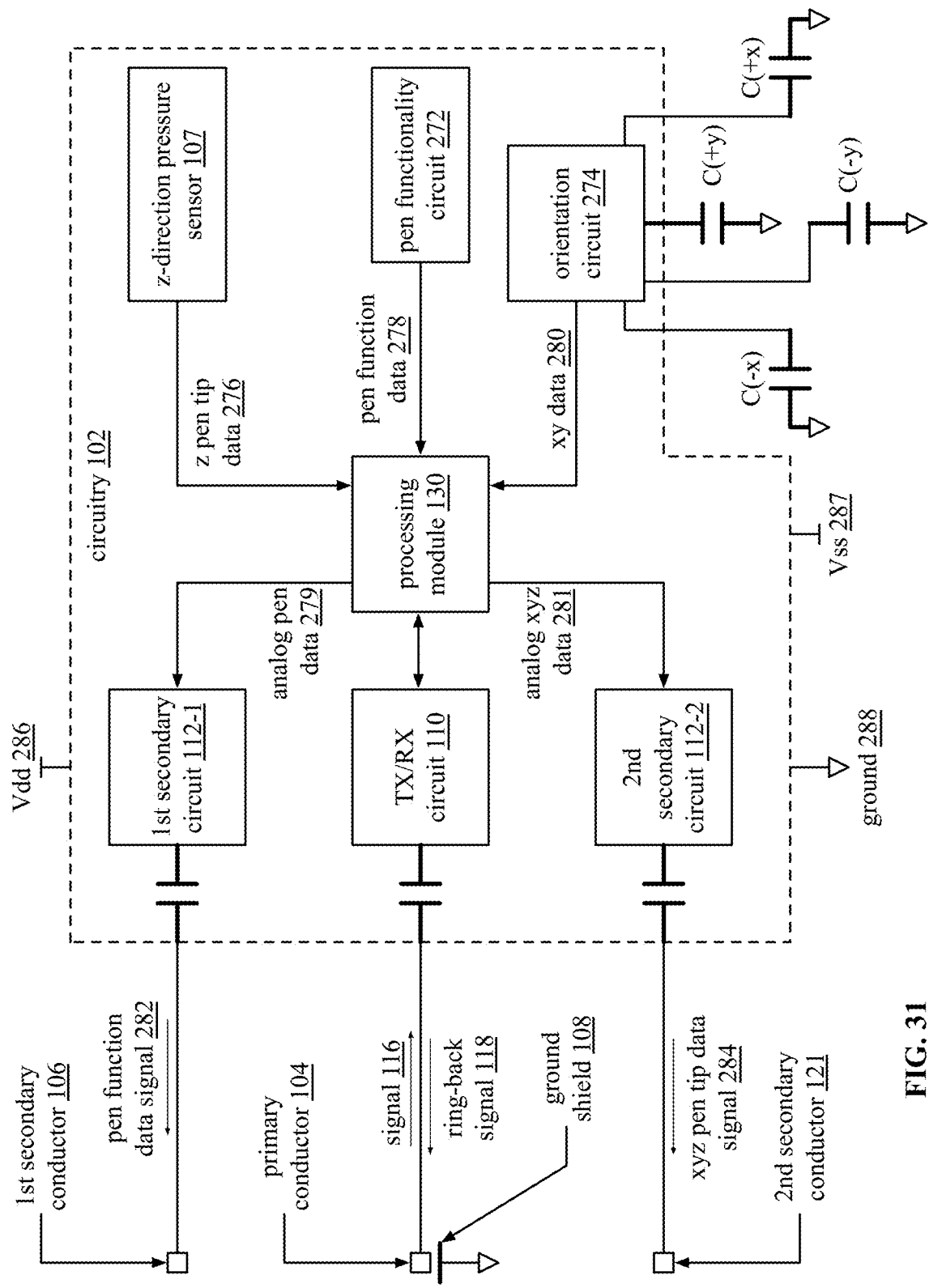
FIG. 31 is a schematic block diagram of another embodiment of an electronic pen in accordance with the present invention.

FIG. 31 is a schematic block diagram of another embodiment of an electronic pen 16 that includes the circuitry 102, the primary conductor 104, the $1^{st}$ secondary conductor 106, the $2^{nd}$ secondary conductor 121, shielding 108, and the orientation capacitors (C−x, C+x, C−y, and C+y). The circuitry 102 includes the TX/RX circuit 110, the $1^{st}$ secondary circuit 112-1, the $2^{nd}$ secondary circuit 112-2, the processing module 130, the z-direction pressure sensor 107, a pen functionality circuit 272, and an orientation circuit 274. The circuit 102 is coupled to a supply voltage that has one or more rail to rail voltages of Vdd 286 and Vss 287. From Vdd and Vss, a ground reference 288 is established (e.g., a voltage approximately equal to ½ of the difference between Vdd and Vss).

In an example, the z-direction pressure sensor 107 produces z-direction pen tip data 276 in a raw data form as previously discussed. The orientation circuit 274 generates xy data 280 (e.g., tilt data) based on the capacitance values of the orientation capacitors (C−x, C+x, C−y, and C+y). Embodiments of the orientation circuit 274 were discussed with reference to FIGS. 18, 25, and 30. The processing module 130 generates analog xyz data 281 based on the z-direction pen tip data 276 and the xy data 280 and provides it to the $2^{nd}$ secondary circuit 112-2. The $2^{nd}$ secondary circuit 112-2 generates an xyz pen tip data signal 284 based on the analog xyz data 281. In addition, the $2^{nd}$ secondary circuit 112-2 transmits the xyz pen tip data signal 284 to the touch screen via the $2^{nd}$ secondary conductor 121. In this example, the $2^{nd}$ secondary circuit is capacitively coupled to the $2^{nd}$ secondary conductor 121. Alternatively, the $2^{nd}$ secondary circuit is directly coupled to the $2^{nd}$ secondary conductor 121.

In another example, the TX/RX circuit 110 receives a signal 116 via the primary conductor 104 from the touch screen. When the signal 116 does not include an embedded data message, the TX/RX circuit 110 generates a ring-back signal 118, which it transmits to the touch screen via the primary conductor 104. In this example, the TX/RX circuit 110 is capacitively coupled to the primary conductor 104. Alternatively, the TX/RX circuit 110 is directly coupled to the primary conductor 104.

When the signal 116 includes an embedded data message, the TX/RX circuit 110 extracts the data message and provides it to the processing module 130. The processing module 130 generates a message response and sends it to the TX/RX circuit 130. The TX/RX circuit 110 embeds the message response in the ring-back signal 118. Various embodiments of the TX/RX circuit 110 are previously discussed.

In yet another example, the pen functionality circuit 272 generates pen functional data 278, which is in a raw data format. The pen functional data 278 may be regarding a variety of pen functions. For example, the pen functional data 278 is regarding power data of the battery and/or power supply providing power to the electronic pen 16. As another example, the pen functional data 278 is regarding selection of a button or switch for one or more of color change, write thickness, paint mode, draw mode, eraser mode, etc.

The processing module 130 generates analog pen data 279 based on the pen functional data 278 and provides it to the $1^{st}$ secondary circuit 112-1. The $1^{st}$ secondary circuit 112-1 generates a pen function data signal 282 based on the analog pen data 279. In addition, the $1^{st}$ secondary circuit 112-1 transmits the pen functional data signal 282 to the touch screen via the $1^{st}$ secondary conductor 106. In this example, the $1^{st}$ secondary circuit is capacitively coupled to the $1^{st}$ secondary conductor 106. Alternatively, the $1^{st}$ secondary circuit is directly coupled to the $1^{st}$ secondary conductor 106.

Figure 32:
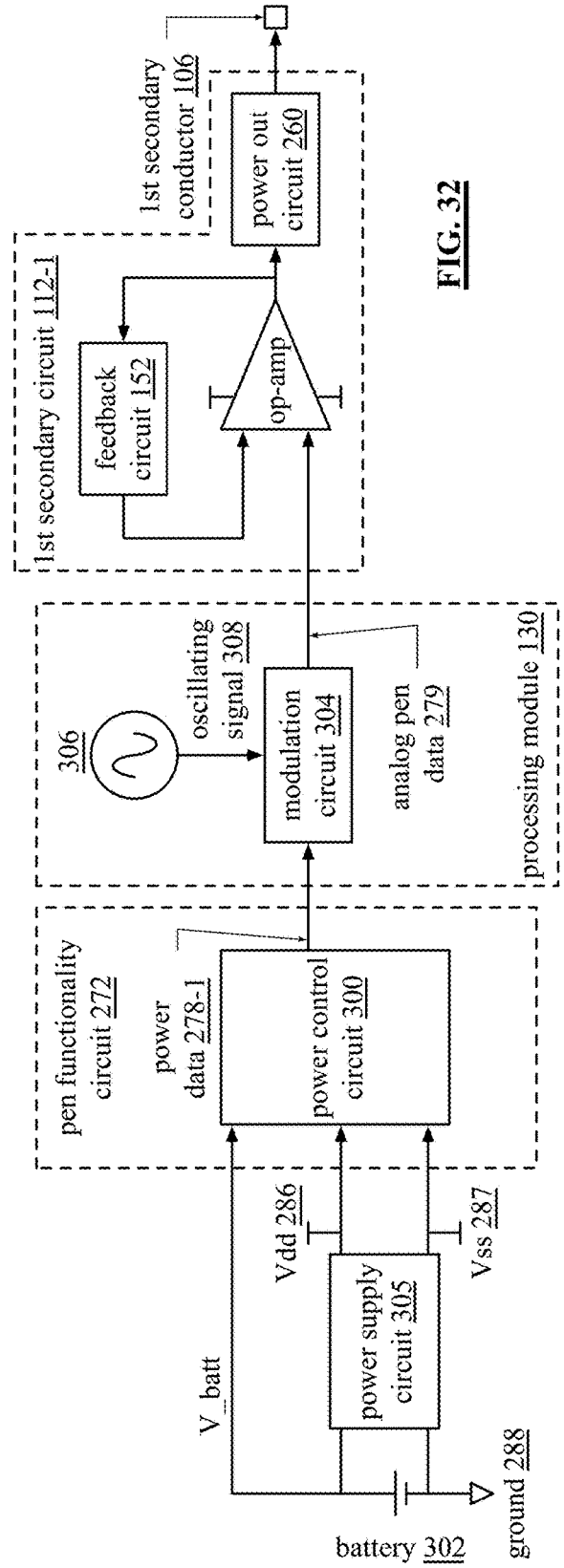
FIG. 32 is a schematic block diagram of an embodiment of a power supply, a pen functionality circuit, a processing module, and a secondary circuit of an electronic pen in accordance with the present invention.

FIG. 32 is a schematic block diagram of an embodiment of a power supply 305, a pen functionality circuit 272, a processing module 130, and a secondary circuit 112-1 of an electronic pen 16. The power supply circuit 305 is coupled to a battery 302, which powers the pen 16. The power supply circuit 305 may be implemented in a variety of ways. For example, the power supply circuit 305 is a DC-to-DC converter using one or more topologies (e.g., buck, boost, fly-back, half bridge, etc.). As another example, the power supply circuit 305 includes one or more linear regulators. Regardless of the particular construct of the power supply circuit 35, the power supply circuit 35 generates, from the battery voltage (v batt), one or more positive rail voltages (Vdd) 286, one or more negative rail voltages (Vss) 287, and a ground reference 288.

The pen functionality circuit 272 includes a power control circuit 300, which receives the battery voltage, the positive rail voltage(s), and the negative rail voltage(s) as inputs. In an embodiment, the power control circuit 300 includes a battery charger to charge the battery 302. In addition, the power control circuit 300 monitors the charging of the battery (e.g., charge current, charge level, trickle current, etc.) and produces power data 278-1 therefrom.

In another embodiment or in furtherance of the previous embodiment, the power control circuit includes a voltmeter and/or current meter to determine voltage, current, and/or power usage of the pen and/or drain on the battery. This information comprises, or is added to, the power data 278-1. The power data 278-1 may be analog data or digital data.

The processing module 130 is configured to include an oscillation generator 306 and a modulation circuit 304. The oscillation generator 306, which may be a phase locked loop, a voltage controlled oscillator, a crystal oscillator, a number controlled oscillator, or a digital frequency synthesizer, generates an oscillation signal 308. In an embodiment, the oscillation signal 308 is a sinusoidal signal having a frequency in the range of a few KHz to tens of GHz.

The modulation circuit 304 modulates the oscillation signal 308 with the power data 278-1 to produce the analog pen data 279. In an embodiment, the modulation circuit 304 amplitude shift keying (ASK), phase shift keying (PSK), and/or amplitude modulation (AM) modulates the oscillation signal 308 based on the power data 278-1 to produce the analog pen data 279. The $1^{st}$ secondary circuit 112-1, which includes the op-amp, the feedback circuit 152, and the power out circuit 260, outputs an up-converted version of the analog pen signal to the touch screen via the $1^{st}$ secondary conductor 106.

Figure 33:
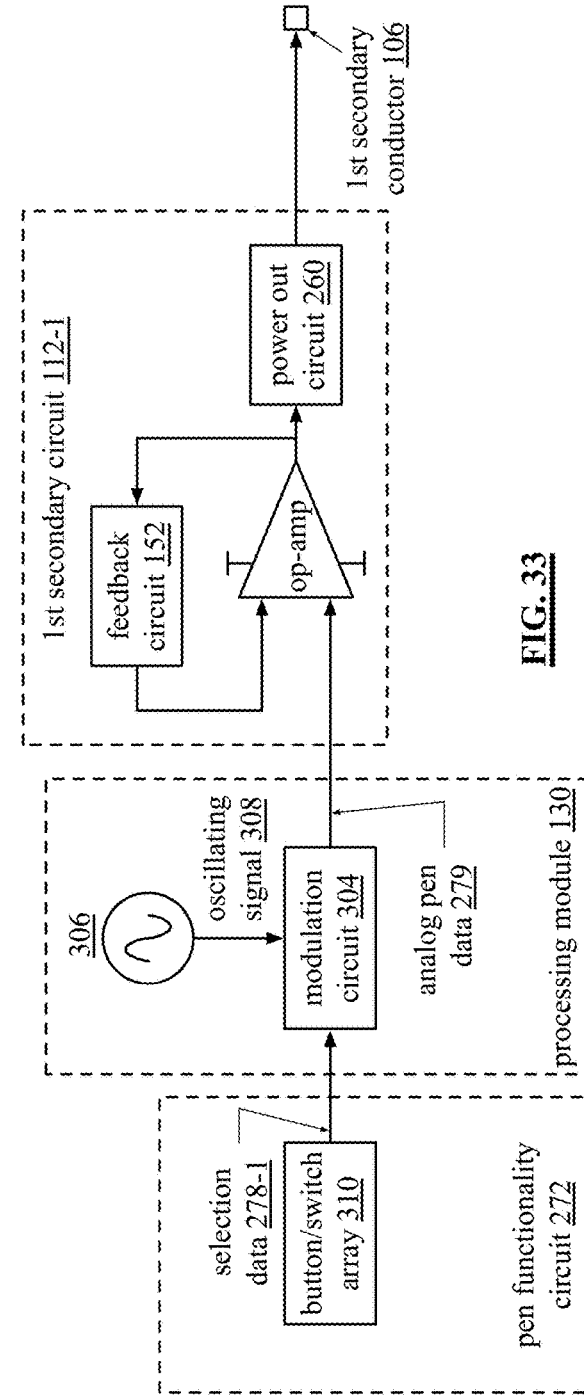
FIG. 33 is a schematic block diagram of another embodiment of a pen functionality circuit, a processing module, and a secondary circuit of an electronic pen in accordance with the present invention.

FIG. 33 is a schematic block diagram of another embodiment of a pen functionality circuit 272, the processing module 130, and the 1$^{st}$ secondary circuit 112-1 of an electronic pen 16. In this embodiment, the pen functionality circuit 272 includes a button and/or switch array 310 that includes one or more switches and/or one or more buttons. The button/switch array 310 enables a user of pen to select certain pen features such as pen color, pen tip thickness, paint mode, draw mode, eraser or pen mode, etc. to produce selection data 278-1. For example, when a first switch is open (or a button is not pushed), the electronic pen 16 is in a pen mode and, when the switch is closed (or button is pressed), the electronic pen 16 is in an eraser mode.

The processing module 130 includes the oscillation generator 306 and modulation circuit 304, which function as previously discussed to create the analog pen data 279 from the selection data 278-1. The 1$^{st}$ secondary circuit 112-1, which includes the op-amp, the feedback circuit 152, and the power out circuit 260, outputs an up-converted version of the analog pen signal to the touch screen via the 1$^{st}$ secondary conductor 106.

Figure 34:
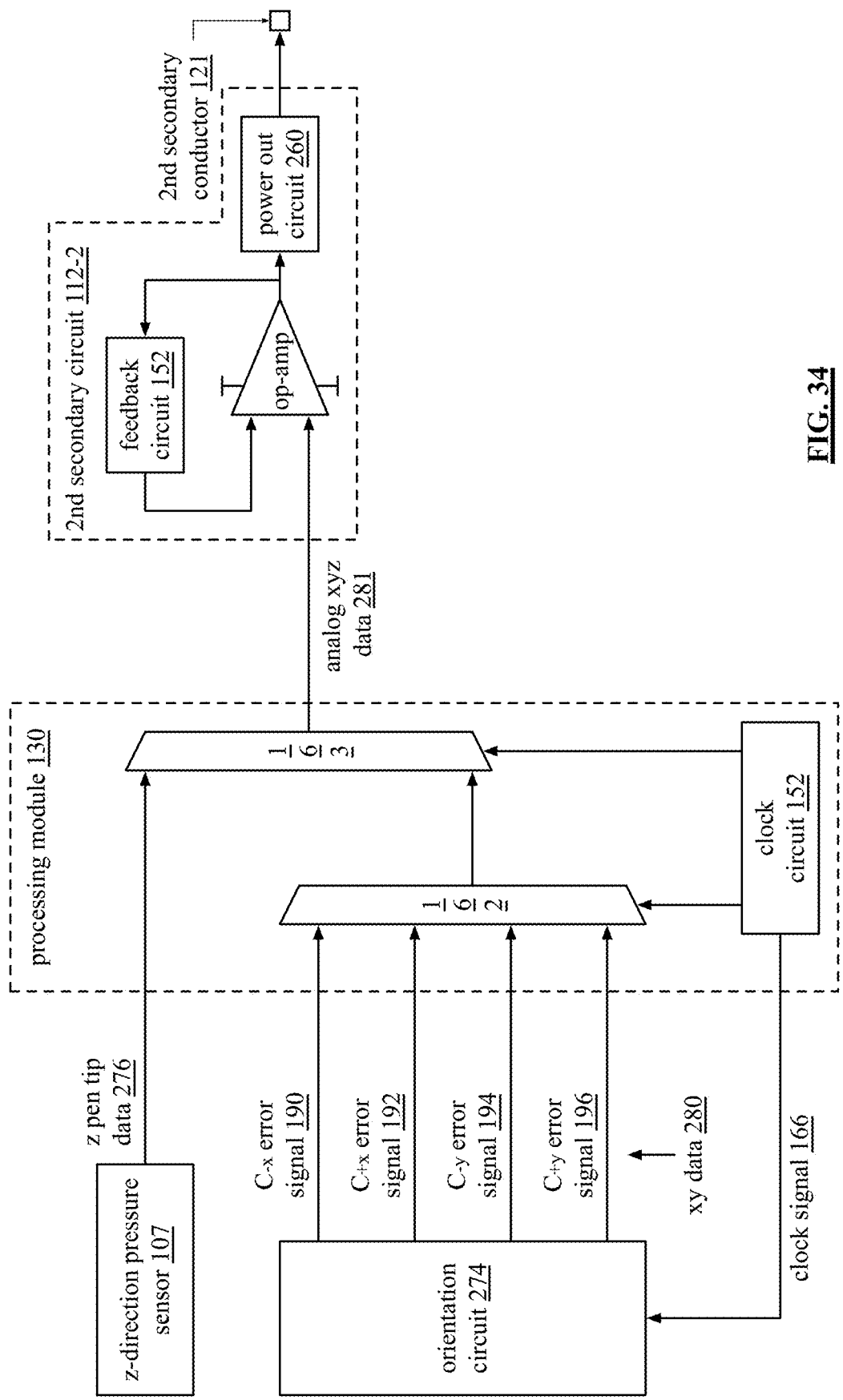
FIG. 34 is a schematic block diagram of an embodiment of a z-direction pressure sensor, an orientation circuit, a processing module, and a secondary circuit of an electronic pen in accordance with the present invention.

FIG. 34 is a schematic block diagram of an embodiment of a z-direction pressure sensor 107, the orientation circuit 274, the processing module 130, and the 2$^{nd}$ secondary circuit 112-2 of an electronic pen 16. The z-direction pressure sensor 107 generates z pen tip data 276 as previously discussed. the orientation circuit 278 is coupled to the orientation capacitors (not shown in this figure) to produce capacitor error signals 190-196 as previously discussed with reference to FIG. 18.

The processing module 130 includes the clock circuit 152, multiplexer 162, and multiplexer 163. The clock circuit 152 generates control signals for the multiplexers 162 and 163 such that the processing module 130 outputs the analog xyz data 281. For example, the processing module outputs, in a repetitive order, the C−x error signal, the C+x error signal, the C−y error signal, the C+y error signal, and the z pen tip data 276 as the analog xyz data 281. The 2$^{nd}$ secondary circuit 112-2, which includes the op-amp, the feedback circuit 152, and the power out circuit 260, outputs an up-converted version of the analog xyz data 281 to the touch screen via the 2$^{nd}$ secondary conductor 121.

Figure 35:
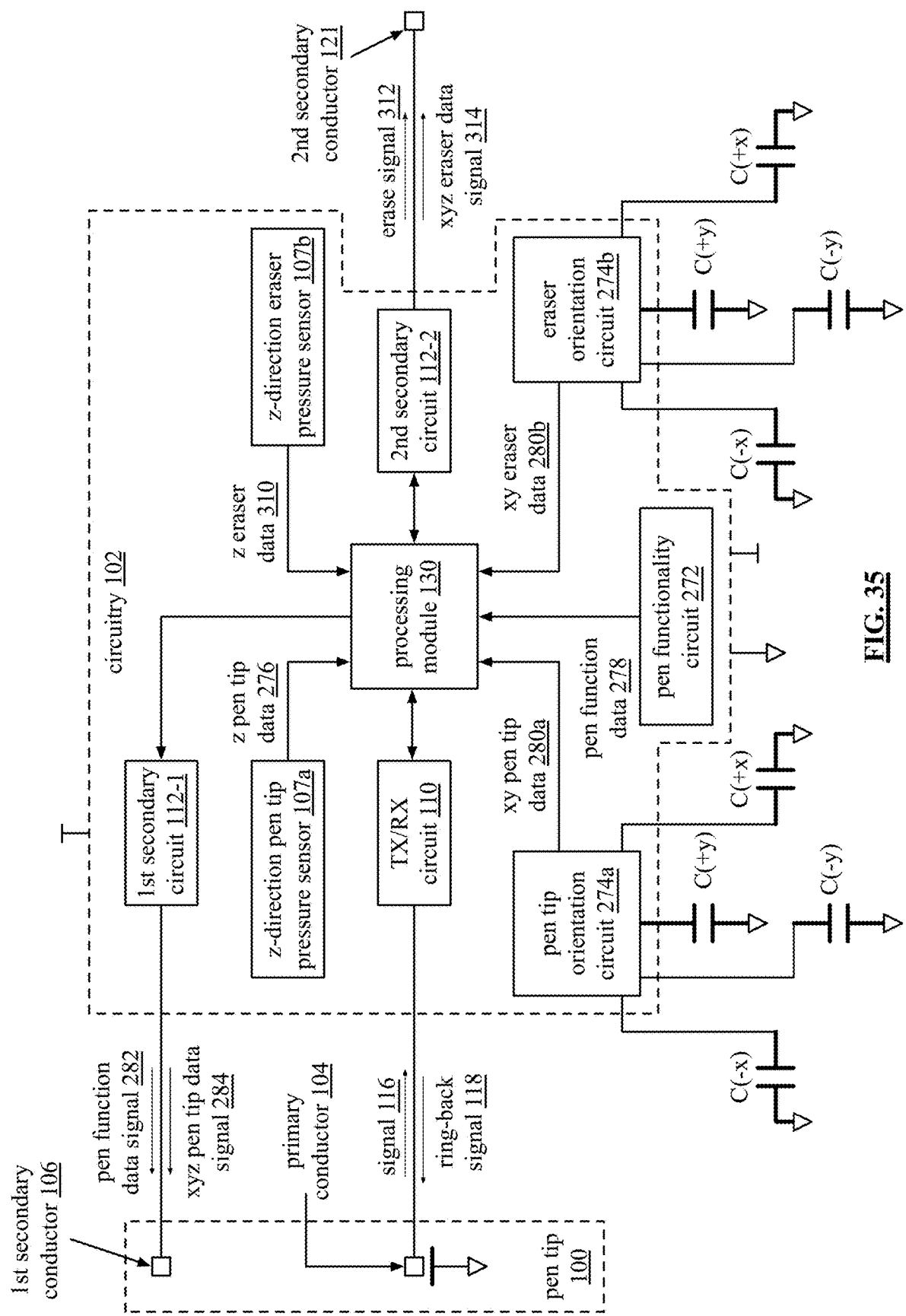
FIG. 35 is a schematic block diagram of another embodiment of an electronic pen in accordance with the present invention.

FIG. 35 is a schematic block diagram of another embodiment of an electronic pen 16 that includes the circuitry 102, the pen tip 100, and the eraser tip, which includes the 2$^{nd}$ secondary conductor 121. The pen tip 100 includes the primary conductor 104, the 1$^{st}$ secondary conductor and the shielding 108. This embodiment includes two sets of orientation capacitors (C−x, C+x, C−y, and C+y); one for the pen tip and second one for the eraser tip. The circuitry 102 includes the TX/RX circuit 110, the 1$^{st}$ secondary circuit 112-1, the 2$^{nd}$ secondary circuit 112-2, the processing module 130, a z-direction pen tip pressure sensor 107a, a z-direction eraser tip pressure sensor 107b, the pen functionality circuit 272, a pen tip orientation circuit 274a, and an eraser orientation circuit 274b. The circuit 102 is coupled to a supply voltage that has one or more rail to rail voltages of Vdd 286 and Vss 287. From Vdd and Vss, a ground reference 288 is established (e.g., a voltage approximately equal to ½ of the difference between Vdd and Vss).

The circuitry 102 operates similarly to the circuitry of FIG. 31 with differences being the 2$^{nd}$ secondary conductor 121 and 2$^{nd}$ secondary circuit 112-2 are used for the eraser end of the pen 16. The z-direction eraser pressure sensor 107b and the eraser orientation circuit 274b operate similarly to the z-direction eraser pressure sensor 107a and the eraser orientation circuit 274a, but for the eraser end of the pen. In addition, the 1$^{st}$ secondary conductor 106 and the 1$^{st}$ secondary circuit 112-1 are used for both the xyz pen tip data 284 and the pen function data signal 282.

Figure 36:
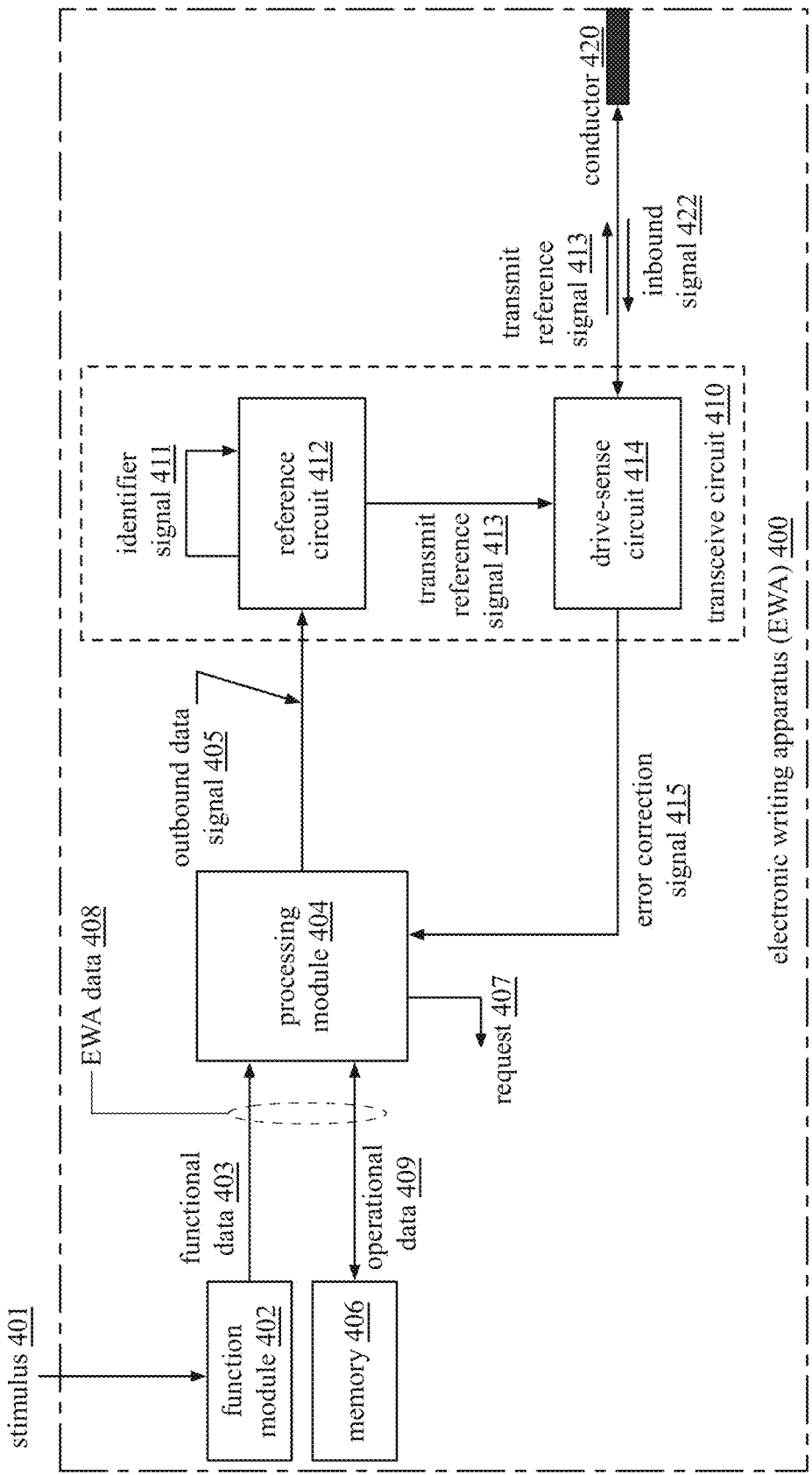
FIG. 36 is a schematic block diagram of an embodiment of an electronic writing apparatus in accordance with the present invention.

FIG. 36 is a schematic block diagram of an electronic writing apparatus (EWA) 400 that includes a function module 402, a processing module 404, a memory 406, a transceive circuit 410, and a conductor 420. The transceiver circuit 410 includes a reference circuit 412 and a drive-sense circuit 414. In an embodiment, the reference circuit 412 is implemented by reference circuit 150 of FIG. 19. Also in an embodiment, the drive sense circuit 414 is implemented by a drive sense circuit of one or more previous Figures. In an additional embodiment, the electronic writing apparatus is implemented by or in conjunction with electronic pen 16 of one or more previous Figures. In an example, the processing module 404 is implemented by a processing module of one or more previous Figures.

In an embodiment, the function module 402 includes one or more of signal generators, voltage sources, current sources, transducers, actuators, capacitors, resistors, transistors, switches, electrodes, switches, an analog to digital converter (ADC) and a digital to analog converter (DAC). The memory 406 stores and retrieves operational data 409 that includes one or more of a reference table, settings, a state, stored values, and a basic input/output system (BIOS).

The electronic writing apparatus 400 may operate in a variety of modes to communicate information with a touch screen computing device. The modes include one or more of a beacon mode, a ring back mode, and a data communication mode. In beacon mode, the electronic writing apparatus transmits an identifier signal having a unique characteristic (e.g., waveform shape, frequency band, amplitude, frequency, phase shift, etc.) that identifies the electronic writing apparatus to a touch screen computing device as one or more of a pen and an eraser. In ring back mode, the electronic writing apparatus amplifies a received signal to backscatter data to a touch screen computing device. In data communication mode, the electronic writing apparatus receives data at one or more frequencies from a touch screen computing device and regulates data signals at one or more frequencies (same or different frequencies than received) on one or more conductors of the electronic writing apparatus to transceive data with a touch screen computing device.

In an example of operation, the function module 402 detects a stimulus 401. The stimulus includes one or more of a pressure, a touch, an orientation, a torque, an acceleration, an inbound signal, a voice command, a vibration, and a button selection. As an example, the function module detects a capacitance change of a capacitive pressure sensor. As another example, the function module detects a voice command (e.g., a particular frequency pattern). As yet another example, the function module detects a button selection (e.g., a switch closing).

The function module generates functional data 403 based on the detected stimulus. For example, the function module 402 generates a digital capacitive value of an orientation capacitor as functional data 403 based on the detected capacitance change. As another example, the function module 402 passes raw data (e.g., data that needs subsequent processing, the particular frequency pattern, etc.) to the processing module as the functional data 403. As another example, the function module 402 generates a first digital value (e.g., 2) indicative of a first button selection as the functional data 403.

The processing module 403 generates an outbound data signal 405 based on one or more of functional data 403, error correction signal 415 and operational data 409. For example, the processing module generates an outbound data signal 405 having a first frequency to represent the digital capacitance value. As another example, the processing module 404 generates an outbound data signal 405 having a second frequency to represent the first digital value based on a look up table stored in memory 406. As yet another example, the processing module 404 determines that error correction signal 415 indicates to send a digital capacitance value, and generates the outbound data signal 405 representative of the digital capacitance value based on the functional data 403. As yet a further example, the processing module 404 determines that error correction signal 415 indicates to send communication mode settings (e.g., operational data 409) stored in memory 406.

Note the outbound data signal 405 may be raw data or an interpretation thereof. Raw data is data that needs further data and/or processing to give meaning to the data. As an example, the outbound data signal 405 is the particular frequency pattern. As another example, the outbound data signal is an interpretation of the raw data such that when the stimulus is capacitance error signals representing an orientation change, the functional data is capacitance values based on the capacitance error signals and the outbound data signal is xy angle of the electronic writing apparatus based on a difference between the capacitance values and previous capacitance values.

The reference circuit generates identifier signal 411. In an example, the identifier signal 411 is based on outbound data signal 405. For example, when the outbound data signal 405 is at a second frequency that is utilized to transmit pen data to a touch screen, the reference circuit generates an identifier signal at a third frequency to identify the electronic writing apparatus as a pen to the touch screen. In another example, the identifier signal has a unique waveform characteristic (e.g., frequency, shape, frequency band, etc.) that is an identifier for an aspect (e.g., functionality, capability, etc.) of the electronic writing apparatus (EWA) 400. For example, an identifier signal 411 with a first particular frequency identifies that the EWA is currently functioning as a pen. As another example, a second particular frequency (or frequency pattern) represents capabilities (e.g., can function as an eraser only, can function as a pen, can function as both a pen and an eraser, has multiple conductors for transceiving data, has pen and pencil functionality, etc.) of the EWA. As yet another example, the unique waveform identifies a line thickness of the electronic writing apparatus functioning as a pen. Alternatively, or in addition to, the outbound data signal is modulated with data (e.g., a bit pattern) that represents the functionalities and capabilities associated with the electronic writing apparatus.

Having generated the identifier signal 411, the reference circuit 412 combines the identifier signal 411 with the outbound data signal 405 to produce a transmit reference signal 413. The combining includes one or more of adding, subtracting, mixing, and multiplying the outbound data signal 405 and the identifier signal 411.

The drive sense circuit 414 regulates the transmit reference signal 416 onto the conductor 420, which is discussed in greater detail with reference to one or more other Figures, for example, FIG. 16 and FIG. 42. The drive sense circuit 414 is also operable to receive an inbound signal 422 and generate an error correction signal 415 based on one or more of the inbound signal 422 and the transmit reference signal 413. The error correction signal 415 is then supplied to processing module 404.

The processing module 404 is also operable to produce a request 407 based on one or more of functional data 403, operational data 409, and the error correction signal 415. The request may include one or more of write data to memory 406, send data (e.g., a current capacitance value) to a computing device, use a particular data communication setting (e.g., send data via a specific conductor 420 (e.g., secondary conductor for higher data rate) and/or at a particular frequency (e.g., a first frequency f1)), perform an operation (e.g., instruct the electronic writing apparatus to vibrate), and change an operational setting (e.g., reduce power, increase power, change color of a light emitting diode (LED)).

As an example, the processing module recovers inbound data from the error correction signal 415 and interprets the inbound data to determine the request. As another example, the processing module is preset, when power for the electronic writing apparatus is turned on, to retrieve instructions from memory that cause the electronic writing apparatus to generate an outbound data signal as the request. The EWA then executes the request 407. For example, the processing module requests 407 the function module 402 return functional data 403 that includes and/or represents a current capacitance value for each orientation capacitive plate 111. As another example, the processing module sends a write request 407 to memory 406 to store an updated reference table.

FIG. 37 is a schematic block diagram of an embodiment of an electronic writing apparatus (EWA) 400 that includes an EWA end 374, an EWA tip 372 and a touch portion 370. The touch portion may be implemented by a touch screen 12 and computing device 10 of one or more previous Figures. The touch portion 370 may include one or more of an electrode, a capacitor, a transistor, a resistor, an inductor, and a drive sense circuit. In an example, the electronic writing apparatus end 374 functions as a conventional eraser and the electronic writing apparatus tip 372 functions as a conventional pen. In another example, the electronic writing apparatus end 374 may be implemented by eraser tip 125 of FIG. 11 and electronic writing apparatus tip 372 may be implemented by pen tip 100 of FIG. 11.

The touch portion functions to receive an input from a user of the EWA 400. For example, the touch portion detects a capacitance change of operably connected electrodes that represents a touch by a user of the electronic writing apparatus 400. In an example, the touch portion allows the user to change functionality of the electronic writing apparatus via touch. For example, the user may tap the touch portion twice to cause the electronic writing apparatus to generate an undo a most recent line marking command signal, which is sent to a touch screen computing device. As another example, the user may increase a pressure on the touch portion to cause the electronic writing apparatus to generate an increase line thickness command signal, which is sent to a touch screen computing device. As yet another example, the user may switch between bold, underline and italic functionality by tapping the touch portion. The touch portion may be integrated with or operably connected to a touch module, that is discussed in greater detail with reference to Figures.

FIG. 38 is a schematic block diagram of an embodiment of a touch portion 370. The touch portion 370 includes three touch areas (TAs) shown as a first touch area, a second touch area and a third touch area, each substantially the same size. Each touch area may be utilized for a different function and include its own touch module. For example, the first touch area may change the thickness of the marking produced by the EWA, the second touch area may change between a "pen" (e.g., can't erase), and a "pencil" (e.g., can erase)

functionality of the EWA, and the third touch area may switch the electronic writing apparatus tip from a writing functionality to an erase functionality.

As a specifics example, a first touch area when not sensing a touch causes the electronic writing apparatus to be put into a sleep mode (e.g., reduce power, reduce amount of data transmitted, transmit no data until a wake command, etc.) and when sensing a touch causes the electronic writing apparatus to be put or kept in a wake mode (e.g., increase power, transmit a beacon signal, transmit output data, etc.). A second touch area when tapped cycles the electronic writing apparatus between different colors. A third touch area when tapped switches the electronic writing apparatus between pen and pencil mode and when pressure is increased increases the thickness of the pen or pencil line. Thus, a touch area may have more than one functionality associated with it.

FIGS. 39A-B are a schematic block diagrams of another embodiment of touch portion 370. FIG. 39A illustrates the touch areas of touch portion 370 as illustrated on the EWA 400 in FIG. 37 and FIG. 39 B illustrates a stretched view of the touch portion 370. As shown in these embodiments, the touch areas may be different sizes. In an example, the orientation, shape and/or order of touch areas is determined based on whether the electronic writing apparatus is designed for a left hand user or right hand user. The touch areas may be physically and/or visually demarcated to a user in a variety of ways. For example, a raised bump indicates where a user should place her pointer finger when gripping the EWA 400 so that the user's three gripping fingers each make contact with a specific touch area. As another example, one or more edges of the touch areas may be marked on exterior surface of EWA. As yet another example, the touch areas may be different colors. Note the touch areas may be circular, include one or more curved edges, and/or include other shapes than the rectangles illustrated.

Figure 40:
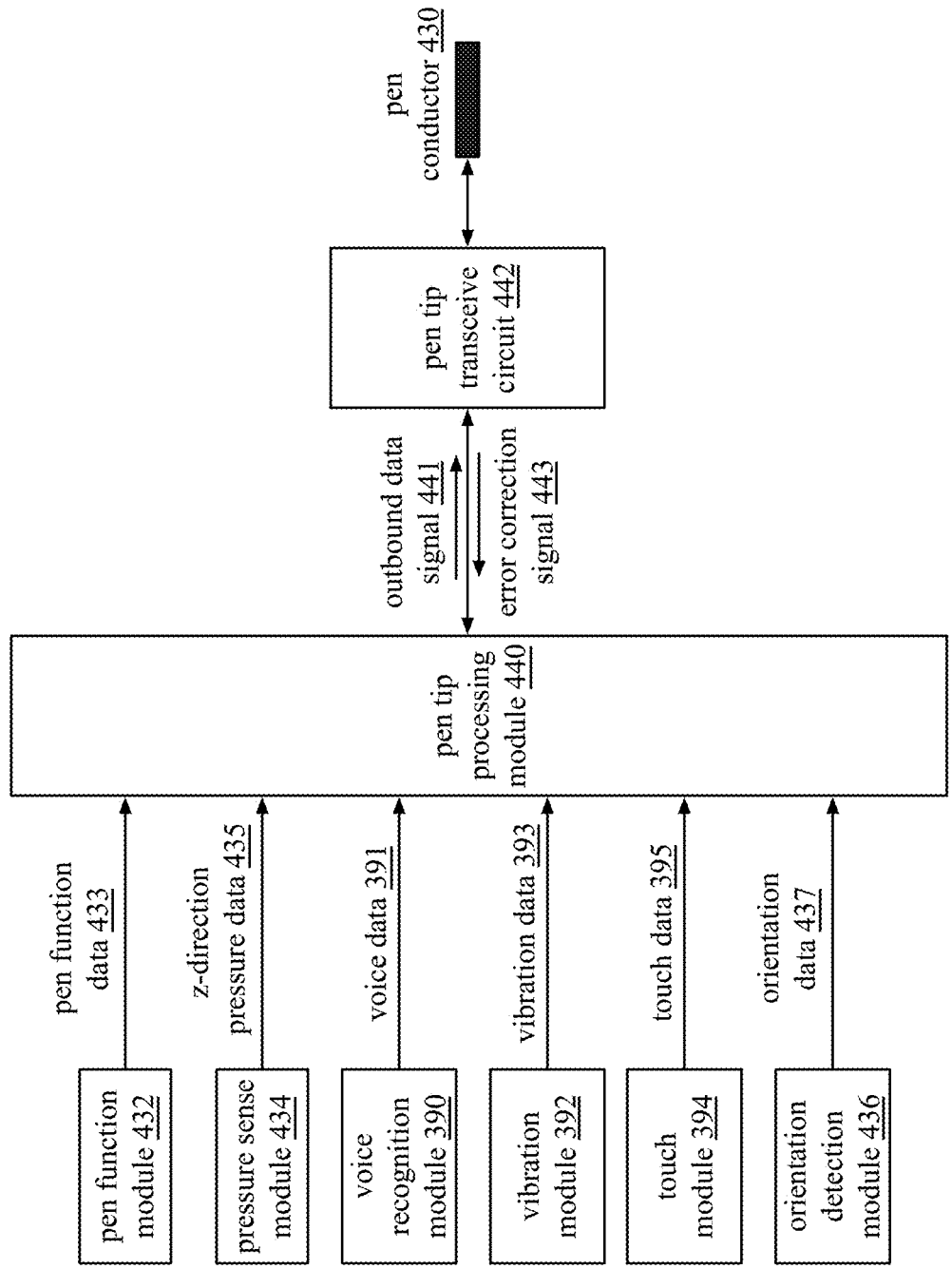
FIG. 40 is a schematic block diagram of another embodiment of an electronic writing apparatus in accordance with the present invention.

FIG. 40 is a schematic block diagram of an embodiment of an electronic writing apparatus 400 that includes a pen function module 432, a pressure sense module 434, a voice recognition module 390, a vibration module 392, a touch module 394, an orientation detection module 436, a pen tip processing module 440, a pen tip transceive circuit 442, and a pen conductor 430. In an example, the pen tip processing module is implemented by processing module 404, and the transceive circuit is implemented by transceiver circuit 410 of FIG. 36. In this embodiment, modules 432, 434, 390, 392, 394, and 436 are examples of function module 410 of FIG. 36. The conductor functions as an electrical interface to a touch screen computing device. In an example, the electrical interface includes one or more of electrostatic coupling and electromagnetic coupling.

In an example of operation, pen tip processing module obtains functional data from one or more of the functional modules 432, 434, 390, 392, 394, and 436. For example, the processing module 440 receives pen function data 433 (e.g., line thickness, line style (e.g., font, curved, straight, etc.), line color, pen mode, pencil mode, text format, etc.) from pen function module 432. As another example, the processing module 440 receives z-direction pressure data 435 (e.g., a capacitance value) from pressure sense module 434. As another example, the processing module 440 receives voice data 391 (e.g., a frequency pattern, a voice command, etc.) from voice recognition module 392. As yet a further example, the processing module 440 receives vibration data 393 (e.g., sensed vibration frequency, an electrical signal representing an amount of torque associated with the electronic writing apparatus) from vibration module 394. As yet another example, the processing module 440 receives orientation data 437 (e.g., a plurality of capacitance values representing an orientation of the electronic writing apparatus corresponding to an x-direction and/or a y-direction of an x-y plane as the stimulus) from orientation detection module 436.

The pen tip processing module 440 generates an outbound data signal 441 that is based on one or more of the functional data. For example, the outbound data signal includes a portion (e.g., a first frequency signal) that represents pen function data 433 and a second portion (e.g., a second frequency signal) that represents z-direction pressure data. The pen tip transceiver circuit 442 transmits the outbound data signal 441 (or representation thereof) onto the pen conductor 430. For example, the pen tip transceiver circuit 442 modulates the outbound data signal onto a carrier signal and regulates the modulated outbound data signal on to the pen conductor 430. The pen tip transceive circuit 442 also functions generate an error correction signal 443 that represents inbound data, which is output to pen tip processing module 440. Thus, the electronic writing apparatus is operable to communicate numerous functional data regarding stimulus detected by the electronic writing apparatus to a touch screen computing device. This, in part, allows for greater functionality of an electronic writing apparatus, ease of using the electronic writing apparatus, and interaction of the electronic writing apparatus with a touch screen.

Figure 41:
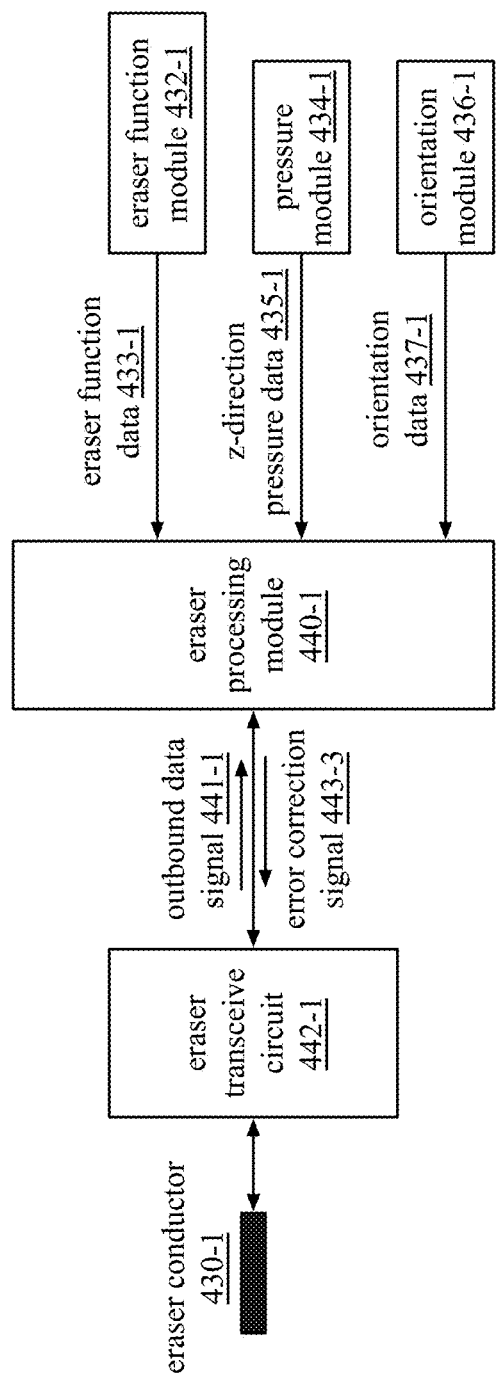
FIG. 41 is a schematic block diagram of another embodiment of an electronic writing apparatus in accordance with the present invention.

FIG. 41 is a schematic block diagram of another embodiment of an electronic writing apparatus (EWA) 400 that includes eraser functionality. In this example, the electronic writing apparatus includes eraser conductor 440-1, eraser transceive circuit 442-1, eraser processing module 440-1, eraser function module 432-1, pressure module 434-1, and orientation module 436-1. In an example, the electronic writing apparatus is an eraser apparatus only. In another example, the electronic writing apparatus is an eraser that includes pen functionality, either via the same conductor 420 or a separate erase conductor 430-1.

In an example of operation, the circuits and modules function in a similar manner to corresponding circuits and modules of FIG. 40 to produce an outbound data signal 441-1 based on one or more of eraser function data 433-1 (e.g., erase a color, erase a line, eraser a pen marking, erase a pencil marking, eraser width), z-direction pressure data 435-1, orientation data 437-1 and error correction signal 443-3. The eraser transceive circuit 442-1 outputs the outbound data signal 441-1 on to the eraser conductor 430-1. Note in one example, similar circuits of FIG. 41 and FIG. 40 are implemented by the same circuit (e.g., when the EWA includes pen and eraser functionality).

In one example, a function module of the electronic writing apparatus determines an orientation of the eraser or pen tip to a touch screen and generates via respective circuitry based on the orientation. For example, when the pen tip is proximal, the electronic writing apparatus transmits signals via a pen tip transceive circuit and when the eraser end is proximal, the electronic writing apparatus transmits signal via the eraser transceive circuit. As another example, a function module activates eraser circuitry when a first button combination is selected, and activates pen circuitry when a second button combination is selected.

Figure 42:
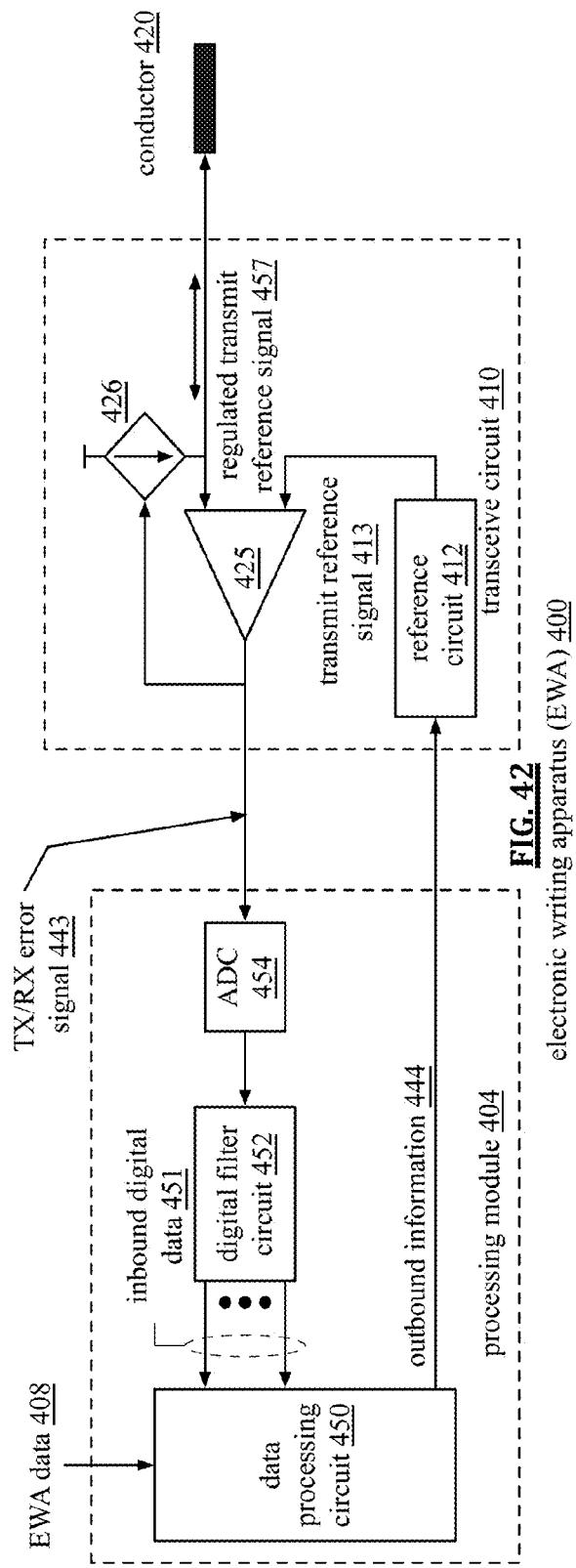
FIG. 42 is a schematic block diagram of another embodiment of an electronic writing apparatus generating a transmit reference signal in accordance with the present invention.

FIG. 42 is a schematic block diagram of an embodiment of a processing module 404, a transceive circuit 410 and a conductor 420 of an electronic writing apparatus 400. The processing module 404 includes a data processing circuit 450, a digital filter circuit 452 and an analog digital circuit (ADC) 454. The transceiver circuit 410 includes a reference circuit 412, an operational amplifier 425, and a dependent current source 426.

In an example of operation, the data processing circuit 450 generates outbound information 444 based on one or more of the inbound digital data 451, and electronic writing apparatus (EWA) data 408 (e.g., one or more of functional data and operational data). The reference circuit 412 generates a transmit reference signal 413 based on outbound information 444. The operational amplifier 425 receives the transmit reference signal 413 on one input and outputs a primary transceive error signal 443 based on a difference between the transmit reference signal 413 and signaling (e.g., inbound signal 422) of its other input that is connected to the conductor 420. A dependent current source 426, which is connected to the other input of the operational amplifier, changes its current based on transceive error signal 443 which produces a regulated transmit reference signal 457 that propagates on to conductor 420.

For processing inbound data, the analog to digital converter (ADC) 454 converts the transceive error signal 443 to an inbound digital signal. Digital filter circuit 452 then filters the inbound digital signal to produce inbound digital data 451, which may include one or more digital filter outputs (e.g., one output per frequency). The data processing circuit then processes the inbound digital data 451 to produce a result (e.g., generate an outbound data signal, produce a vibration, go into a sleep mode, etc.).

Figure 43:
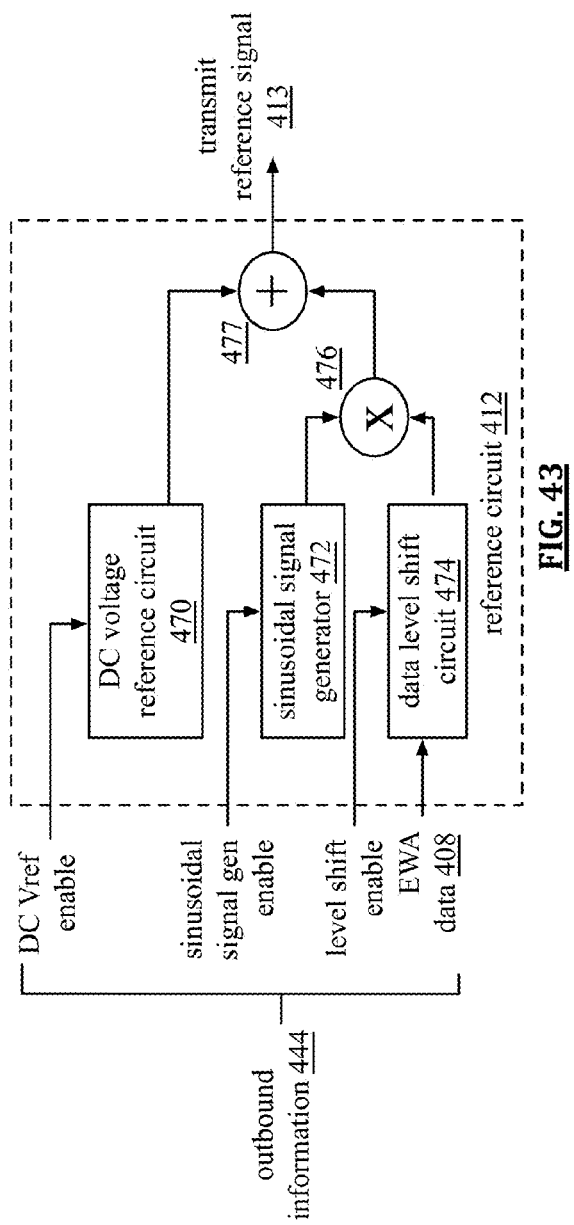
FIG. 43 is a schematic block diagram of an embodiment of a reference circuit in accordance with the present invention.

FIG. 43 is a schematic block diagram of an embodiment of reference circuit 412 that includes a direct current (DC) voltage reference circuit 470, a sinusoidal signal generator 472, a data level shift circuit 474, a multiplication circuit 476 and a summing circuit 476. The reference circuit 412 functions to generate a transmit reference signal 413 based on outbound information 444. The transmit reference signal may include a direct current (DC) component, one or more frequency components, a phase, a magnitude, and be a particular waveform (e.g., square, sinusoid, triangular, sawtooth, etc.).

In an example of operation, DC voltage reference circuit 470 sets the DC value for the transmit reference signal 413, sinusoidal signal generator 472 produces one or more oscillating signals at one or more particular frequencies (e.g., beacon frequency, data transmit frequency, a first frequency, a second frequency, etc.), and data level shift circuit 474 adjusts a magnitude of the signal to a desired detection level (e.g., 10 mV to 1V or more). In this example, the outputs of sinusoidal signal generator 472 and the data level shift circuit 474 are multiplied and the result is summed with the output of the DC voltage reference circuit 470 to produce the transmit reference signal 413. In an embodiment, a reference circuit 412 may function as a primary reference circuit that outputs primary data (e.g., identity of electronic writing apparatus as a pen or eraser) but can also function as a secondary reference circuit that output secondary data (e.g., functional data associated with the electronic writing apparatus) on a secondary conductor of an electronic writing apparatus.

FIG. 44 is a schematic block diagram of an embodiment of an electronic writing apparatus tip 372 of an electronic writing apparatus 400 communicating with a touch screen computing device 12 (e.g., computing device 10 that includes touch screen 12) utilizing one or more frequencies (f1-f3). In this example, the touch screen includes a row electrode and a column electrode. The drive sense circuit DSC-4 drives the column electrode and drive sense circuit DSC-3 drives the row electrode. Each drive sense circuit utilizes a sinusoid at frequency f1 to drive and sense a self-capacitance on a corresponding electrode and drive sense circuit DSC-4 utilizes a sinusoid signal at f2 to drive the column electrode and drive sense circuit DSC-3 senses the mutual capacitance between the row electrode and the column electrode.

The electronic writing apparatus tip 372 includes drive sense circuit DSC-1 and a conductor 420. When the electronic writing apparatus tip is proximal to the touch screen 12, it detects an electrostatic and/or electromagnetic field produced by the sinusoid signals at f1 and f2 being conducted by the electrodes of the touch screen. The drive sense circuit DSC-1 generates a signal having a component at f1 and f2 based on the strength of the electrostatic and/or electromagnetic field. This signal is provided to a processing module of the electronic writing apparatus.

For ringback mode, the drive sense circuit DSC-1 of the electronic writing apparatus tip 372 modulates the signal based on outbound data received from the processing module. This causes a change in the electrostatic and/or electromagnetic field produced by the electrodes, which the drive sense circuits DSC-3 and DSC-4 detect and produce an error signal therefrom. One of the drive sense circuits provides the error signal to a processing module of the touch screen for subsequent processing.

For beacon mode, the drive sense circuit DSC-1 of the electronic writing apparatus tip receives a sinusoidal signal at frequency f3 from an electronic writing apparatus transceive circuit and drives a current representation of the sinusoidal signal on to the conductor 420. When the electronic writing apparatus tip is proximal to the touch screen computing device 12, the touch screen detects an electrostatic and/or electromagnetic field produced by the sinusoid signal at f3 being conducted by the conductor 420. At least one of drive sense circuits DSC-3 and DSC-4 generates a signal having a component at f3 based on the strength of the electrostatic and/or electromagnetic field. This signal is provided to a processing module of the touch screen.

For data communication mode, the drive sense circuit DSC-1 of the pen tip receives a data modulated sinusoidal signal at one or more frequencies f3-$fn$ from the pen tip transceive circuit and drives a current representation of the data modulated sinusoidal signal on to the pen conductor 420. When the pen tip is proximal to the touch screen 12, the touch screen detects an electrostatic and/or electromagnetic field produced by the data modulated sinusoid signal being conducted by the pen conductor 420. At least one of drive sense circuits DSC-3 and DSC-4 generates a signal having components at f3-$n$ based on the strength of the electrostatic and/or electromagnetic field. This signal is provided to a processing module of the touch screen. Note the Vref signal input into the op amps may include one or more of a voltage, current, and oscillating signal. An example of signals f1, f2 and f3 present on each of the operational amplifier (425-1, 425-3, 425-4) inputs are illustrated in FIGS. 47A-C. Thus, these examples show the electronic writing apparatus and the touch screen computing device utilizing three frequency signals to drive, sense and communicate data.

FIG. 45 is a schematic block diagram of an embodiment of a processing module 404, a transceive circuit 410 and a conductor 420 of an electronic writing apparatus 400. The processing module 404 includes a data processing circuit 450, a bandpass filter (BPF) circuit 446 and an analog to digital (ADC) 454. In this example, the electronic writing apparatus operates to communicate with a touch screen computing device in a data communication mode.

The processing module sets up data communication mode settings for communicating data with a touch screen computing device. The data communication mode in this example includes inbound data for the electronic writing apparatus to be at a first frequency and outbound data to be at a third frequency. Thus, the processing module sets the bandpass filter 446 to filter out unwanted signals (e.g., signals with a second frequency, signals with a third frequency, etc.). The processing module, when generating outbound data, also sets a sinusoidal signal generator to generate signals at the third frequency.

In an example of operation, the data processing circuit 450 determines a request (e.g., a command) based on one or more of the EWA data 408 and the inbound digital data at f1. For example, the processing circuit interprets inbound digital data f1 to be a request from a touch screen computing device for orientation data to be sent to the touch screen computing device that is modulated on a third frequency (f3) signal. As such, the data processing circuit 450 generates outbound information 444 based on EWA data 408 (e.g., that includes functional data regarding the request) that causes reference circuit 412 to generate an amplitude shift keying (ASK) data output signal 447 at the third frequency D. The drive sense portion of transceive circuit 410 then regulates the data output signal 447 onto conductor 420.

FIG. 46 is a schematic block diagram of an embodiment of a reference circuit 412 that includes a DC voltage reference circuit 470, sinusoidal signal generator 472, and a data level shift circuit 474. The reference circuit 412 functions to produce an amplitude shift keying (ASK) data output 447 at a third frequency (f3) based on outbound information 444. Note the data output signal 447 could also be generated using a phase shift keying (PSK) approach, an amplitude modulation (AM) approach, or a combination of ASK, PSK and AM. Further note that in this example, a touch screen computing device communicating with the electronic writing apparatus associated with reference circuit 412 utilizes a first and second frequency to detect capacitance changes associated with electrodes of the touch screen. In an embodiment, the sinusoidal signal generator generates a specific tone to represent an identifier signal (e.g., 411 of FIG. 36).

In an example of operation, DC voltage reference circuit 470 generates a DC voltage based on the DC Vref enable signal. The DC voltage may be a common mode voltage of operational amplifier 425 of FIG. 56. The sinusoidal signal generator 472 generates one or more signals based on a sinusoidal signal generator enable signal. For example, the sinusoidal signal generator 472 generates a sinusoid oscillating at the third frequency. The data level shift circuit 474 generates a level shift signal based on level shift enable and EWA data 408 signals. The reference circuit then combines (e.g., multiplies, adds, etc.) the signals to produce the ASK data output 447 signal at the third frequency.

FIG. 47A is a graphical illustration of an example of frequency components associated with Iin_1 of FIG. 45 for data communication between an electronic writing apparatus and a touch screen computing device. As illustrated, the electronic writing apparatus receives f1 and f2 from the touch screen computing device and f1 includes received inbound data shown with a green arrow. The electronic writing apparatus transmits EWA data 408 on a frequency signal f3 (as shown with red arrow) to produce a modulated Iin_1 at f3 signal.

FIG. 47B is a schematic block diagram of another embodiment of an electronic writing apparatus 400 that includes eraser processing module 440-1, a pen tip transceiver circuit 442 and a pen conductor 430. In this embodiment, the eraser portion of electronic writing apparatus 400 is in transmit mode only (e.g., does not or is inoperable to receive information from a touch screen computing device). In an example, the eraser has its own eraser processing module 440-1, utilizes (e.g., shares) the pen tip transceive circuit 442 of FIG. 40 to output transceive reference signal 413-1 instead of using a separate eraser transceive circuit.

In an example of operation, the eraser processing module 440-1 generates outbound information 444, which is based on EWA data 408. Reference circuit 412 generates transmit reference signal 413-1, which may include a beacon signal that identifies the outbound information 444 as corresponding to an eraser or that the signal is an erase signal. The eraser data (e.g., outbound information 444) may include one or more of functional data and operational data as discussed in one or more other Figures. For example, the eraser data is capacitance values of an eraser orientation module. As such, when the transmit reference signal 413-1 is regulated onto the pen conductor 430, a touch screen computing device can differentiate the eraser data from pen data based on the beacon signal (e.g., the erase data is on a different frequency signal than pen data).

FIG. 48 is a schematic block diagram of an embodiment of a processing module 404, a transceive circuit 410, and a conductor 420 of an electronic writing apparatus 400. In this example, the electronic writing apparatus is operating in beacon mode where the processing module 404 is not receiving inbound data (e.g., from a touch screen computing device) and is not transmitting EWA data 408. As such, there is no processing of a transceive error signal as shown by the faded light grey lines. Note in an example of using the beacon mode, the electronic writing apparatus and the touch screen computing device utilize a third frequency signal for detect touches and/or hovers of the electronic writing apparatus on the touch screen.

In an example of operation, the data processing circuit 450 outputs outbound information 444 that includes a set reference signal at a third frequency (e.g., f3 (e.g., 100 MHz)). In an example, the third frequency is a beacon signal frequency, which identifies the electronic writing apparatus as a pen and/or an eraser. Reference circuit 412 generates a transmit signal 480 having the third frequency and the transceive circuit 410 regulates the signal onto the pen conductor 420 as discussed with reference to one or more previous Figures.

FIG. 49 is a schematic block diagram of an example of the reference circuit 412 operating in beacon mode. Outbound information 444 includes a direct current (DC) Vref enable information (e.g., enable signal, voltage level, etc.) and sinusoidal signal generator enable information (e.g., waveform, frequency, enable signal, etc.).

In an example of operation of the beacon mode, the DC voltage reference circuit 470 produces a DC output of a particular voltage level based on DC Vref enable signal. Sinusoidal signal generator 472 produces an oscillation signal having a third frequency D. The summing circuit 476 combines the DC signal with the oscillating signal (f3) to produce the transmit signal 480 having the particular voltage level and oscillating at the third frequency (f3). The reference circuit 412 then outputs the transmit signal 480 to the operational amplifier 425. In another example, the reference circuit generates the transmit signal 480 as only a sinusoid signal at f3 (e.g., no DC component).

FIG. 50 is a schematic block diagram of an embodiment of a processing module 404, transceiver circuit 410, and conductor 420 of an electronic writing apparatus 400. The processing module 404 includes a data processing circuit 450, a bandpass filter 446, and an analog to digital converter (ADC) 454. The transceiver circuit 410 includes a reference circuit 412, an operational amplifier 425, and a dependent current source 426.

In an example of operation, the electronic writing apparatus 400 is communicating with a touch screen computing device 12 in a ring back mode. In ring back mode, the EWA receives a an inbound signal from the touch screen via conductor 420. The processing module 404 receives a transceive error signal 443 based on the inbound signal and converts and filters it into an inbound digital data signal 450 at the first frequency (e.g., the frequency a touch screen uses to drive and sense an electrode). The processing module generates outbound information signal 444 based on the inbound digital data at f1.

The reference circuit 412 generates an ASK data signal 464 at a first frequency f1 based on outbound information 444. For example, and as shown in FIG. 51, the data level shift circuit 474 of reference circuit 412 modifies an amplitude of the first frequency signal based on EWA data 408 to produce an amplitude shift keying (ASK) data out signal 464 at the first frequency. The ASK data out 464 signal is then transmitted (e.g., backscattered) via primary pen conductor 420 to a touch screen computing device.

FIG. 52 is a graphical illustration of an embodiment of frequency components associated with Iin_1 of FIG. 50 for ring back communication between an electronic writing apparatus and a touch screen computing device. As illustrated, the electronic writing apparatus receives f1 and f2 from the touch screen computing device. The electronic writing apparatus modulates EWA data 408 on received inbound frequency signal f1 to produce a modulated Iin_1 at f1 signal as shown in FIG. 53 and as the red arrow in FIG. 52. The electronic writing apparatus transmits the modulated signal via a conductor for receiving by the touch screen computing device. Note in other examples, the electronic writing apparatus may utilize inbound frequency f2 to send the EWA data or another frequency (e.g., a fifth frequency f5 when utilizing data communication mode).

FIG. 54 is a schematic block diagram of an embodiment of a pen tip processing module 440, a pen tip transceive circuit 442 and a conductor 420 of an electronic writing apparatus 400. The pen tip processing module 440 includes a data processing circuit 450, a bandpass filter (BPF) circuit 446 and an analog to digital converter (ADC) 454. The pen tip transceive circuit 442 includes a reference circuit 412 and a drive sense circuit (e.g., operational amplifier 425 and inputs, feedback to dependent current source 426). In this example, the electronic writing apparatus 400 operates to communicate with a touch screen computing device using beacon and ringback modes.

In an example of operation, the drive sense circuit generates an analog transmit/receive error signal. The ADC 454 converts the analog transmit/receive error signal into a digital transmit/receive error signal. The bandpass filter 446 filters (e.g., passes signals within a first frequency band) the digital transmit/receive error signal to produce an inbound digital signal having a first frequency f1. The data processing circuit 450 then recovers inbound data from the inbound data signal. In an example, the data processing circuit determines that inbound data indicates to transmit a portion of EWA data 408. In another example, the data processing circuit determines that inbound data indicates to ringback default data (e.g., a preset data dump). In yet another example, the data processing circuit determines that inbound data indicates a touch screen computing device is ready to interact.

The data processing circuit 450 generates outbound information 444 that includes EWA data 408 to be modulated on an inbound digital signal at the first frequency (f1) and a set reference circuit signal to produce a beacon signal at a third frequency (f3). The reference circuit generates a data out signal 464 that includes a first and third frequency components based on the outbound information 444. The pen tip transceive circuit regulates the data out signal 464 onto conductor 420 for receiving by the touch screen computing device.

FIG. 55 is a graphical illustration of an embodiment of the signaling on conductor 420 in the example of FIG. 54. As illustrated, the drive sense portion of the pen tip transceive circuit senses a first and second frequency signal from a touch screen computing device. The pen tip transceive circuit modulates EWA data 408 on the first frequency signal to the touch screen (e.g., amplifies and rings back f1) and generates a beacon signal at a third frequency (f3), which is used by the touch screen computing device to identify the electronic writing apparatus as a pen.

FIG. 56 is a schematic block diagram of an embodiment of an eraser processing module 440-1, an eraser transceive circuit 442-1 and an eraser conductor 430-1 of an electronic writing apparatus. The eraser processing module 440 includes a data processing circuit 450-1, a bandpass filter (BPF) circuit 446 and an analog to digital (ADC) 454. The electronic writing apparatus functions as an eraser and operates to communicate with a touch screen computing device using beacon and ringback modes, similar to the example discussed with reference to FIG. 52, but the beacon signal in this example is at a fourth frequency to identify an aspect of the electronic writing apparatus (e.g., the EWA data is erase data, the signal is from an eraser electronic writing apparatus, the electronic writing apparatus is an eraser only, etc.) according to a communication protocol.

FIG. 57 is a graphical illustration of an embodiment of signals driven and sensed by the eraser transceive circuit 442-1 in the example of FIG. 56. As illustrated, current signal Iin_1 includes a first and second frequency component received from a touch screen computing device. I_in1 also includes an EWA data 408 component at the first frequency signal (f1). Iin_1 also includes a beacon signal component at a fourth frequency (f4) to identify the electronic writing apparatus as an eraser.

FIG. 58 is a flowchart illustrating an example of a method of an electronic writing apparatus communicating with a touch screen computing device. The method begins or continues with step 600, where a function module of the electronic writing apparatus detects a stimulus. The stimulus includes one or more of a touch, a pressure, an orientation, a button selection, a vibration, a voice command, an acceleration, a torque and a received data signal. The function module may be on or more of an orientation circuit, a pen functionality circuit, a z-direction pressure circuit, an eraser functionality circuit, a voice recognition circuit, a vibration circuit, and a touch circuit. The method continues with step 602, where the function module generates functional data based on the detected stimulus. For example, the function module generates one or more capacitance change values representing an orientation of the electronic writing apparatus.

The method continues with step 604, where a processing module of the electronic writing apparatus generates an outbound data signal from the functional data. The method continues with step 606, where a transceiver circuit of the electronic writing apparatus generates an identifier signal that has a unique waveform characteristic. The unique waveform characteristic is an identifier for an aspect of the electronic writing apparatus. For example, a square wave identifies the electronic writing apparatus as an eraser. As another example, a first particular frequency identifies the electronic writing apparatus as having both pen and eraser functionality.

The method continues with step 608, where the transceive circuit combines the outbound data signal with the identifier signal to produce a transmit reference signal. For example, the transceiver circuit adds the outbound data signal to the identifier signal to produce the transmit reference signal. The method continues with step 610, where the transceive circuit regulates the transmit reference signal on a conductor of the electronic writing apparatus. The method continues with step 612, where the transceive circuit generates an error correction signal based on the transmit reference signal and, if present, an inbound signal received via the conductor.

The processing module of the electronic writing apparatus may further recover inbound data from the error correction signal and interpret the inbound data to determine a request and execute the request. For example, the processing module interprets the inbound data to be a data communication setup request that includes an instruction to transmit electronic writing apparatus data at a first frequency and beacon data at a second frequency.

FIG. 59 is a schematic block diagram of an embodiment of an electronic writing apparatus that includes a pen function module 432, a pressure module 434, an orientation module 436, a pen processing module 440, a pen tip transceive circuit 442, that is operably connected to a primary conductor 440 and one or more secondary conductors 540. The primary and secondary conductors function as electrical interfaces to a touch screen computing device. In an example, the electrical interface includes one or more of capacitive coupling, electrostatic coupling and electromagnetic coupling. The electronic writing apparatus 400 uses one or more of the primary and secondary conductors to transmit and receive various types of data with a touch screen computing device. For example, the electronic writing apparatus 400 sends pen primary data 592 via primary conductor 440 in ring back mode. As another example, the electronic writing apparatus 400 sends pen primary data 592 via primary conductor 440 in beacon mode and sends pen secondary data 594 via a secondary conductor 540 in data communication mode. As another example, the electronic writing apparatus 400 sends pen secondary data 594 via secondary conductor 540 in beacon mode.

The determination of what data to send via which conductor is based on or more of a command, a preset (e.g., according to a data communication protocol, according to a stored instruction), a type of data, and a size of data. For example, a beacon signal is transmitted on the primary conductor based on a command (e.g., from an inbound data signal). As another example, data over a first size (e.g., 1 MB) is transmitted via the secondary conductor and data under the first size is transmitted via the primary conductor. As yet another example, when the type of data is pen function data, it is transmitted via the primary conductor and when the type of data is z-direction pressure data, it is transmitted via the secondary conductor.

FIG. 60 is a schematic block diagram of an embodiment of an electronic writing apparatus 400 that includes an eraser function module 432-1, a pressure module 434-1, an orientation module 436-1, an eraser processing module 440-1, and an eraser transceive circuit 442-1, that is operably connected to a primary conductor 440 and one or more secondary conductors 540. Note when the electronic writing apparatus includes eraser and pen functionality, the electronic writing apparatus may utilize the same modules (e.g., processing module 440, pressure module 434, orientation module 436, etc.) for both pen and eraser functional data generation and/or processing.

This example is similar to the example of FIG. 59, except that the electronic writing apparatus includes or is functioning as an eraser to transceive eraser primary data via a primary conductor 440-1 and eraser secondary data via a secondary conductor 540-1. In one example, the number of transceiver circuits 442, corresponds to the number of conductors present in the electronic writing apparatus. Note in an example, one or more of the conductors (e.g., primary conductor) are used by both the eraser transceive circuit and the pen tip transceive circuit. As a specific example, the electronic writing apparatus includes pen and eraser circuitry, a primary conductor and a first and second secondary conductor. In this example, pen and eraser circuitry both use a primary conductor 440 to transceive their primary data, pen circuitry also uses a first secondary conductor for pen secondary data, an eraser circuitry uses a second secondary conductor for eraser secondary data. Further in this example, the primary data includes a beacon signal that identifies the electronic writing apparatus as an eraser or pen (depending on the frequency of the beacon signal). The secondary data includes functional data (e.g., z-direction pressure data) and/or operational data (e.g., a stored value) that is generated by one or more function modules (e.g., pressure module 434-1) or retrieved from memory of the electronic writing apparatus.

In an embodiment, one or more of the secondary conductors are larger than the primary conductor, which allows the secondary conductor(s) to transmit data at a higher data rate as there is more surface area of the conductor to propagate electrical signals. Thus, in an example outputting data of a first size on the primary conductor and outputting data of a second size (greater than the first) on the secondary conductor (e.g., the larger conductor) allows for greater data throughput.

FIG. 61 is a schematic block diagram of an embodiment of an electronic writing apparatus tip 372 communicating with a touch screen computing device 12 via multiple conductors of the electronic writing apparatus. FIGS. 61A-D are graphical illustrations of frequencies driven and sensed respectively by the electronic writing apparatus tip 372 and the touch screen 12 of FIG. 61. As illustrated in FIGS. 61A-D, a first frequency is utilized to sense self capacitance changes of column and row electrodes of touch screen 12, a second frequency is utilized to sense mutual capacitance changes between column and row electrodes of touch screen 12, and a third frequency is utilized to sense a pen self-capacitance, and identify the electronic writing apparatus as a pen/eraser to touch screen 12. Note that a second drive sense circuit DSC-2 (e.g., op amp 425-2, dependent current source 426-2 and feedback) may drive current signal Iin_2 at a different frequency than a first drive sense circuit DSC-1 (e.g., op amp 425-1, dependent current source 426-1 and feedback) drives Iin_1. In another example, DSC-1 utilizes the same frequency f3 for Vref 1 and Vref 2, but at a different phase and/or magnitude.

FIG. 62 is a schematic block diagram of an embodiment of an electronic writing apparatus utilizing a plurality of conductors to communicate with a touch screen computing device. The electronic writing apparatus includes a processing module 404, a primary transceive circuit 410-1 coupled to a primary pen conductor 440 and a secondary transceive circuit 410-2 coupled to a secondary pen conductor(s) 540. The processing module 404 includes one or more data processing circuits 450, digital filter circuits 452, analog to digital converters (ADC) 454, and digital to analog converters (DAC) 456.

In an example of operation, the electronic writing apparatus receives and transmits pen primary data from a touch screen computing device via primary pen conductor 440 and receives and transmits pen secondary data via secondary pen conductor 540. The primary transceive circuit 410-1 regulates primary data out. In an example, the primary data out is a voltage reference signal (Vref). The secondary pen transceive circuit 442-1 regulates secondary data out and/or a Vref signal. In an example, the secondary data out signal represents functional data (e.g., capacitance change values, pressure measurement, button state, etc.). As a specific example, the electronic writing apparatus outputs a beacon signal having a third oscillation frequency on primary pen conductor 440 and outputs a secondary data signal having a fourth frequency on a secondary conductor 540. The determination of the data processing circuit as to what data to output on which conductor includes one or more of receiving a command, interpreting a unique characteristic of an inbound data signal, and performing a lookup.

FIG. 63 is a schematic block diagram of an embodiment of an electronic writing apparatus (EWA) communicating with a touch screen computing device via multiple conductors of the electronic writing apparatus. The method begins or continues with step 620, where the electronic writing apparatus determines to transmit data (e.g., as a signal, as a modulated signal, etc.) to a touch screen computing device. The method continues with step 622, where the electronic writing apparatus determines whether to use more than one conductor to transmit the data with the touch screen computing device. When using more than one conductor the method branches to steps 630 and 640. When not using more than one conductor the method continues to step 624 where the electronic writing apparatus generates a transmit reference signal. In an example, the transmit reference signal includes one of an outbound data signal (e.g., representing EWA data) and an identifier signal.

The method continues with step 626, where the electronic writing apparatus regulates the transmit reference signal onto a conductor of the electronic writing apparatus. The method continues with step 628, where the electronic writing apparatus generates an error correction signal based on the transmit reference signal and an inbound signal received via the conductor.

When the electronic writing apparatus determines to utilize more than one conductor, the method continues to steps 630 and 640. Note that steps 630-634 and step 640-644 may be performed concurrently. At step 630, the electronic writing apparatus generates a first transmit reference signal. The method continues with step 632, where the electronic writing apparatus regulates the first transmit reference signal onto a first conductor (e.g., a primary conductor (e.g., closest conductor to center of electronic writing apparatus)). The method continues with step 634, where the electronic writing apparatus generates a first error correction signal based on the first transmit reference signal and a first representation of an inbound signal received via the first conductor.

The method also continues at step 640, where the electronic writing apparatus generates a second transmit reference signal. The method continues with step 642, where the electronic writing apparatus regulates the second transmit reference signal onto a second conductor (e.g., a secondary conductor (e.g., second closest conductor to center of electronic writing apparatus, a conductor that does not transmit the beacon signal, a larger conductor, etc.)). The method continues with step 644, where the electronic writing apparatus generates a second error correction signal based on the second transmit reference signal and a second representation of an inbound signal received via the second conductor. Note that at least one of the first and second transmit reference signals include an identifying signal having a unique waveform characteristic (e.g., frequency, shape, frequency band, combination of frequency and shape, etc.) that functions as an identifier for an aspect (e.g., write as pen, write as pencil, erase pencil, erase pen, identifier, etc.) of the electronic writing apparatus, and that one or more of the first and second transmit reference signals includes the outbound data signal. Further note that the secondary conductor may be larger (e.g., greater surface area, greater in diameter, etc.) than the first or primary conductor. As such, the secondary conductor may transmit similar data signals at a lower power rate than the primary conductor. Also, the secondary conductor allows the electronic writing apparatus to transceive data signals with a touch screen computing device at a greater data rate.

FIG. 64 is a flowchart illustrating an embodiment of an electronic writing apparatus communicating with a touch screen computing device that begins or continues with step 660, where the electronic writing apparatus transmits a transmit reference signal to the touch screen computing device that identifies the electronic writing apparatus. In an example, the electronic writing apparatus transmits the transmit reference signal in response to detecting a stimulus (e.g., touch, command on an inbound signal, pressure, orientation, etc.). Alternatively, the electronic writing apparatus transmits the transmit reference signal based on receiving a command from the touch screen computing device. The method continues with step 662, where the electronic writing apparatus receives a response from the touch screen computing device based on the transmit reference signal. For example, the electronic writing apparatus receives updated settings (e.g., frequency, modulation scheme, number of conductors to use, types of data to transmit on which conductor, etc.) for beacon mode, data communication mode and ringback mode. As another example, the electronic writing apparatus receives processing scheme information that indicates whether the electronic writing apparatus or the touch screen will process certain data. For example, the processing scheme information indicates that for capacitance values from a z-direction pressure sensor, the electronic writing apparatus will determine an amount of pressure based on the capacitance values and send data representing the amount of pressure to the touch screen. As another example, the processing scheme information indicates that for voice command data, the electronic writing apparatus will transmit raw data associated with the voice command to the touch screen for processing.

The method continues with step 664, where the electronic writing apparatus interprets the response to determine a function for execution. The function may include one or more of send data to touch screen, generate a vibration, store functional data, write data received from touch screen, and changing a property of the electronic writing apparatus and/or communication preferences (e.g., settings, processing scheme information, etc.) between the electronic writing apparatus and the touch screen. For example, the property may be one or more of changing a color of an LED on the electronic writing apparatus, changing a vibration frequency and the communication preferences may include changing a transmit beacon frequency. As another example, the function includes changing transmit settings from transmitting all data on a conductor to transmitting primary data on a primary conductor and transmitting secondary data on a secondary conductor.

The method continues with step 666, where the electronic writing apparatus executes the determined function to produce a result. For example, the electronic writing apparatus modifies the transmit beacon frequency that indicates the electronic writing apparatus is functioning as an eraser. As another example, the electronic writing apparatus obtains functional data regarding the request for processing by the touch screen computing device. The method continues with step 668, where the electronic writing apparatus transmits a second transmit reference signal to the touch screen computing device that includes information based on one or more of the response and the result. For example, the electronic writing apparatus sends the obtained functional data to the touch screen computing device for subsequent processing.

FIG. 65 an embodiment of a touch screen computing device communicating with an electronic writing apparatus that begins or continues with step 680, where the touch screen computing device receives a transmit reference signal having at least one unique waveform characteristic from an electronic writing apparatus. The method continues with step 682, where the touch screen computing device determines capabilities and/or functionalities of the electronic writing apparatus based on the unique waveform characteristics. For example, the touch screen computing device determines that the electronic writing apparatus is functioning as an eraser based on the frequency of the transmit reference signal. As another example, the touch screen computing determines the electronic writing apparatus has a vibration capability based on shape (e.g., sawtooth) of the transmit reference signal.

The method continues with step 684, where the touch screen computing device generates a response that includes a function for execution by the electronic writing apparatus. For example, the touch screen computing device generates a response that includes a function of storing a new reference table for future communications. As another example, the touch screen computing device generates a response that includes a function of send back pressure data. In an example, the touch screen computing device determines one or more of communication preferences and settings for transceiving signals with the electronic writing apparatus and generates the response to includes the communication preferences and settings.

The method continues with step 686, where the touch screen computing device transmits, via electrodes of the touch screen computing device, the response to the electronic writing apparatus. For example, the touch screen computing device modulates data representing the response onto a signal with a first frequency used to drive and sense capacitance changes on an electrode of the touch screen to produce a modulated signal. The touch screen computing device drives the modulated signal onto the electrode for transmission to the electronic writing apparatus.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A circuit comprising:
a function module operably coupled to:
  detect stimulus of an electronic writing apparatus; and
  generate functional data based on the detected stimulus;
a processing module operable to generate an outbound data signal from the functional data;
a transceive circuit coupled to a conductor of the electronic writing apparatus, wherein the transceive circuit includes:
  a reference circuit operably coupled to:
    generate an identifier signal having a unique waveform characteristic, wherein the unique waveform characteristic is an identifier for an aspect of the electronic writing apparatus; and
    combine the outbound data signal with the identifier signal to produce a transmit reference signal;
  a drive-sense circuit operably coupled to:
    regulate the transmit reference signal on the conductor; and
    generate an error correction signal based on the transmit reference signal and an inbound signal received via the conductor.

2. The circuit of claim 1, wherein the function module comprises:
an orientation circuit that determines one or more of an orientation of the electronic writing apparatus corresponding to an x-direction of an x-y plane as the stimulus and an orientation of the electronic writing apparatus corresponding to a y-direction of the x-y plane as the stimulus.

3. The circuit of claim 1, wherein the function module comprises:
a pen functionality circuit operable to generate the functional data to represent one or more of:
a line color;
a line thickness;
a pencil mode;
a pen mode;
a drawing format; and
a text format.

4. The circuit of claim 1, wherein the function module comprises:
a z-direction pressure circuit operable to detect a pressure exerted on a tip of the electronic writing apparatus; and
generate the functional data to represent the detected pressure.

5. The circuit of claim 1, wherein the function module comprises:
an eraser functionality circuit operable to generate the functional data to represent one or more of:
an erase line function;
an erase color function;
an erase pencil function;
an erase pen function; and
an eraser width.

6. The circuit of claim 1, wherein the function module comprises:
a voice recognition circuit operable to receive a voice command; and
generate the functional data to represent the received voice command.

7. The circuit of claim 1, wherein the function module comprises:
a touch circuit operable to detect a touch of a user of the electronic writing apparatus; and
determine functional data based on the touch.

8. The circuit of claim 1, wherein the function module comprises:
a vibration circuit operable to convert a vibration into an electrical signal;
convert the electrical signal into functional data;
receive a control signal from the processing module; and
generate a vibration signal based on the control signal that causes the electronic writing apparatus to vibrate at a particular frequency.

9. The circuit of claim 1, wherein the processing module is further operable to:
recover inbound data from the error correction signal; and
interpret the inbound data to determine a request for execution by the electronic writing apparatus; and
facilitate execution of the request.

10. The circuit of claim 1, wherein the stimulus comprises one or more of:
a touch;
a pressure;
an orientation;
an acceleration;
a torque;
a vibration;
a voice command; and
a button selection.

11. The circuit of claim 1, wherein the reference circuit includes one or more of:
a direct current (DC) voltage reference circuit;
a sinusoidal signal generator;
a multiplication circuit;
a summing circuit; and
a data level shift circuit.

12. The circuit of claim 1, wherein the drive sense circuit comprises:
an operational amplifier;
a dependent current source; and
a feedback loop.

* * * * *